United States Patent
Yang et al.

(10) Patent No.: US 9,609,636 B2
(45) Date of Patent: *Mar. 28, 2017

(54) METHOD AND APPARATUS FOR TRANSMITTING CONTROL INFORMATION

(71) Applicant: LG ELECTRONICS INC., Seoul (KR)

(72) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,420

(22) Filed: Jan. 28, 2016

(65) Prior Publication Data

US 2016/0150527 A1    May 26, 2016

Related U.S. Application Data

(63) Continuation of application No. 14/705,673, filed on May 6, 2015, now Pat. No. 9,277,547, which is a
(Continued)

(51) Int. Cl.
*H04W 74/00* (2009.01)
*H04W 72/04* (2009.01)
(Continued)

(52) U.S. Cl.
CPC ....... *H04W 72/0413* (2013.01); *H04L 1/0041* (2013.01); *H04L 1/0057* (2013.01);
(Continued)

(58) Field of Classification Search
None
See application file for complete search history.

(56) References Cited

U.S. PATENT DOCUMENTS

2008/0175195 A1    7/2008  Cho et al.
2008/0212506 A1    9/2008  Lee et al.
(Continued)

FOREIGN PATENT DOCUMENTS

CN    101247171 A    8/2008
CN    101689984 A    3/2010
(Continued)

OTHER PUBLICATIONS

CATT, "DAI Design for LTE-A," 3GPP TSG-RAN WG1 Meeting #62, R1-104311, Aug. 23-27, 2010, Sections 2-3.
(Continued)

*Primary Examiner* — Robert C Scheibel
(74) *Attorney, Agent, or Firm* — Birch, Stewart, Kolasch & Birch, LLP

(57) ABSTRACT

A method of transmitting uplink control information at a communication apparatus configured with a plurality of cells including a first cell and a second cell in a wireless communication system is provided. A first set of one or more Physical Downlink Shared Channel (PDSCH) signals is received within M downlink subframes through the first cell, where M≥1. A second set of zero or more PDSCH signals is received within N downlink subframes through the second cell, where N≥1. Acknowledgment information is transmitted on an uplink subframe. The acknowledgment information includes acknowledgment information for the first set and acknowledgment information for the second set. A PDSCH signal without a corresponding Physical Downlink Control Channel (PDCCH) signal is present among the first set.

20 Claims, 27 Drawing Sheets

Related U.S. Application Data continuation of application No. 13/920,987, filed on Jun. 18, 2013, now Pat. No. 9,055,568, which is a continuation of application No. 13/513,053, filed as application No. PCT/KR2011/007251 on Sep. 30, 2011, now Pat. No. 8,488,549.

(60) Provisional application No. 61/388,579, filed on Sep. 30, 2010, provisional application No. 61/411,460, filed on Nov. 8, 2010, provisional application No. 61/413,950, filed on Nov. 15, 2010, provisional application No. 61/414,846, filed on Nov. 17, 2010, provisional application No. 61/417,283, filed on Nov. 26, 2010, provisional application No. 61/424,038, filed on Dec. 16, 2010, provisional application No. 61/448,206, filed on Mar. 2, 2011.

(51) Int. Cl.

| | |
|---|---|
| *H04L 1/18* | (2006.01) |
| *H04L 5/14* | (2006.01) |
| *H04L 1/00* | (2006.01) |
| *H04L 1/16* | (2006.01) |
| *H04W 72/12* | (2009.01) |
| *H04L 5/00* | (2006.01) |
| *H04L 1/12* | (2006.01) |
| *H04W 88/02* | (2009.01) |

(52) U.S. Cl.
CPC .......... *H04L 1/0073* (2013.01); *H04L 1/1671* (2013.01); *H04L 1/18* (2013.01); *H04L 1/1861* (2013.01); *H04L 5/0035* (2013.01); *H04L 5/0053* (2013.01); *H04L 5/0055* (2013.01); *H04L 5/0082* (2013.01); *H04L 5/0092* (2013.01); *H04L 5/0094* (2013.01); *H04L 5/14* (2013.01); *H04L 5/1469* (2013.01); *H04W 72/042* (2013.01); *H04W 72/0406* (2013.01); *H04W 72/1273* (2013.01); *H04L 5/001* (2013.01); *H04L 2001/125* (2013.01); *H04W 88/02* (2013.01)

(56) References Cited

U.S. PATENT DOCUMENTS

| | | | |
|---|---|---|---|
| 2009/0241004 | A1 | 9/2009 | Ahn et al. |
| 2010/0271970 | A1* | 10/2010 | Pan ....................... H04L 1/0026 370/252 |
| 2011/0286406 | A1* | 11/2011 | Chen ..................... H04L 1/1861 370/329 |
| 2012/0039279 | A1* | 2/2012 | Chen ..................... H04L 1/1861 370/329 |
| 2012/0039280 | A1* | 2/2012 | Chen ..................... H04L 1/1861 370/329 |
| 2012/0044890 | A1* | 2/2012 | Jen ........................... H04L 1/18 370/329 |

FOREIGN PATENT DOCUMENTS

| | | |
|---|---|---|
| CN | 101789851 A | 7/2010 |
| EP | 2234302 A1 | 9/2010 |

OTHER PUBLICATIONS

Nokia et al., "PUCCH Format 1a/1b Response Allocation in LTE-A TDD," 3GPP TSG-RAN WG1 Meeting #62, R1-104432, Aug. 23-27, 2010, Whole document.

Samsung, "DAI Design for LTE-A TDD," 3GPP TSG-RAN WG1 Meeting #62, R1-104578, Aug. 23-27, 2010, Sections 2-3.

Samsung, "Discussion on ACK/NACK Bundling for LTE-A TDD," 3GPP TSG-RAN WG1 Meeting #62, R1-104579, Aug. 23-27, 2010, Sections 2-3.

3rd Generation Partnership Project, "Technical Specification Group Radio Access Network; Evolved Universal Terrestrial Radio Access (E-UTRA) and Evolved Universal Terrestrial Radio Access Network (E-UTRAN) . . . " 3GPP TS 36.300, V10.0.0, Jun. 17, 2010, pp. 1-183, XP-50441905A.

Huawei et al., "Proposal on Ordering and Segmentation of HARQ-ACK Bits," 3GPP TSG RAN WG1 meeting #64, R1-110901, Taipei, Taiwan, Feb. 21-25, 2011 (EPO Server date Feb. 17, 2011), 12 pages, XP-50490780A.

* cited by examiner

Reuse of LTE PUCCH format 2 (normal CP case)

FIG. 25

| DL SF #1 | DL SF #2 | DL SF #3 | DL SF #4 | UL SF |
|---|---|---|---|---|
| DAI = 1 |  | DAI = 2 | DAI = 3 | UL DAI = 3 |

UE missed PDCCH

| A/N payload confirgued without assistance of UL DAI | A/N(s) for SF #1 | Don't Care | A/N(s) for SF #3 | Don't Care |
|---|---|---|---|---|

| A/N payload configured with assistance of UL DAI | A/N(s) for SF #1 | A/N(s) for SF #2 | Don't Care |
|---|---|---|---|

FIG. 26

| | DL SF #1 | DL SF #2 | DL SF #3 | DL SF #4 | UL SF |
|---|---|---|---|---|---|
| CC #1 | DAI = 1 | | DAI = 2 | | |
| CC #2 | DAI = 1 | DAI = 2 | | DAI = 3 | UL DAI = 3 |
| CC #3 | | DAI = 1 | DAI = 2 | | UL DAI = 3 |

| A/N payload configured with assistance of UL DAI | A/N(s) for SF #1 in CC#1 | A/N(s) for SF #3 in CC#1 | Don't Care | A/N(s) for SF #1 in CC#2 | A/N(s) for SF #2 in CC#2 | A/N(s) for SF #4 in CC#2 | A/N(s) for SF #2 in CC#3 | A/N(s) for SF #3 in CC#3 | Don't Care |

FIG. 27

| DL SF #1 | DL SF #2 | DL SF #3 | DL SF #4 | UL SF |
|---|---|---|---|---|
| DAI = 1 | ~~DAI = 2~~ | SPS PDSCH | ~~DAI = 3~~ | UL DAI = 3 |
| | UE missed PDCCH | | UE missed PDCCH | |

METHOD AND APPARATUS FOR TRANSMITTING CONTROL INFORMATION

CROSS-REFERENCE TO RELATED APPLICATIONS

This application is a Continuation of co-pending U.S. application Ser. No. 14/705,673 filed on May 6, 2015 (now U.S. Pat. No. 9,277,547 issued on Mar. 1, 2016), which is a Continuation of U.S. application Ser. No. 13/920,987 filed on Jun. 18, 2013 (now U.S. Pat. No. 9,055,568 issued on Jun. 9, 2015), which is a Continuation of U.S. application Ser. No. 13/513,053 filed on Aug. 17, 2012 (now U.S. Pat. No. 8,488,549 issued on Jul. 16, 2013), which is filed as the National Phase of PCT/KR2011/007251 filed on Sep. 30, 2011, which claims the benefit under 35 U.S.C. 119(e) to U.S. Provisional Application No. 61/448,206 filed on Mar. 2, 2011, 61/424,038 filed on Dec. 16, 2010, 61/417,283 filed on Nov. 26, 2010, 61/414,846 filed on Nov. 17, 2010, 61/413, 950 filed on Nov. 15, 2010, 61/411,460 filed on Nov. 8, 2010, and 61/388,579 filed on Sep. 30, 2010, all of which are hereby expressly incorporated by reference into the present application.

BACKGROUND OF THE INVENTION

The present invention relates to a wireless communication system, and more particularly to a method and apparatus for transmitting control information.

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

SUMMARY OF THE INVENTION

An object of the present invention devised to solve the problem lies in a method and apparatus for efficiently transmitting control information in a wireless communication system. Another object of the present invention devised to solve the problem lies in a method and apparatus for efficiently transmitting uplink control information using a plurality of cells, and efficiently managing resources associated with the uplink control information. It is to be understood that technical objects to be achieved by the present invention are not limited to the aforementioned technical objects and other technical objects which are not mentioned herein will be apparent from the following description to one of ordinary skill in the art to which the present invention pertains.

The object of the present invention can be achieved by providing a method of transmitting uplink control information at a communication apparatus configured with Time Division Duplex (TDD) and a plurality of cells in a wireless communication system, the method including receiving at least one of one or more Physical Downlink Control Channel (PDCCH) signals and one or more Physical Downlink Shared Channel (PDSCH) signals on a plurality of downlink subframes and the plurality of cells; generating acknowledgement information per cell in response to the at least one of one or more PDCCH and one or more PDSCH; and transmitting a plurality of per-cell acknowledgement information on a single uplink subframe corresponding to the plurality of downlink subframes, the plurality of per-cell acknowledgement information being concatenated sequentially in order of cell index, wherein if a PDSCH signal without a corresponding PDCCH signal is present among the one or more PDSCH signals, acknowledgment information in response to the specific PDSCH signal is placed at an end of acknowledgment information configured for a cell on which the specific PDSCH signal is received.

In another aspect of the present invention, a communication apparatus configured to transmit uplink control information in a wireless communication system, wherein the communication apparatus configured with Time Division Duplex (TDD) and a plurality of cells includes a Radio Frequency (RF) unit; and a processor, wherein the processor is configured to receive at least one of one or more Physical Downlink Control Channel (PDCCH) signals and one or more Physical Downlink Shared Channel (PDSCH) signals on a plurality of downlink subframes and the plurality of cells, to generate acknowledgement information per cell in response to the at least one of one or more PDCCH and one or more PDSCH, and to transmit a plurality of per-cell acknowledgement information on a single uplink subframe corresponding to the plurality of downlink subframes, the plurality of per-cell acknowledgement information being concatenated sequentially in order of cell index, wherein if a PDSCH signal without a corresponding PDCCH signal is present among the one or more PDSCH signals, acknowledgment information in response to the specific PDSCH signal is placed at an end of acknowledgment information configured for a cell on which the specific PDSCH signal is received.

The specific PDSCH may be received on a Primary Cell (PCell).

If the plurality of per-cell acknowledgement information are transmitted via a Physical Uplink Shared Channel (PUSCH), a payload size of the per-cell acknowledgement information may be determined using a Downlink Assignment Index (DAI) value of a PDCCH for PUSCH scheduling.

The DAI value may indicate a number of downlink subframes per cell on which the at least one of one or more PDCCH signals and one or more PDSCH signals can be present.

If the plurality of per-cell acknowledgement information are transmitted via a Physical Uplink Control Channel (PUCCH), a payload size of the per-cell acknowledgement information may be determined using a total number of downlink subframes corresponding to the single uplink subframe.

The plurality of per-cell acknowledgement information may be concatenated in increasing order of cell index.

As is apparent from the above description, exemplary embodiments of the present invention can provide a method and apparatus for efficiently transmitting control information in a wireless communication system. In more detail, the embodiments of the present invention efficiently can transmit uplink control information using a plurality of cells, and can efficiently manage resources associated with the uplink control information.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIGS. 14 to 26 exemplarily show a method for transmitting ACK/NACK according to embodiments of the present invention.

FIG. 27 exemplarily shows the problems encountered when ACK/NACK payload for SPS PDSCH is configured.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

In a wireless communication system, a user equipment (UE) may receive information from a base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
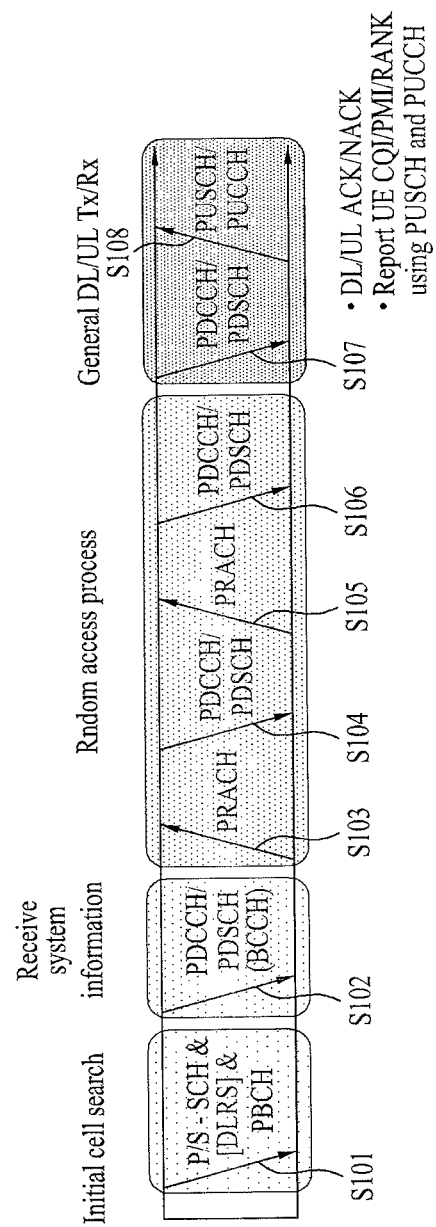
FIG. 1 is a conceptual diagram illustrating physical channels used in a 3GPP LTE system acting as an exemplary mobile communication system and a general method for transmitting a signal using the physical channels.

FIG. 1 is a conceptual diagram illustrating physical channels for use in a 3GPP system and a general method for transmitting a signal using the physical channels.

Referring to FIG. 1, when powered on or when entering a new cell, a UE performs initial cell search in step S101. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S102.

Thereafter, if the UE initially accesses the BS, it may perform random access to the BS in steps S103 to S106. For random access, the UE may transmit a preamble to the BS on a Physical Random Access CHannel (PRACH) in step S103 and receive a response message for the random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMI), and a Rank Indicator (RI). In the specification, the HARQ ACK/NACK is simply referred to as a HARQ-ACK or ACK/NACK (A/N). The HARQ-ACK includes at least one of a positive ACK (simply, ACK), a negative ACK (NACK), DTX and NACK/DTX. The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
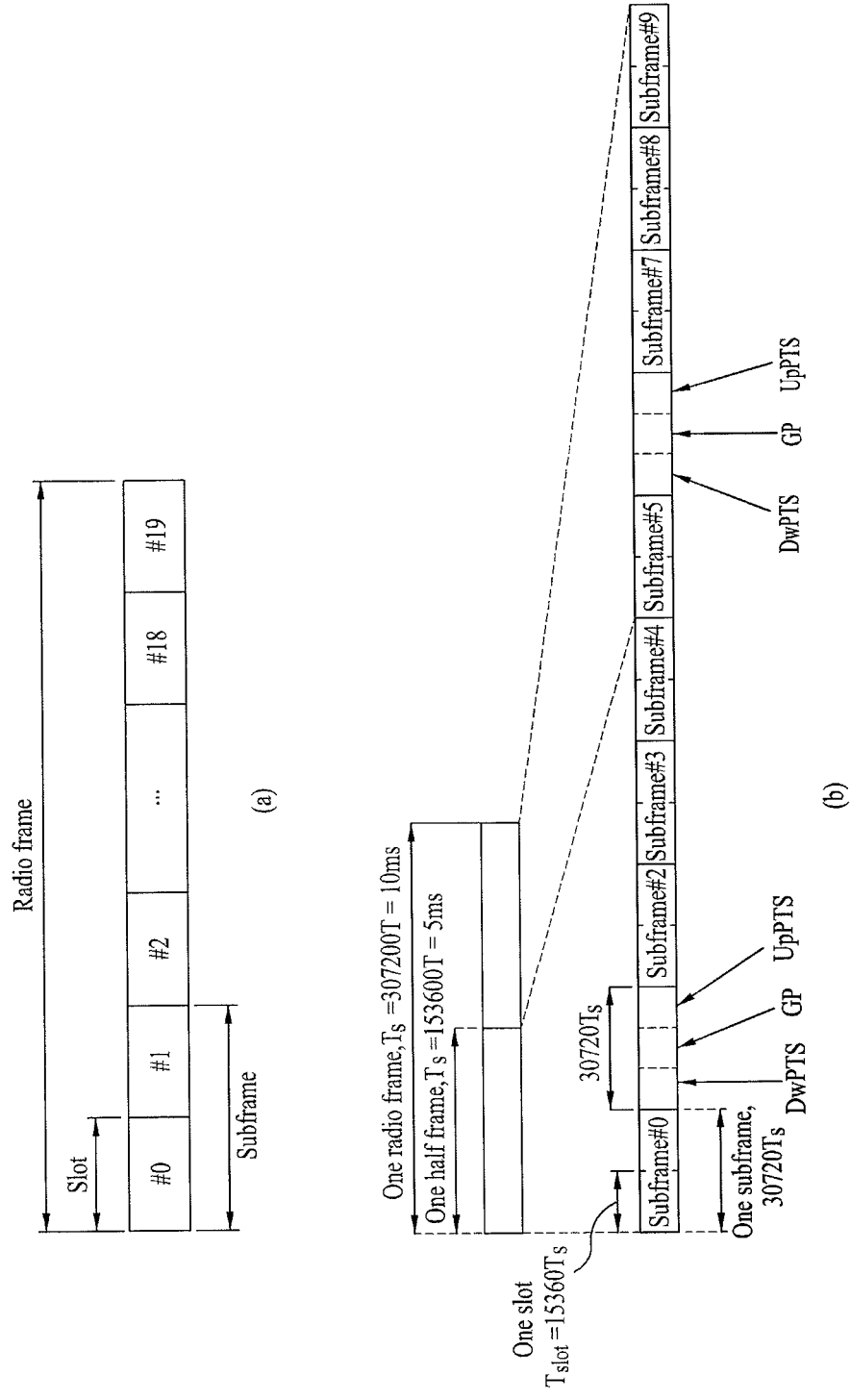
FIG. 2, including (a) and (b), is a diagram illustrating a structure of a radio frame.

FIG. 2, including (a) and (b), illustrates a radio frame structure. In a cellular OFDM wireless packet communication system, UL/DL data packet transmission is performed based on subframe. One subframe is defined as a predetermined interval including a plurality of OFDM symbols. 3GPP LTE supports a type-1 radio frame applicable to Frequency Division Duplex (FDD) and type-2 radio frame applicable to Time Division Duplex (TDD).

FIG. 2(a) illustrates a type-1 radio frame structure. A DL radio frame includes 10 subframes each having 2 slots in the time domain. A time required to transmit one subframe is referred to as Transmission Time Interval (TTI). For example, one subframe is 1 ms long and one slot is 0.5 ms long. One slot includes a plurality of OFDM symbols in the time domain and a plurality of Resource Blocks (RBs) in the frequency domain. Since 3GPP LTE systems use OFDMA in downlink, an OFDM symbol represents one symbol interval. The OFDM symbol can be called an SC-FDMA symbol or symbol interval. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multipath delay of a DL signal between a UL and a DL.

The aforementioned structure of the radio frame is only exemplary, and various modifications can be made to the number of subframes contained in the radio frame or the number of slots contained in each subframe, or the number of OFDM symbols in each slot.

Figure 3:
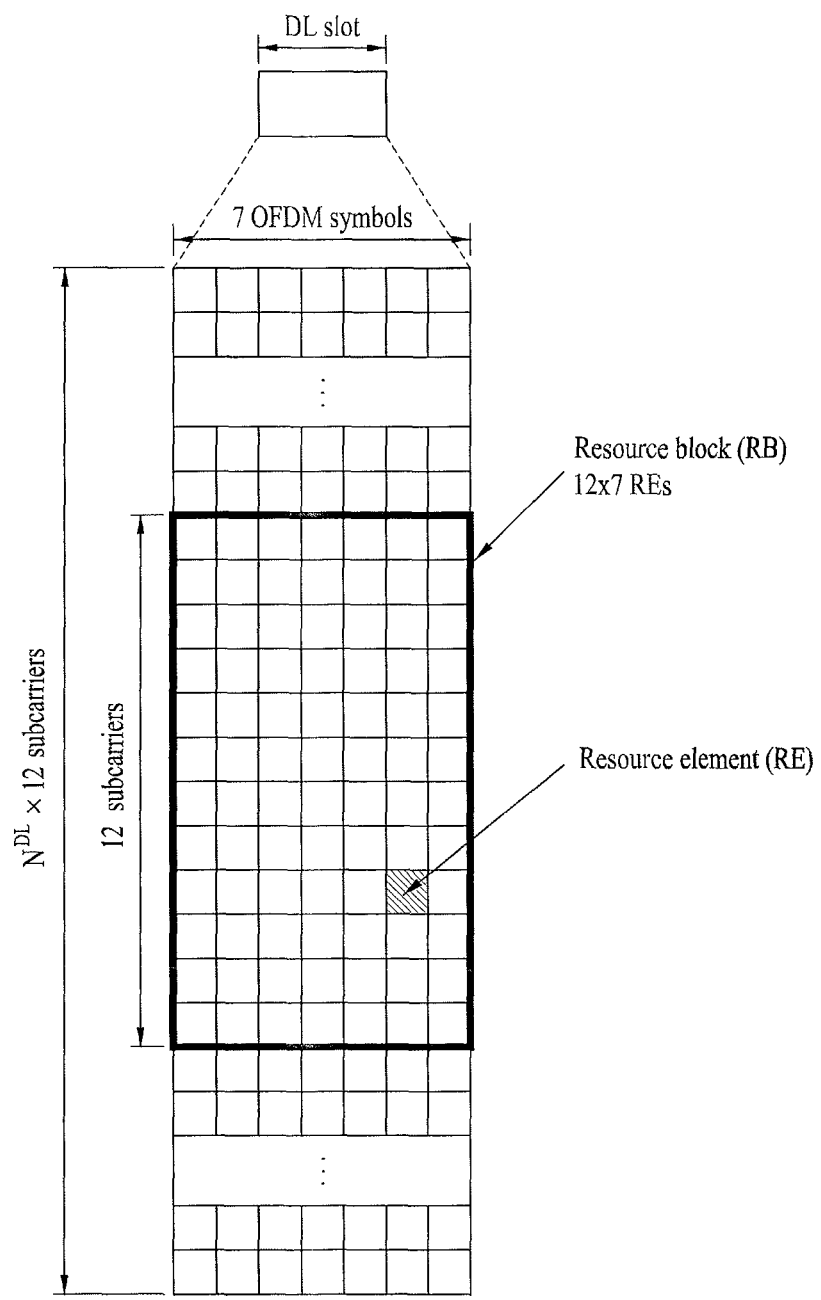
FIG. 3 exemplarily shows a resource grid of a downlink slot.

FIG. 3 exemplarily shows a resource grid of a downlink slot.

Referring to FIG. 3, a downlink slot includes a plurality of OFDM symbols in a time domain. One downlink slot includes 7 (or 6) OFDM symbols and a resource block (RB) includes 12 subcarriers in a frequency domain. Each element on a resource grid may be defined as a resource element (RE). One RB includes 12×7 (or 12×6) REs. The number (NRB) of RBs contained in a downlink slot is dependent upon a downlink transmission bandwidth. An uplink slot structure is identical to the downlink slot structure, but OFDM symbols are replaced with SC-FDMA symbols in the uplink slot structure differently from the downlink slot structure.

Figure 4:
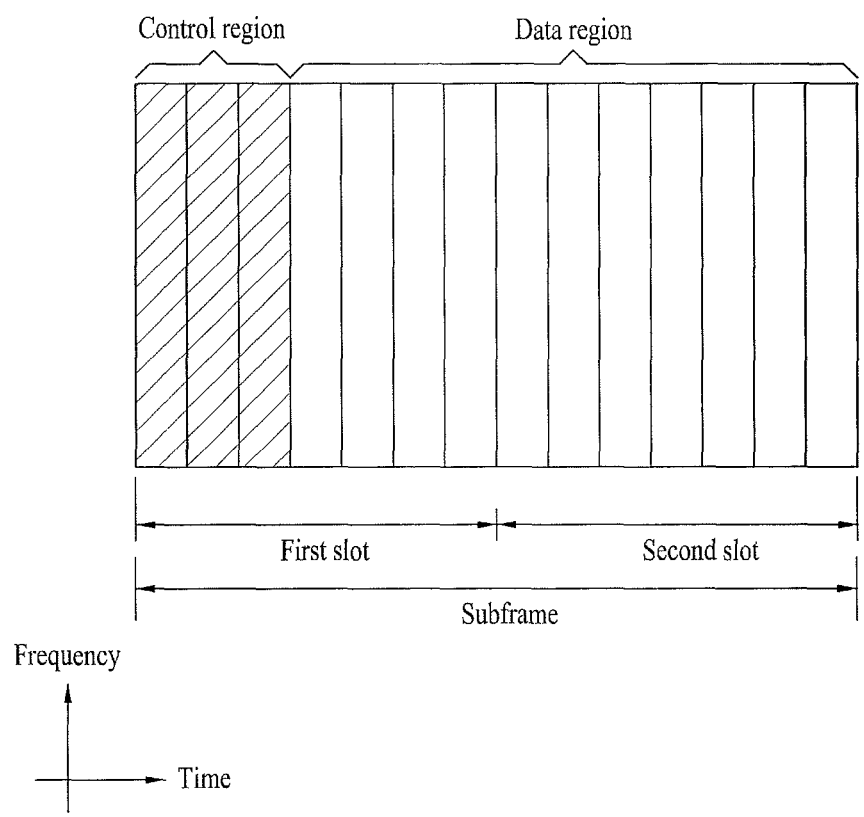
FIG. 4 illustrates a downlink frame structure.

FIG. 4 is a downlink subframe structure.

Referring to FIG. 4, a maximum of three (or four) OFDM symbols located in the front part of a first slot of the subframe may correspond to a control region to which a control channel is allocated. The remaining OFDM symbols correspond to a data region to which a Physical Downlink Shared CHannel (PDSCH) is allocated. A variety of downlink control channels may be used in the LTE, for example, a Physical Control Format Indicator Channel (PCFICH), a Physical Downlink Control Channel (PDCCH), a Physical hybrid ARQ indicator Channel (PHICH), etc. PCFICH is transmitted from a first OFDM symbol of the subframe, and carries information about the number of OFDM symbols used for transmitting a control channel within the subframe. PHICH carries a Hybrid Automatic Repeat request acknowledgment/negative-acknowledgment (HARQ ACK/NACK) signal as a response to an uplink transmission signal.

Control information transmitted over a PDCCH is referred to as Downlink Control Information (DCI). A variety of DCI formats are defined, for example, format 0 for uplink, and formats 1, 1A, 1B, 1C, 1D, 2, 2A, 3, 3A, etc. for downlink. DCI format may selectively include a variety of information according to various usages. For example, DCI format may selectively include a hopping flag, RB allocation, modulation coding scheme (MCS), redundancy version (RV), new data indicator (NDI), transmit power control (TPC), cyclic shift demodulation reference signal (CS DM RS), channel quality information (CQI) request, HARQ process number, transmitted precoding matrix indicator (TPMI), precoding matrix indicator (PMI) confirmation, etc.

PDCCH carries a variety of information, for example, transmission format and resource allocation information of a downlink shared channel (DL-SCH), transmission format and resource allocation information of an uplink shared channel (UL-SCH), paging information transmitted over a paging channel (PCH), system information transmitted over DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A user equipment (UE) can monitor a plurality of PDCCHs. PDCCH is transmitted as an aggregation of one or more contiguous control channel elements (CCEs). CCE is a logical allocation unit that is used to provide a coding rate based on a radio channel state to a PDCCH. CCE may correspond to a plurality of resource element groups (REGs). The format of PDCCH and the number of PDCCH bits may be determined according to the number of CCEs. A base station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, an identifier of the corresponding UE (e.g., cell-RNTI (C-RNTI)) may be masked with the CRC. If PDCCH is provided for a paging message, a paging identifier (e.g., paging-RNTI (P-RNTI)) may be masked with a CRC. If PDCCH is provided for system information (e.g., system information block (SIC)), system information RNTI (SI-RNTI) may be masked with CRC. If PDCCH is provided for a random access response, random access-RNTI (RA-RNTI) may be masked with CRC.

Figure 5:
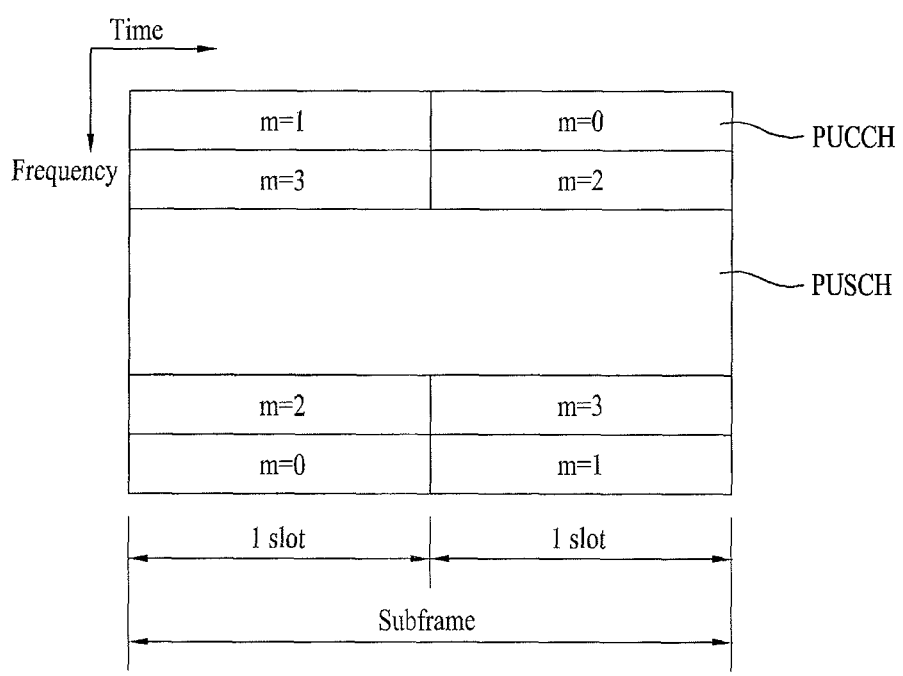
FIG. 5 illustrates an uplink subframe structure.

FIG. 5 is a diagram showing the structure of an uplink subframe used in LTE.

Referring to FIG. 5, the UL subframe includes a plurality of slots (e.g., 2 slots). Each slot may include different numbers of SC-FDMA symbols according to CP length. The UL subframe is divided into a data region and a control region in a frequency domain. The data region includes a PUCCH and transmits a data signal such as a voice signal or the like. The control region includes a PUSCH, and transmits Uplink Control Information (UCI). PUCCH includes a pair of RBs (hereinafter referred to as an RB pair) located at both ends of the data region on a frequency axis, and is hopped using a slot as a boundary.

PUCCH may be used to transmit the following control information, i.e., Scheduling Request (SR), HARQ ACK/NACK, and a Channel Quality Indicator (CQI), and a detailed description thereof will hereinafter be described.

Scheduling Request (SR): Scheduling request (SR) is used for requesting UL-SCH resources, and is transmitted using an On-Off Keying (OOK) scheme.

HARQ ACK/NACK: HARQ ACK/NACK is a response signal to an uplink (UL) data packet on a PDSCH. The HARQ ACK/NACK indicates whether or not a DL data packet has been successfully received. ACK/NACK of 1 bit is transmitted as a response to a single DL codeword, and ACK/NACK of 2 bits is transmitted as a response to two DL codewords.

Channel Quality Indicator (CQI): CQI is feedback information for a downlink channel. MIMO-associated feedback information includes a Rank Indicator (RI) and a Precoding Matrix Indicator (PMI). 20 bits are used per subframe.

The amount of control information (i.e., UCI), that is capable of being transmitted in a subframe by the UE, is dependent upon the number of SC-FDMAs available for UCI transmission. SC-FDMAs available in UCI transmission indicate the remaining SC-FDMA symbols other than SC-FDMA symbols that are used for Reference Signal (RS) transmission in a subframe. In the case of a subframe in which a Sounding Reference Signal (SRS) is established, the last SC-FDMA symbol of the subframe is also excluded. The Reference Signal (RS) is used for coherent detection of a PUCCH. PUCCH supports 7 formats according to transmission information.

Table 1 shows the mapping relationship between PUCCH format and UCI for use in LTE.

TABLE 1

| PUCCH format | Uplink control information (UCI) |
| --- | --- |
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1-or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 1 coded bits) |

Table 1 shows the mapping relationship between PUCCH format and UCI for use in LTE.

Semi-Persistent Scheduling (SPS)

Scheduling dynamically assigns resources to general unicast data on a per subframe basis. In contrast, SPS is a scheme for reserving resources in advance with respect to traffic which is periodically generated at a medium/low data request rate, such as Voice over Internet Protocol (VoIP) or streaming. In the SPS, resources are reserved in advance with respect to specific traffic such that scheduling overhead is reduced and resources are stably assigned.

In the LTE system, in the case of DL/UL SPS, information about a subframe for performing SPS transmission (Tx)/reception (Rx) is obtained by RRC signaling, and SPS activation (or reactivation) and deactivation are performed through a PDCCH. Subframe information for the SPS includes a subframe interval and a subframe offset. For convenience, a PDCCH indicating SPS activation/deactivation is called an SPS PDCCH. The SPS PDCCH carries RB assignment information for SPS Tx/Rx and Modulation and Coding Scheme (MCS) information. In addition, the Cyclic-Redundancy-Check (CRC) of the SPS PDCCH is masked with an SPS Radio Network Temporary Identifier (RNTI) is set to (NDI=0). Accordingly, even when information about a subframe for receiving the SPS by RRC signaling is assigned, the UE does not immediately perform the SPS Tx/Rx. When the UE receives an SPS PDCCH indicating activation (or reactivation), SPS Tx (e.g., PUSCH transmission) or SPS Rx (e.g., PDSCH reception) is performed in a subframe assigned by RRC signaling. The SPS Tx/Rx is performed within the subframe using the RB assignment information and the MCS information in the SPS PDCCH. Meanwhile, the UE stops the SPS Tx/Rx when receiving a PDCCH indicating deactivation. When an SPS PDCCH indicating activation (or reactivation) is received, the stopped SPS Tx/Rx is resumed in the subframe assigned by the RRC signaling using the RB assignment information and the MCS information specified in the SPS PDCCH.

In the case of SPS activation, a DCI field of the SPS PDCCH is set as shown in the following Table 2, a combination of bit fields shown in Table 2 can be used as a virtual CRC.

TABLE 2

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

If an error incapable of being checked by CRC has occurred, the virtual CRC is adapted to determine whether the corresponding bit field value is a promised value, such that it can provide additional error detection capability. Although an error occurs in DCI assigned to another UE, provided that this UE does not detect the corresponding error and mistakes the error for its own SPS activation, the UE continuously uses the corresponding resources, such that one error may cause a persistent problem. Therefore, the virtual CRC can prevent the SPS from being wrongly detected.

In the case of SPS release, DCI fields of the SPS PDCCH are established as shown in the following Table 3, such that DCI field combinations may be used as virtual CRCs. In case of SPS release, the UE transmits ACK/NACK for SPS release PDCCH.

TABLE 3

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

The uplink Semi-Persistent Scheduling (UL SPS) operating scheme will hereinafter be described. A base station (BS) may inform the UE of a subframe (e.g., 20 ms long) in which the SPS operation must be performed through higher layer (e.g., RRC) signaling. The BS transmits an SPS PDCCH indicating SPS activation to a UE 120. In this example, the SPS PDCCH includes UL grant information. In this case, specific RB, MCS, etc. specified by the SPS PDCCH are assigned to the UE for uplink transmission at an interval of 20 ms after the UL grant information is received by SPS signaling. Accordingly, the UE may perform uplink transmission using the RB information and the MCS information specified by the SPS PDCCH at an interval of 20 ms. For convenience of description, PUSCH depending on SPS is referred to as SPS PUSCH. The DL SPS operation is performed similarly to the UL SPS operation. In more detail, after receiving the SPS activation PDCCH having a DL grant, the UE can receive a DL signal (e.g., PDSCH) using RB and MCS specified by SPS PDCCH at intervals of 20 ms. In case of a PDSCH signal transmitted during SPS operation, a PDCCH corresponding to the PDSCH signal does not exist. For convenience of description, PDSCH depending on SPS will hereinafter be referred to as SPS PDSCH.

Figure 6:
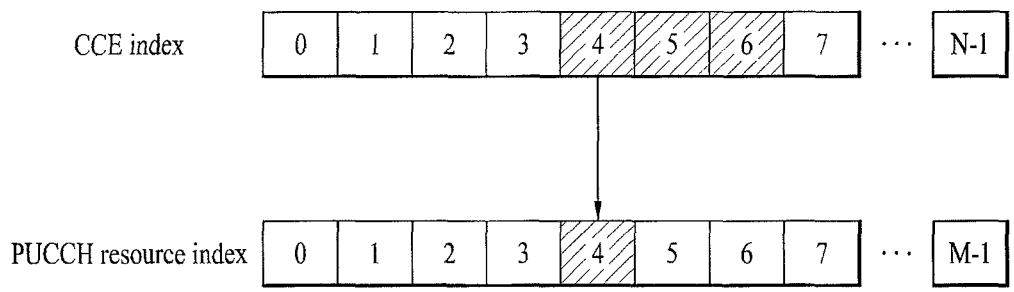
FIG. 6 shows an example for deciding PUCCH resources for ACK/NACK.

FIG. 6 shows an example for deciding PUCCH resources for ACK/NACK. In the LTE system, PUCCH resources for ACK/NACK are not pre-allocated to each UE, and several UEs located in the cell are configured to divisionally use several PUCCH resources at every time point. In more detail, PUCCH resources used for ACK/NACK transmission of a UE may correspond to a PDCCH that carries scheduling information of the corresponding DL data. The entire region to which a PDCCH is transmitted in each DL subframe is comprised of a plurality of Control Channel Elements (CCEs), and a PDCCH transmitted to the UE is comprised of one or more CCEs. The UE may transmit ACK/NACK through PUCCH resources (e.g., first CCE) from among CCEs constructing a PDCCH received by the UE.

Referring to FIG. 6, each block in a Downlink Component Carrier (DL CC) represents a CCE and each block in an Uplink Component Carrier (UL CC) indicates a PUCCH resource. Each PUCCH resource index may correspond to a PUCCH resource for an ACK/NACK signal. If information on a PDSCH is delivered on a PDCCH composed of CCEs #4, #5 and #6, as shown in FIG. 6, a UE transmits an ACK/NACK signal on PUCCH #4 corresponding to CCE

4, the first CCE of the PDCCH. FIG. 6 illustrates a case in which a maximum of M PUCCHs are present in the UL CC when a maximum of N CCEs exist in the DL CC. Though N may be identical to M (M=M), N may differ from M and CCEs may be mapped to PUCCHs in an overlapped manner.

Specifically, a PUCCH resource index in an LTE system is determined as follows.

$$n(1)PUCCH = nCCE + N(1)PUCCH \quad \text{[Equation 1]}$$

Here, n(1)PUCCH represents a resource index of PUCCH format 1 for ACK/NACK/DTX transmission, N(1)PUCCH denotes a signaling value received from a higher layer, and nCCE denotes the smallest value of CCE indexes used for PDCCH transmission. A cyclic shift (CS), an orthogonal spreading code and a Physical Resource Block (PRB) for PUCCH formats 1a/1b are obtained from n(1)PUCCH.

TDD scheme divides the same frequency band into a DL subframe and a UL subframe within a time domain, and then uses the DL subframe and the UL subframe. Therefore, in case of a DL/UL asymmetric data traffic situation, much more DL subframes may be allocated or much more UL subframes may be allocated. Therefore, according to the TDD scheme, the DL subframe may be mapped to the UL subframe on a one to one basis. Specifically, if the number of DL subframes is larger than the number of UL subframes, the UE must transmit an ACK/NACK response in response to a plurality of PDSCHs of multiple DL subframes on a single UL subframe. For example, the ratio of a DL subframe to a UL subframe according to the TDD configuration may be set to M:1. M is the number of DL subframes corresponding to one UL subframe. In this case, the UE must transmit an ACK/NACK response on a single UL subframe upon receiving a plurality of PDSCHs on M DL subframes.

In more detail, the ACK/NACK signal transmitted on a UL subframe (n) may correspond not only to PDCCH(s) detected by DL subframe(s) n-k (k∈K)) but also to a DL SPS release PDCCH. K is given by UL-DL configuration. Table 4 shows K:{$k_0, k_1, \ldots, k_{M-1}$} defined in the legacy LTE TDD.

contrast, if any one data unit fails decoding (or detecting), the Rx node may transmit a NACK signal or no signal.

2) PUCCH selection transmission: UE having received multiple PDSCHs reserves multiple PUCCH resources for ACK/NACK transmission. The ACK/NACK response for multiple data units is identified by a combination of PUCCH resources used for actual ACK/NACK transmission and transmitted ACK/NACK content (e.g., bit values).

When a UE transmits an ACK/NACK signal to a BS according to the TDD scheme, the following problems may occur.

In the case where the UE transmits the ACK/NACK signal to the BS using the above-mentioned schemes, it may be assumed that some parts of PDCCHs that have been transmitted from the base station during a plurality of subframe intervals may not be received by the UE (i.e., the UE may miss some parts of PDCCHs). In this case, it is impossible for the UE to recognize whether a PDSCH corresponding to the missing PDCCH is transmitted to the UE, resulting in the occurrence of errors in ACK/NACK generation.

In order to solve the above-mentioned errors, the TDD system includes a downlink assignment index (DAI) in a PDCCH. DAI indicates an accumulative value (i.e., a counting value) of PDCCH(s) corresponding to PDSCH(s) and PDCCH(s) indicating DL SPS release in the range extended to a current subframe within DL subframe(s) n-k (k∈K). For example, if three DL subframes are mapped to one UL subframe, PDSCHs transmitted in 3 DL subframe intervals are sequentially indexed (i.e., sequentially counted), and the indexed result is loaded on a PDCCH that schedules a PDSCH. As a result, the UE can recognize whether a PDCCH has been normally received on the basis of DAI information contained in the PDCCH.

Figure 7:
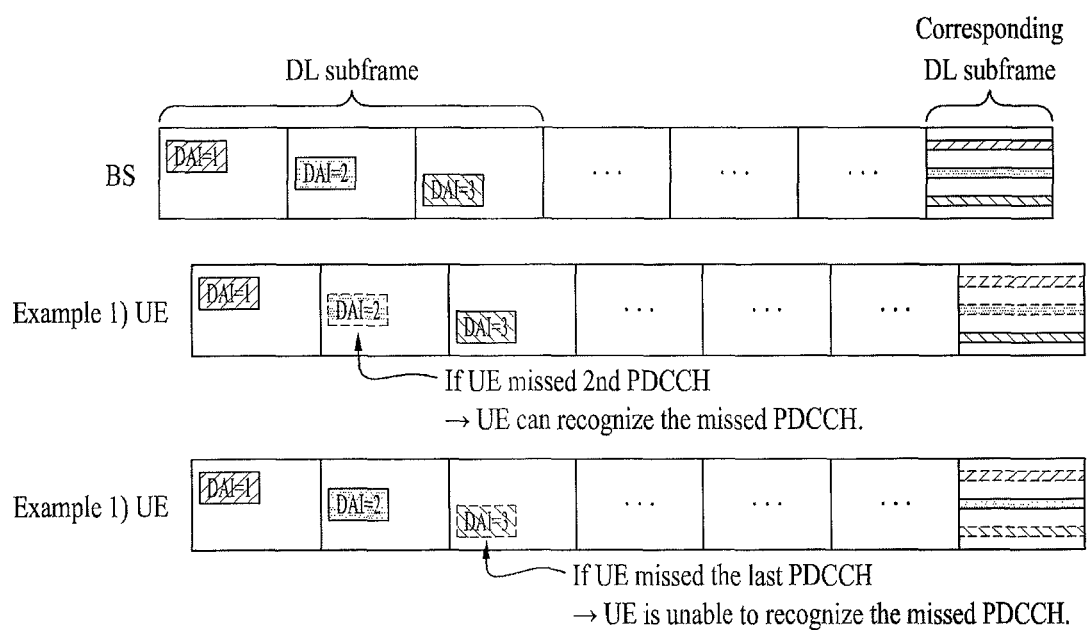
FIG. 7 exemplarily shows an uplink semi-persistent scheduling (SPS) operation scheme.

FIG. 7 exemplarily shows ACK/NACK transmission using a DAI. For example, according to the TDD system shown in FIG. 7, one UL subframe is mapped to three DL subframes (i.e., 3 DL subframes: 1 UL subframe). For

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

When several PDSCHs are transmitted to one UE in several DL subframes, a BS transmits one PDCCH to each PDSCH. In this case, a UE may transmit an ACK/NACK signal in response to a plurality of PDSCHs on a single UL subframe through PUCCH or PUSCH. The scheme for transmitting one ACK/NACK signal upon receiving several PDSCHs may be largely classified into an ACK/NACK bundling scheme and a PUCCH selection transmission scheme.

1) ACK/NACK bundling: ACK/NACK bits for a plurality of data units (for example, PDSCH, SPS release PDCCH, etc.) are coupled to each other by a logical AND operation. For example, if all data units are successfully decoded, a reception (Rx) node (e.g., UE) transmits an ACK signal. In convenience of description, it is assumed that the UE transmits an ACK/NACK signal using a PUCCH resource corresponding to the last detected PDCCH.

The first example of FIG. 7 shows that a UE missed a second PDCCH. Since a DAI value (DAI=3) of a third PDCCH is different from the number (i.e., 2) of received PDCCHs, the UE recognizes that the second PDCCH has been missed. In this case, the UE transmits ACK/NACK information using PUCCH resources corresponding to DAI=3, and an ACK/NACK response to the second PDCCH may be indicated by NACK (or NACK/DTX). In contrast, if the UE has missed the last PDCCH as shown in the second example, the UE is unable to recognize the absence (i.e., missing) of the last PDCCH because a DAI index of the last received PDCCH is identical to the number of received PDCCHs. Therefore, the UE recognizes that only two PDCCHs have been scheduled during the DL subframe. The UE transmits ACK/NACK information using PUCCH resources corresponding to DAI=2, such that the BS can recognize absence of a PDCCH including DAI=3.

Figure 8:
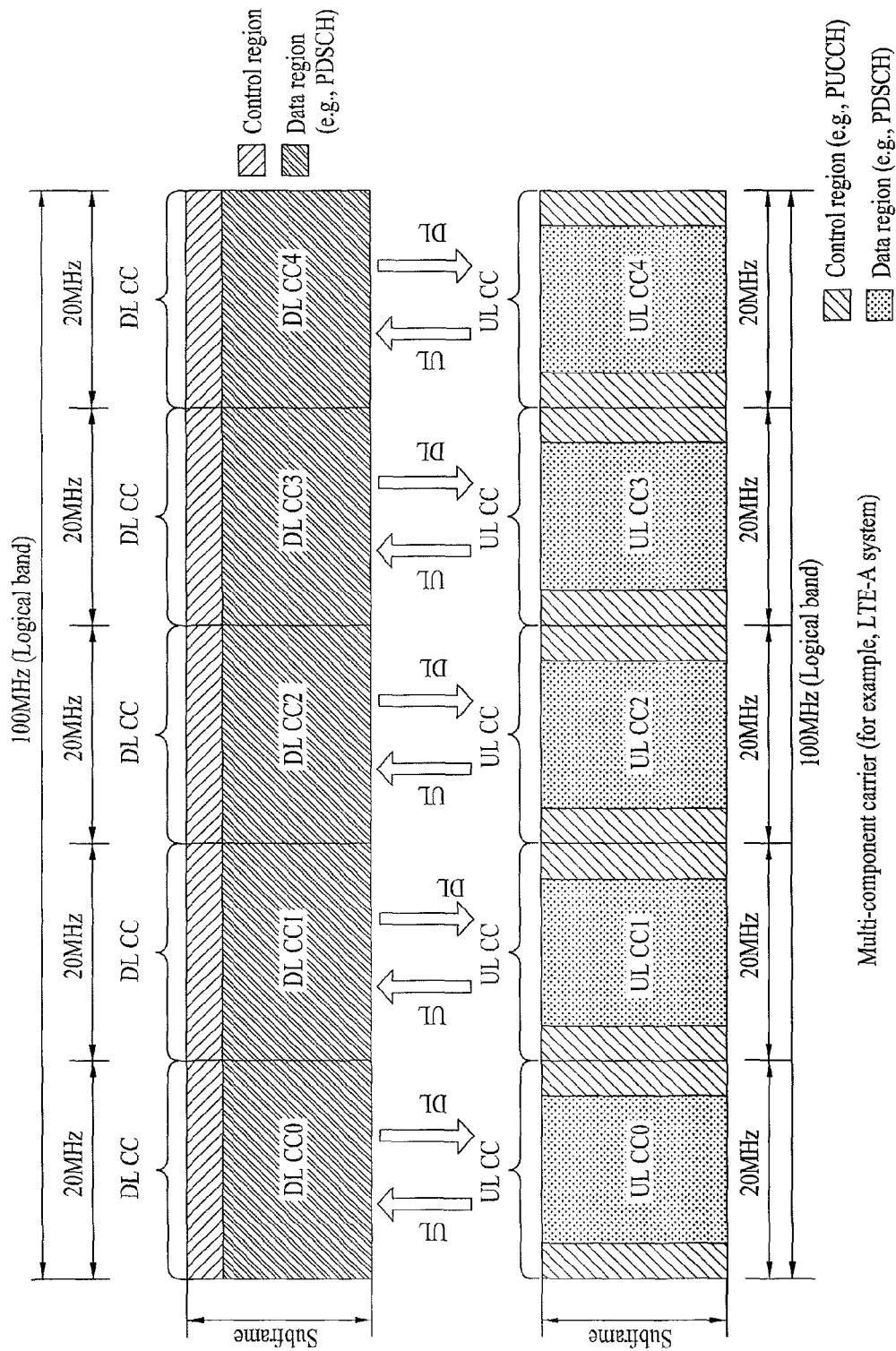
FIG. 8 exemplarily shows a carrier aggregation (CA) communication system.

FIG. 8 exemplarily shows a carrier aggregation (CA) communication system. The LTE-A system is designed to use a carrier aggregation or bandwidth aggregation technique using a plurality of UL/DL frequency blocks so as to use a wider frequency band. Each frequency block is transmitted using a component carrier (CC). The CC may be regarded as a carrier frequency (or center carrier, center frequency) for the frequency block.

Referring to FIG. 8, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

LTE-A uses the concept of a cell so as to manage radio resources. The cell is defined as a combination of DL resources and UL resources. Here, the UL resources are not an essential part. Accordingly, the cell can be configured with DL resources only, or DL resources and UL resources. When CA is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does not support CA while in an RRC_connected state, only one serving cell configured with a PCell exists. Conversely, for a UE that is in an RRC_Connected state and supports CA, one or more serving cells including a PCell and a SCell are provided. For CA, a network can configure one or more SCells for a UE that supports CA in addition to a PCell initially configured during a connection establishment procedure after an initial security activation procedure.

When cross-carrier scheduling (or cross-CC scheduling) is applied, a PDCCH for DL allocation can be transmitted through DL CC#0 and a PDSCH corresponding thereto can be transmitted through DL CC#2. For cross-CC scheduling, introduction of a Carrier Indicator Field (CIF) may be considered. The presence or absence of a CIF in a PDCCH can be set semi-statically and UE-specifically (or UE-group-specifically) according to higher layer signaling (e.g. RRC signaling). The base line of PDCCH transmission is summarized as follows.

CIF disabled: PDCCH on a DL CC allocates a PDSCH resource on the same DL CC or allocates a PUSCH resource on a linked UL CC.

CIF enabled: PDCCH on a DL CC can allocate a PDSCH or a PUSCH on a specific UL/DL CC from among a plurality of aggregated DL/UL CCs using the CIF.

When a CIF is present, a BS can allocate a PDCCH monitoring DL CC set in order to reduce BD complexity of a UE. The PDCCH monitoring DL CC set includes one or more DL CCs as part of aggregated DL CCs, and the UE detects/decodes a PDCCH only on DL CCs corresponding to the DL CC set. That is, if the BS schedules PDSCH/PUSCH for the UE, the PDCCH is transmitted only through a PDCCH monitoring DL CC set. The PDCCH monitoring DL CC set can be determined UE-specifically, UE-group-specifically or cell-specifically. The term "PDCCH monitoring DL CC" can be replaced by equivalent terms "monitoring carrier", "monitoring cell", etc. In addition, the term "aggregated CC" for a UE can be replaced by terms "serving CC", "serving carrier", "serving cell", etc.

Figure 9:
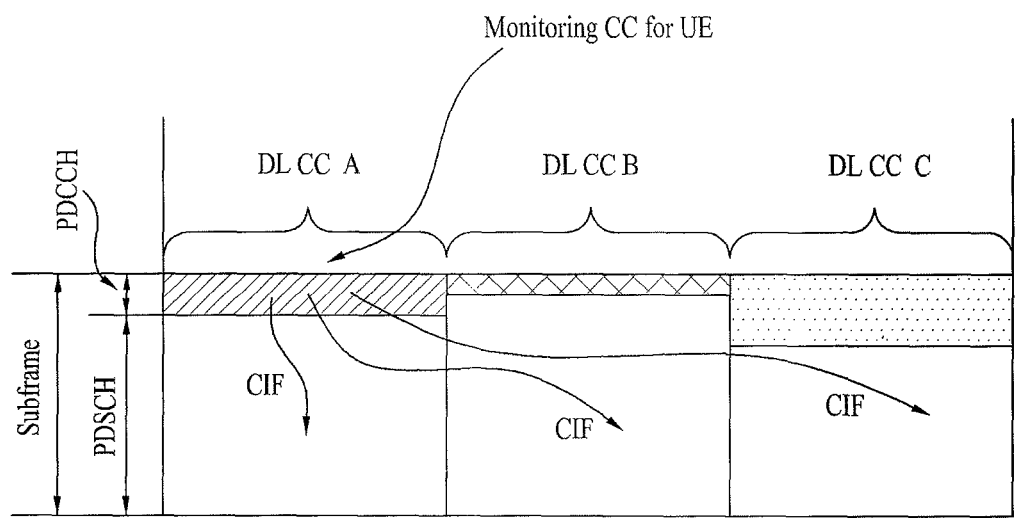
FIG. 9 exemplarily shows cross-carrier scheduling.

FIG. 9 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to a PDCCH monitoring DL CCs do not deliver PDCCHs.

LTE-A considers transmission of a plurality of ACK/NACK information/signals with respect to a plurality of PDSCHs, which are transmitted through a plurality of DL CCs, through a specific UL CC. To achieve this, it can be considered to joint-code (Reed-Muller code, Tail-biting convolutional code, etc.) a plurality of ACK/NACKs and transmit a plurality of ACK/NACK information/signals using PUCCH format 2, or a new PUCCH format (referred to as an Enhanced PUCCH (E-PUCCH) or PUCCH format M), distinguished from ACK/NACK transmission using PUCCH format 1a/1b in the legacy LTE system. The E-PUCCH format includes the following block-spreading based PUCCH format. After joint coding, ACK/NACK transmission using E-PUCCH format is exemplary, and E-PUCCH format may be used without being limited to UCI transmission. For example, E-PUCCH format may be used to transmit ACK/NACK, CSI (e.g. CQI, PMI, RI, PTI, etc.), SR, or two or more thereof. Accordingly, E-PUCCH format may be used to transmit joint-coded UCI codewords irrespective of type/number/size of UCI.

Figure 10:
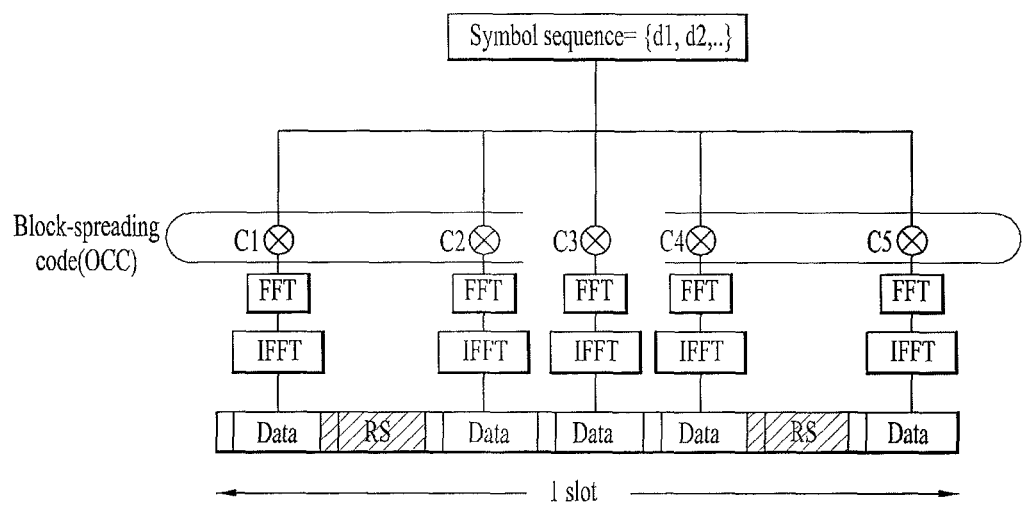
FIGS. 10 and 11 exemplarily show block-spreading based E-PUCCH formats.

FIG. 10 illustrates a block-spreading based E-PUCCH format (also called 'PUCCH format M') at a slot level. In the block-spreading based E-PUCCH format, one symbol sequence is transmitted over the frequency domain and UE multiplexing is performed using Orthogonal Cover Code (OCC) based time-domain spreading. That is, the symbol sequence is time-domain-spread using the OCC and transmitted. Control signals of a plurality of UEs can be multiplexed on the same RB using the OCC.

Referring to FIG. 10, 5 SC-FDMA symbols (i.e., UCI data part) are generated from one symbol sequence {d1, d2, ... } using a length-5 (Spreading Factor (SF)=5) OCC (C1, C2, C3, C4, C5). The symbol sequence {d1, d2, ... } may be a modulation symbol sequence or a codeword bit sequence. When the symbol sequence {d1, d2, ... } corresponds to the codeword bit sequence, the block diagram of FIG. 10 further includes a modulation block. In FIG. 10, while 2 RS symbols (i.e., RS) are used in one slot, it is possible to consider various applications including a scheme of using an RS part composed of 3 RS symbols and a UCI data part configured using an OCC with SF=4. Here, an RS symbol may be generated from a CAZAC sequence having a specific cyclic shift (CS). An RS may be transmitted in such manner that a specific OCC is applied to (multiplied by) a plurality of RS symbols in the time domain. Block-spread UCI is subjected to Fast Fourier Transform (FFT) and Inverse FFT (IFFT) for each SC-FDMA symbol and transmitted to a network. That is, the block-spreading scheme modulates control information using SC-FDMA, distinguished from PUCCH format 1 or 2a/2b of LTE.

Figure 11:
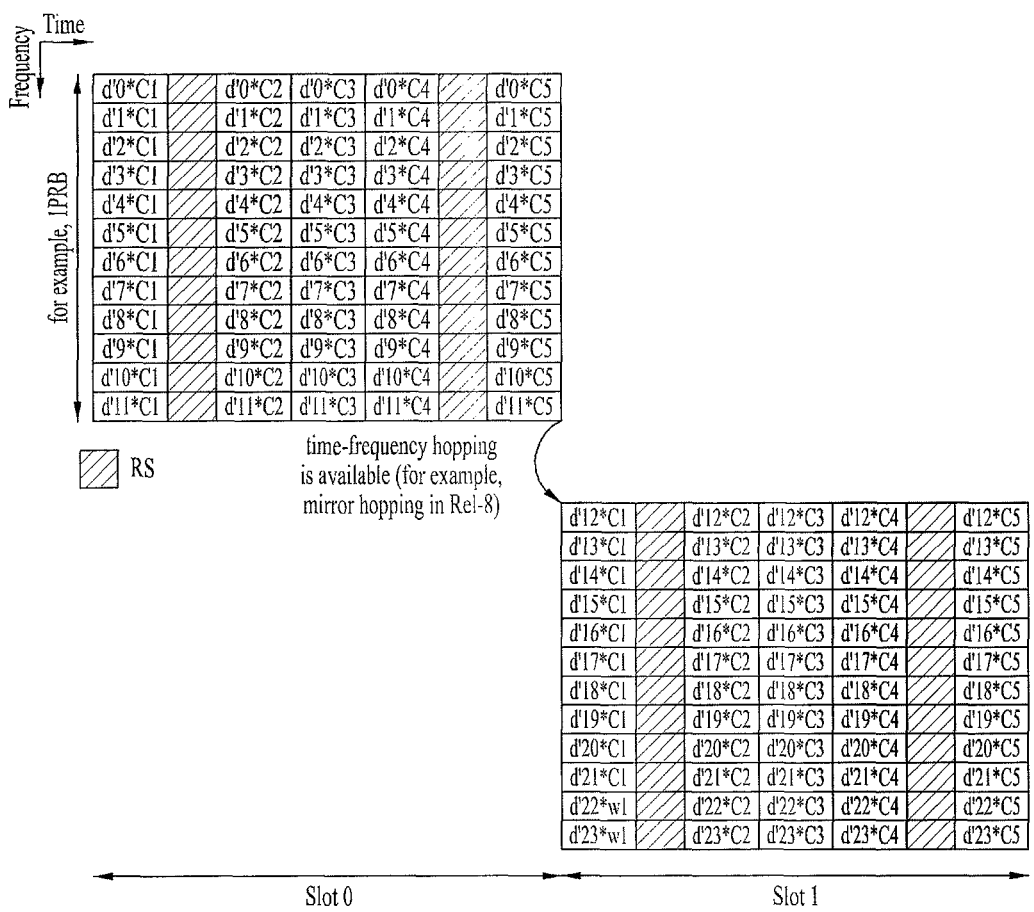

FIG. 11 illustrates a block-spreading based E-PUCCH format at a subframes level.

Referring to FIG. 11, in slot 0, symbol sequence {d'0, d'1, ..., d'11} is mapped to a subcarrier of one SC-FDMA symbol and mapped to 5 SC-FDMA symbols according to block spreading using OCC C1 to C5. Similarly, in slot 1, a symbol sequence {d'12, d'13, ..., d'23} is mapped to a subcarrier of one SC-FDMA symbol and mapped to 5 SC-FDMA symbols according to block-spreading using ODD C1 to C5. Here, symbol sequences {d'0, d'1, ..., d'11} and {d'12, d'13, ..., d'23} in slots 0 and 1 represent symbol sequence {d1, d2, ... }, shown in FIG. 11, which has been subjected to FFT or FFT/IFFT. When symbol sequence {d'0, d'1, ..., d'11} or {d'12, d'13, ..., d'23} corresponds to symbol sequence {d1, d2, ... } which has been subjected to FFT, IFFT is additionally applied to symbol sequence {d'12, d'13, ..., d'23} or {d'12, d'13, ..., d'23} in order to generate SC-FDMA symbols. The entire symbol sequence {d'0, d'1, ..., d'23} is generated by joint-coding one or more pieces of UCI, and the first half {d'0, d'1, ..., d'11} is transmitted through slot 0 and the remaining {d'12, d'13, ..., d'23} is transmitted through slot 1. The OCC may be changed based on slot and UCI data may be scrambled for each SC-FDMA symbol.

In the following, a channel-coding based UCI (e.g. a plurality of ACKNACKs) transmission scheme is referred to as "multi-bit UCI coding" transmission scheme for convenience of description. For example, the multi-bit UCI coding transmission scheme joint-codes PDSCHs of a plurality of DL cells and/or ACK/NACK signals or DTX information (indicating that no PDCCH is received/detected) with respect to PDCCHs that indicate Semi-Persistent Scheduling (SPS) release to generate a coded ACK/NACK block, and transmits the coded ACK/NACK block. If a UE receives 2 codewords by operating in a Single User-Multiple Input Multiple Output (SU-MIMO) mode in a DL cell, 4 feedback states of ACK/ACK, ACK/NACK, NACK/ACK, and NCK/NACK, or five feedback states additionally including DTX may be present for the cell. If the UE receives a single codeword, 3 feedback states of ACK, NACK and DTX may be present (2 feedback states of ACK and NACK/DTX may be present if NACK and DTX are equally processed). Accordingly, when the UE aggregates a maximum of 5 DL cells and operates in the SU-MIMO mode, a maximum of 55 feedback states may be present. Therefore, a required ACK/NACK payload size is at least 12 bits. If DTX and NACK are equally handled, the number of feedback states becomes 45 and the required ACK/NACK payload size is at least 10 bits.

M resources for PUCCH format may be explicitly given. In more detail, a PUCCH resource set is configured by a higher layer (e.g., RRC), and PUCCH resources to be actually used may be indicated by an ACK/NACK Resource Indicator (ARI) of the PDCCH.

Table 5 explicitly shows PUCCH resources for HARQ-ACK.

TABLE 5

| Value of HARQ-ACK resource for PUCCH (ARI) | $n_{PUCCH}$ |
|---|---|
| 00 | First PUCCH resource value configured by higher layer |
| 01 | Second PUCCH resource value configured by higher layer |
| 10 | Third PUCCH resource value configured by higher layer |
| 11 | Fourth PUCCH resource value configured by higher layer |

ARI represents an ACK/NACK resource indicator. In Table 5, the higher layer may include an RRC layer and an ARI value may be indicated by a PDCCH carrying a DL grant. For example, the ARI value may be designated using an SCell PDCCH and/or a Transmit Power Control (TPC) field of one or more PCell PDCCHs that do not correspond to a DAI initial value.

LTE-A classifies a method for simultaneously transmitting UCI and UL-SCH data into a first method for simultaneously transmitting PUCCH and PUSCH and a second method for simultaneously transmitting PUSCH and UCI in the same manner as in the legacy LTE. Information as to whether simultaneous transmission of PUCCH and PUSCH is allowed may be established by a higher layer. If simultaneous transmission of PUCCH and PUSCH is enabled, the first method is used. If simultaneous transmission of PUCCH and PUSCH is disabled, the second method is used.

Since the legacy LTE UE is unable to simultaneously transmit PUCCH and PUSCH, it multiplexes UCI to a PUSCH region when UCI (e.g., CQI/PMI, HARQ-ACK, RI, etc.) transmission is needed for a subframe via which PUSCH is transmitted. For example, provided that HARQ-ACK transmission is needed for a subframe to which PUSCH transmission is allocated, the UE multiplexes UL-SCH data and CQI/PMI prior to DFT spreading, and then simultaneously transmits control information and data over PUSCH.

Figure 12:
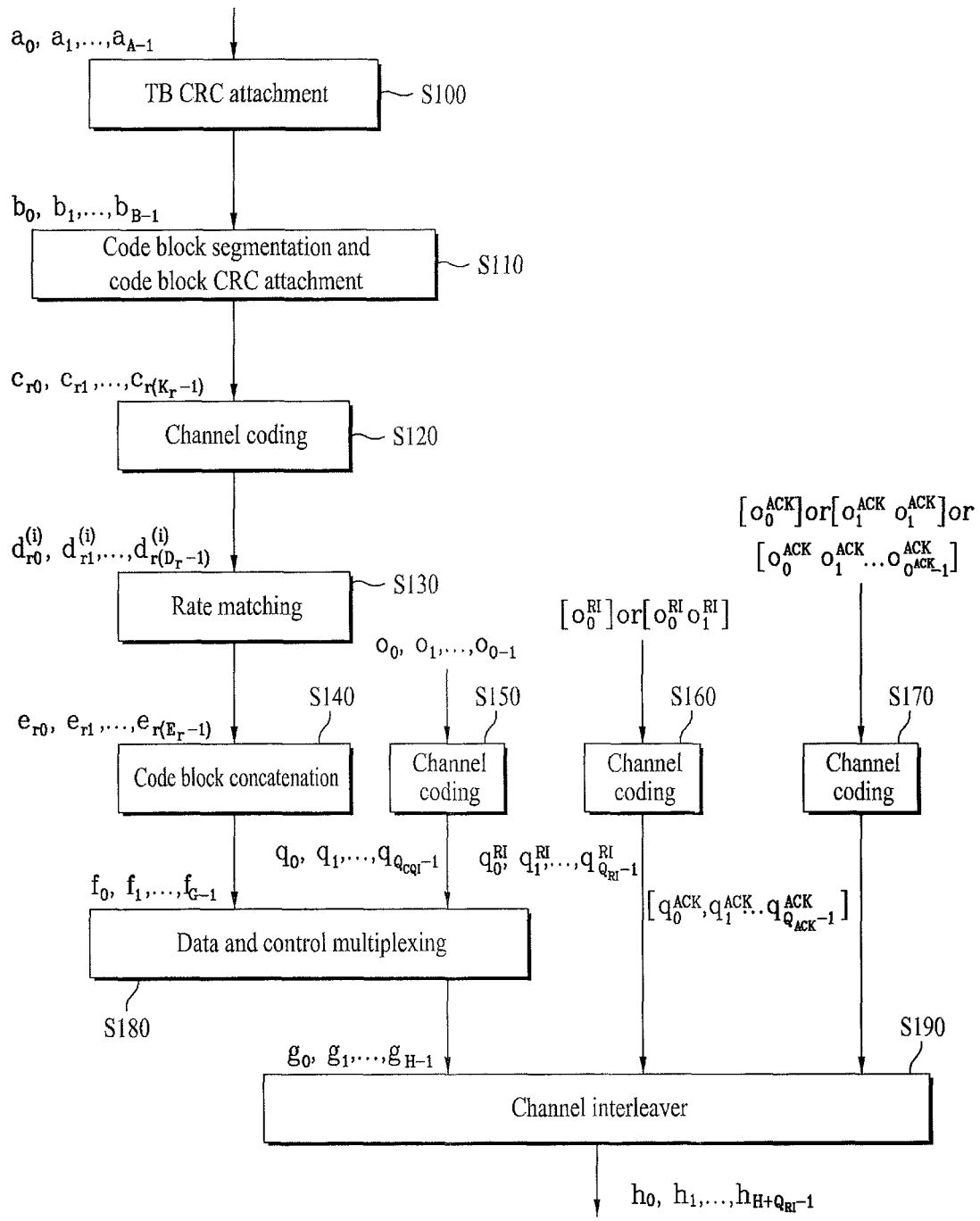
FIG. 12 is a flowchart illustrating a process for processing UL-SCH data and control information.

FIG. 12 is a flowchart illustrating a process for processing UL-SCH data and control information.

Referring to FIG. 12, error detection is provided to a UL-SCH transport block (TB) through Cyclic Redundancy Check (CRC) attachment at step S100.

All the transport blocks (TBs) are used to calculate CRC parity bits. Transport Block (TB) bits are denoted by $a_0, a_1, a_2, a_3, \ldots, a_{A-1}$. Parity bits are denoted by $p_0, p_1, p_2, p_3, \ldots, p_{L-1}$. The size of TBs is denoted by A, and the number of parity bits is denoted by L.

After performing transport block (TB) CRC attachment, code block segmentation and code block CRC attachment are performed at step S110. Input bits for code block segmentation are denoted by $b_0, b_1, b_2, b_3, \ldots, b_{B-1}$, where B denotes the number of bits of a TB (including CRC). Bits provided after code block segmentation are denoted by $c_{r0}, c_{r1}, c_{r2}, c_{r3}, \ldots, c_{r(K_r-1)}$, where r denotes a code block number (r=0, 1, ..., C-1) Kr denotes the number of bits of a code block (r), and C denotes a total number of code blocks.

Channel coding is performed after performing the code block segmentation and code block CRC attachment at step S120. Bits after channel coding are denoted by $d_{r0}^{(i)}, d_{r1}^{(i)}, d_{r2}^{(i)}, d_{r3}^{(i)}, \ldots, d_{r(D_r-1)}^{(i)}$, where i=0, 1, 2 $D_r$ is the number of bits of an i-th coded stream for the code block (r) (i.e., $D_r = K_r + 4$), r denotes a code block number (r=0, 1, ..., C−1), and Kr denotes the number of bits of a code block (r). C denotes a total number of code blocks. Turbo coding may be used for such channel coding.

Rate matching may be performed after channel coding at step S130. Bits provided after rate matching are denoted by $e_{r0}, e_{r1}, e_{r2}, e_{r3}, \ldots, e_{r(E_r-1)}$. $E_r$ is the number of rate-matched bits of the r-th code block (where r=0, 1, ..., C−1), and C is a total number of code blocks.

Code block concatenation is performed after rate matching at step S140. Bits provided after code block concatenation are denoted by $f_0, f_1, f_2, f_3, \ldots, f_{G-1}$. G denotes a total number of bits coded for data transmission. If control information is multiplexed with UL-SCH transmission, bits used for control information transmission are not included in 'G'. $f_0, f_1, f_2, f_3, \ldots, f_{G-1}$ may correspond to UL-SCH codewords.

In the case of UL control information (UCI), channel quality information (CQI and/or PMI), RI and HARQ-ACK are independently channel-coded. UCI channel coding is performed on the basis of the number of coded symbols for each piece of control information. For example, the number of coded symbols may be used for rate matching of the coded control information. In a subsequent process, the number of coded symbols may correspond to the number of modulation symbols or the number of REs.

HARQ-ACK channel coding is performed using an input bit sequence $[o_0^{ACK}]$, $[o_0^{ACK} o_1^{ACK}]$ or $[o_0^{ACK} o_1^{ACK} \ldots o_{O^{ACK}-1}^{ACK}]$ at step S170. $[o_0^{ACK}]$ and $[o_0^{ACK} o_1^{ACK}]$ denote 1-bit HARQ-ACK and 2-bit HARQ-ACK, respectively. In addition, $[o_0^{ACK} o_1^{ACK} \ldots o_{O^{ACK}-1}^{ACK}]$ denotes HARQ-ACK composed of two or more bits (i.e., $O^{ACK}>2$). ACK is coded into 1, and NACK is coded into 0. In the case of the 1-bit HARQ-ACK, repetition coding is used. In the case of the 2-bit HARQ-ACK, the (3,2) simplex code is used, and the encoded data may be cyclically repeated.

Table 6 exemplarily shows channel coding of the 1-bit HARQ-ACK, and Table 7 exemplarily shows HARQ-ACK channel coding.

TABLE 6

| $Q_m$ | Encoded HARQ-ACK |
|---|---|
| 2 | $[o_0^{ACK} y]$ |
| 4 | $[o_0^{ACK} y\ x\ x]$ |
| 6 | $[o_0^{ACK} y\ x\ x\ x\ x]$ |

TABLE 7

| $Q_m$ | Encoded HARQ-ACK |
|---|---|
| 2 | $[o_0^{ACK} o_1^{ACK} o_2^{ACK} o_0^{ACK} o_1^{ACK} o_2^{ACK}]$ |
| 4 | $o_0^{ACK} o_1^{ACK} x\ x\ o_2^{ACK} o_0^{ACK} x\ x\ o_1^{ACK} o_2^{ACK} x\ x$ |
| 6 | $[o_0^{ACK} o_1^{ACK} x\ x\ x\ x\ o_2^{ACK} o_0^{ACK} x\ x\ x\ x\ o_1^{ACK} o_2^{ACK} x\ x\ x\ x]$ |

In Tables 6 and 7, Qm is a modulation order. For example, Qm=2, Qm=4, and Qm=6 may correspond to QPSK, 16QAM, and 64QAM, respectively. $o_0^{ACK}$ may correspond to an ACK/NACK bit for the codeword 0, and $o_1^{ACK}$ may correspond to an ACK/NACK bit for the codword 1. $o_0^{ACK}$ is denoted by $o_2^{ACK}=(o_0^{ACK}+o_1^{ACK})$ mod 2, and 'mod' is a modulo operation. 'x' or 'y' is a place holder for maximizing a Euclidean distance of a modulation symbol carrying RI information when the HARQ-ACK bit is scrambled. Each of 'x' and 'y' is set to 0 or 1.

$Q_{ACK}$ is a total number of coded bits. Bit sequence $q_0^{ACK}, q_1^{ACK}, q_2^{ACK}, \ldots, q_{Q_{ACK}-1}^{ACK}$ is obtained by a combination of coded HARQ-ACK block(s). In order to set the length of bit sequence to $Q_{ACK}$, the finally-combined coded HARQ-ACK block may be a part not the entirety (i.e., rate matching). $Q_{ACK}$ is denoted by $Q_{ACK} = Q'_{ACK} \times Q_m$, $Q'_{ACK}$ is the number of coded symbols for HARQ-ACK, and $Q_m$ is a modulation order. $Q_m$ is established to be identical to UL-SCH data.

The inputs of a data and control multiplexing block (also called 'data/control multiplexing block') are coded UL-SCH bits denoted by $f_0, f_1, f_2, f_3, \ldots, f_{G-1}$ coded CQI/PMI bits denoted by $q_0, q_1, q_2, q_3, \ldots, q_{Q_{CQI}-1}$ at step S180. The outputs of the data and control multiplexing block are denoted by $g_0, g_1, g_2, g_3, \ldots, g_{H'-1}$. $g_i$ is a column vector of the length $Q_m$ (where i=0, ..., H'−1), H' is denoted by $H'=H/Q_m$, and H is denoted by $H=(G+Q_{CQI})$. H is the total number of coded bits allocated for UL-SCH data and CQI/PMI data.

The input of a channel interleaver includes output data $g_0, g_1, g_2, \ldots, g_{H'-1}$ of the data and control multiplexing block, the encoded rank indicators $q_0^{RI}, q_1^{RI}, q_2^{RI}, \ldots, q_{Q'_{RI}-1}^{RI}$ and coded HARQ-ACK data $q_0^{ACK}, q_1^{ACK}, q_2^{ACK}, \ldots, q_{Q'_{ACK}-1}^{ACK}$ at step S190. $g_i$ is a column vector of length $Q_m$ for CQI/PMI (where i=0, ..., H'−1, and H' is denoted by $H'=H/Q_m$), and $q_i^{ACK}$ is a column vector of length $Q_m$ for ACK/NACK (where i=0, ..., $Q'_{ACK}$−1, and $Q'_{ACK}=Q_{ACK}/Q_m$). $q_i^{RI}$ is a column vector of length $Q_m$ for RI (where i=0, ..., $Q'_{RI}$−1, and $Q'_{RI}=Q_{RI}/Q_m$).

The channel interleaver multiplexes control information and UL-SCH data for PUSCH transmission. In more detail, the channel interleaver includes a process of mapping control information and UL-SCH data to a channel interleaver matrix corresponding to PUSCH resources.

After execution of channel interleaving, the bit sequence $h_0, h_1, h_2, \ldots, h_{H+Q_{RI}-1}$ that is read row by row from the channel interleaver matrix is then output. The read bit sequence is mapped to a resource grid. $H''=H'+Q'_{RI}$ modulation symbols are transmitted through a subframe.

Figure 13:
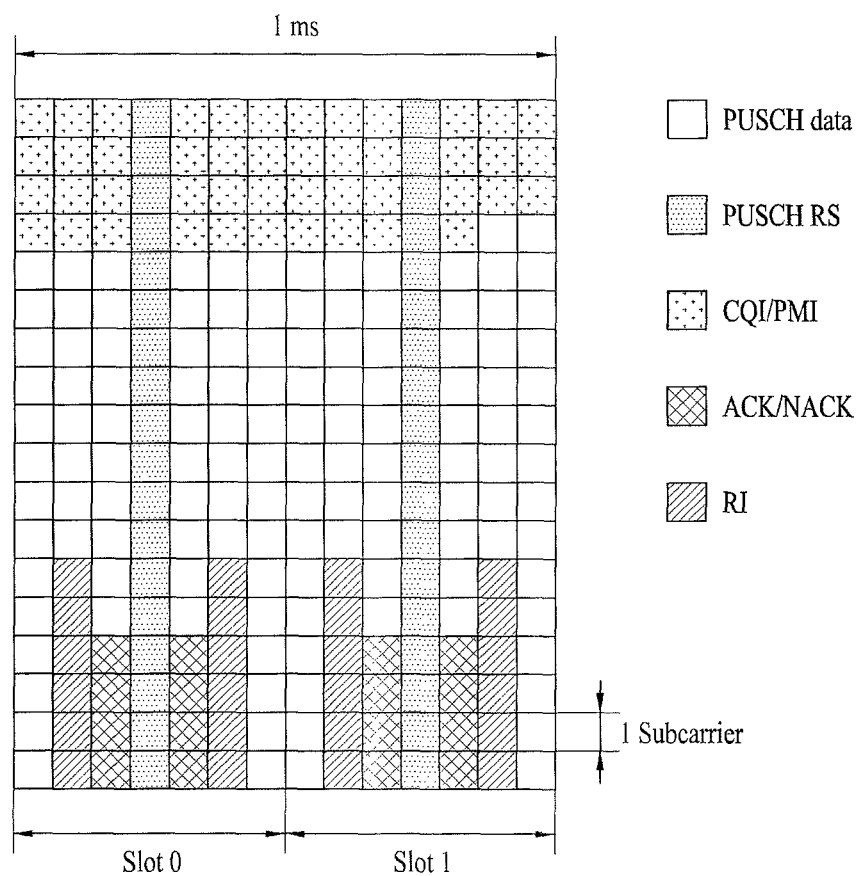
FIG. 13 is a conceptual diagram illustrating that control information and UL-SCH data are multiplexed on a Physical Uplink Shared CHannel (PUSCH).

FIG. 13 is a conceptual diagram illustrating that control information and UL-SCH data are multiplexed on a PUSCH. When transmitting control information in a subframe to which PUSCH transmission is allocated, the UE simultaneously multiplexes control information (UCI) and UL-SCH data prior to DFT spreading. The control information (UCI) includes at least one of CQI/PMI, HARQ ACK/NACK and RI. The number of REs used for transmission of each of CQI/PMI, ACK/NACK and RI is dependent upon Modulation and Coding Scheme (MCS) and offset values ($\Delta_{offset}^{CQI}$, $\Delta_{offset}^{HARQ-ACK}$, $\Delta_{offset}^{RI}$) assigned for PUSCH transmission. The offset values allow different coding rates according to control information, and are semi-statically established by an upper layer (e.g., RRC) signal. UL-SCH data and control information are not mapped to the same RE. Control information is mapped to be contained in two slots of the subframe.

Referring to FIG. 13, CQI and/or PMI (CQI/PMI) resources are located at the beginning part of UL-SCH data resources, are sequentially mapped to all SC-FDMA symbols on one subcarrier, and are finally mapped in the next subcarrier. CQI/PMI is mapped from left to right within each subcarrier (i.e., in the direction of increasing SC-FDMA symbol index). PUSCH data (UL-SCH data) is rate-matched in consideration of the amount of CQI/PMI resources (i.e., the number of encoded symbols). The modulation order identical to that of UL-SCH data may be used in CQI/PMI. ACK/NACK is inserted into some resources of the SC-FDMA mapped to UL-SCH data through puncturing. ACK/NACK is located close to RS, fills the corresponding SC-FDMA symbol from bottom to top (i.e., in the direction of increasing subcarrier index) within the SC-FDMA symbol. In case of a normal CP, the SC-FDMA symbol for ACK/NACK is located at SC-FDMA symbols #2 and #5 in each slot as can be seen from FIG. 13. Irrespective of whether ACK/NACK is actually transmitted in a subframe, the coded RI is located next to the symbol for ACK/NACK.

In LTE, control information (e.g., information about QPSK modulation) may be scheduled in a manner that the control information can be transmitted over PUSCH without UL-SCH data. Control information (CQI/PMI, RI and/or ACK/NACK) is multiplexed before DFT spreading so as to retain low CM (Cubic Metric) single-carrier characteristics. Multiplexing of ACK/NACK, RI and CQI/PMI is similar to that of FIG. 7. The SC-FDMA symbol for ACK/NACK is located next to RS, and resources mapped to the CQI may be punctured. The number of REs for ACK/NACK and the number of REs for RI are dependent upon reference MCS (CQI/PMI MCS) and offset parameter ($\Delta_{offset}^{CQI}$, $\Delta_{offset}^{HARQ-ACK}$, or $\Delta_{offset}^{RI}$). The reference MCS is calculated on the basis of CQI payload size and resource allocation. Channel coding and rate matching to implement control signaling having no UL-SCH data are identical to those of the other control signaling having UL-SCH data.

A method for efficiently transmitting uplink control information (UCI), preferably, ACK/NACK (also called HARQ-ACK), when multiple CCs (that are equivalent to carrier, carrier resource, frequency resource, cell, and the like) are aggregated in a TDD system, and a resource allocation method for the same will hereinafter be described in detail.

For convenience of description, if CC is set to a non-MIMO mode, it is assumed that a maximum of one transport block (TB) (where TB is equivalent to a codeword) can be transmitted at the subframe k of the corresponding CC. If CC is set to a MIMO mode, it is assumed that a maximum of m TBs (for example, two TBs or two codewords) can be transmitted at the subframe k of the corresponding CC. Information as to whether CC is set to the MIMO mode can be recognized using a transmission mode established by a higher layer. It is assumed that the number of ACK/NACK signals (i.e., ACK/NACK bits or HARQ-ARQ bits) of the corresponding CC is set to 1 (non-MIMO) or m (MIMO) according to a transmission mode established for the corresponding CC, irrespective of the number of actually transmitted TBs (or codewords).

Terms for use in the embodiments of the present invention will hereinafter be described in detail.

HARQ-ACK: HARQ-ACK indicates a reception response to DL transmission (e.g., PDSCH or SPS release PDCCH). That is, HARQ-ACK indicates ACK/NACK/DTX response (simply, ACK/NACK response). The ACK/NACK/DTX response indicates ACK, NACK, DTX or NACK/DTX. HARQ-ACK for a specific CC or HARQ-ACK of a specific CC indicates ACK/NACK response to a DL signal (e.g., PDSCH) related to the corresponding CC. For example, the DL signal may be scheduled to the corresponding CC). PDSCH may be replaced with a transport block (TB) or a codeword.

SPS release PDCCH: SPS release PDCCH indicates a PDCCH indicating SPS release. The UE feeds back ACK/NACK information related to the SPS release PDCCH through uplink.

SPS release PDCCH: Term "SPS release PDCCH" indicates a PDCCH indicating SPS release. The UE feeds back ACK/NACK information related to the SPS release PDCCH through uplink.

SPS PDSCH: Term "SPS PDSCH" indicates a PDSCH transmitted on downlink using resources semi-statically established by SPS. SPS PDSCH does not include a DL grant PDCCH corresponding thereto. In the embodiments of the present invention, SPS PDSCH may be interchangeably used with 'PDSCH w/o PDCCH'.

SPS PUSCH: Term "SPS PUSCH" indicates a PUSCH transmitted on downlink using resources semi-statically established by SPS. SPS PUSCH does not include a UL grant PDCCH. SPS PUSCH does not include a UL grant PDCCH corresponding thereto. In the embodiments of the present invention, SPS PUSCH may be interchangeably used with 'PUSCH w/o PDCCH'.

PUCCH index: PUCCH index corresponds to a PUCCH resource. For example, the term "PUCCH index" may indicate a PUCCH resource index. PUCCH resource index may be mapped to at least one of orthogonal cover (OC), cyclic shift (CS), and PRB.

ACK/NACK Resource Indicator (ARI): ARI is used to indicate a PUCCH resource. For example, ARI (configured by a higher layer) may be used to indicate a resource modification value (e.g., offset) for a specific PUCCH resource (group). In another example, ARI may also be used to indicate a specific PUCCH resource (group) index within a PUCCH resource (group) set (configured by a higher layer). ARI may be contained in a Transmit Power Control (TPC) field of a PDCCH corresponding to a PDSCH on an SCC. PUCCH power control may be carried out through a TPC field contained in a PDCCH (i.e., PDCCH corresponding to a PDSCH on a PCC) that schedules a PCC. In addition, AM may have an initial value of a downlink assignment index (DAI), and may be contained in a TPC field of the remaining PDCCHs other than a PDCCH scheduling a specific cell (e.g., PCell). ARI may be interchangeably used with a HARQ-ACK resource indication value.

Downlink Assignment Index (DAI): DAI may be contained in a DCI transmitted through a PDCCH. DAI may indicate an order value or counter value of a PDCCH. In the legacy LTE, DAI may be used for a TDD operation. For convenience of description, DAI of a DL grant PDCCH is referred to as DL DAI, and DAI of a UL grant PDCCH is referred to as UL DAI.

Implicit PUCCH resource: Implicit PUCCH resource may indicate a PUCCH resource/index linked to a minimum CCE index of a PDCCH scheduling a PDCC (See Equation 1).

Explicit PUCCH resource: Explicit PUCCH resource may be indicated by AM.

PDCCH for scheduling CC: "PDCCH for scheduling" may indicate a PDCCH for scheduling a PDSCH on the corresponding CC. That is, "PDCCH for scheduling" may indicate a PDCCH corresponding to a PDSCH on the corresponding CC.

PCC PDCCH: PCC PDCCH may indicate a PDCCH scheduling a PCC. That is, PCC PDCCH may indicate a PDCCH corresponding to a PDSCH on a PCC. If it is assumed that cross-carrier scheduling is not allowed for a PCC, PCC PDCCH is transmitted only on PCC.

SCC PDCCH: SCC PDCCH indicates a PDCCH scheduling an SCC. That is, SCC PDCCH may indicate a PDCCH corresponding to a PDSCH on SCC. If cross-carrier scheduling is allowed on SCC, SCC PDCCH may be transmitted on PCC. On the other hand, if cross-carrier scheduling is not allowed on SCC, SCC PDCCH may be transmitted only on SCC.

Cross-CC scheduling: Cross-CC scheduling indicates operations for scheduling/transmitting all PDCCHs only through a single PCC.

Non-cross-CC scheduling: Non-cross-CC scheduling indicates operations for scheduling/transmitting a PDCCH scheduling each CC through the corresponding CC.

Although LTE-A is designed to allow cross-carrier scheduling for a DL PCC, it is also designed to allow only self-carrier scheduling for a DL SCC. In this case, the PDCCH that schedules a PDSCH on a DL PCC may be transmitted only on a DL PCC. On the other hand, a PDCCH that schedules a PDSCH on a DL SCC may be transmitted on a DL PCC (cross-carrier scheduling), or may be transmitted only on the corresponding DL SCC (self-carrier scheduling).

Embodiment 1

A first embodiment (Embodiment 1) proposes a method for preventing ACK/NACK generation errors encountered when a UE has missed a PDCCH under carrier aggregation (CA) and FDD situation. In more detail, the first embodiment (Embodiment 1) provides a method for preventing ACK/NACK generation errors from occurring in a CA FDD system, using a DAI used in the legacy TDD. Embodiment 1 provides the following DAI configuration methods.

Method 1) Method 1 for indicating a total number of PDCCHs (or corresponding PDSCHs) transmitted to the corresponding UE through each PDCCH.

Figure 14:
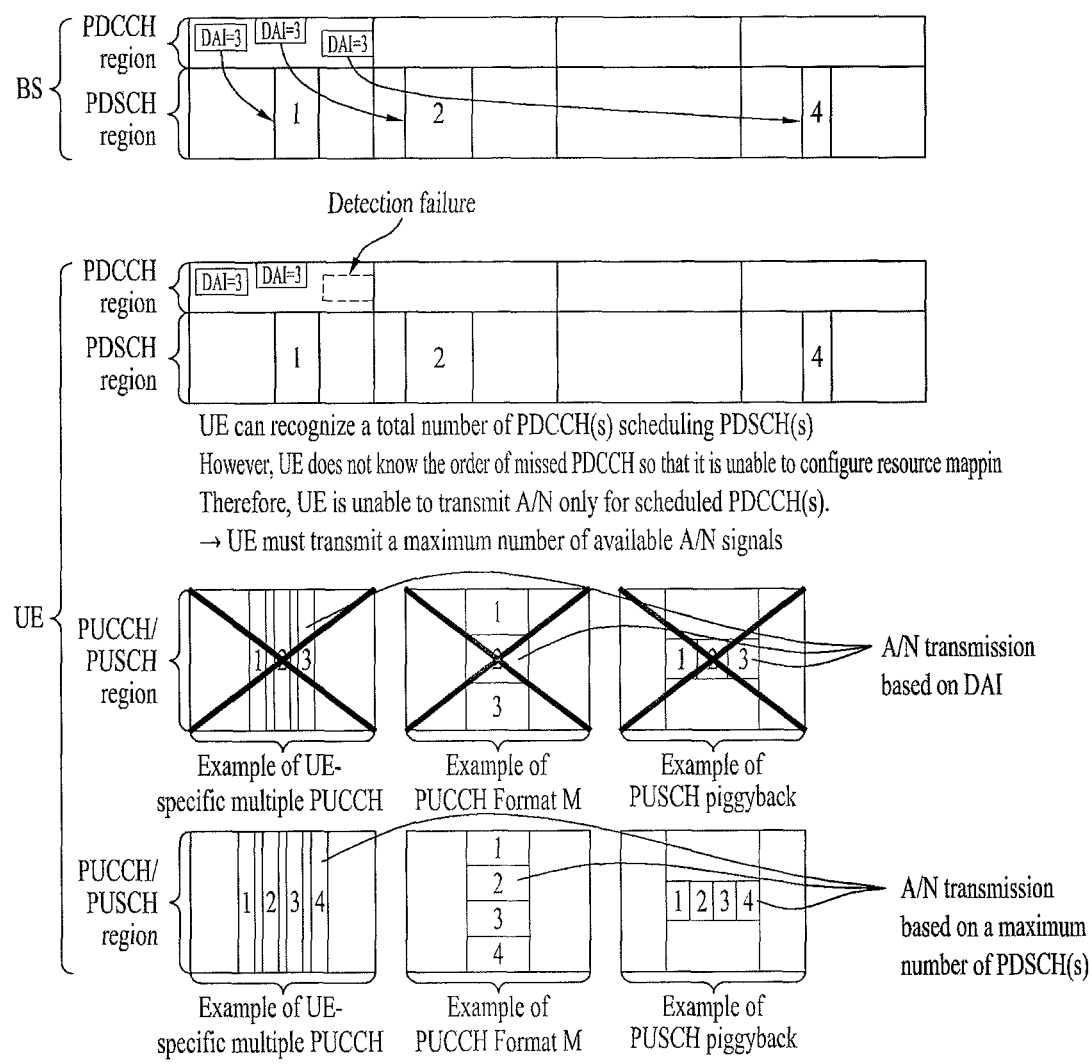

FIG. 14 exemplarily shows a method for transmitting ACK/NACK signals according to embodiments of the present invention.

Referring to FIG. 14, a base station (BS) may indicate a UE of a total number of PDCCHs that must be received by the corresponding UE over each PDCCH when one or more PDCCHs are transmitted to the UE on a single DL subframe (SF). Information about a total number of PDCCHs may be indicated by a DAI of a PDCCH. In this case, PDCCH may mean a PDCCH (i.e., DL grant PDCCH) for scheduling a PDSCH. For convenience of description, unless mentioned otherwise, PDCCH may mean a DL grant PDCCH. Therefore, the number of PDCCHs may be identical to the number of PDSCHs.

For example, provided that a BS transmits three PDCCHs to one UE within one DL subframe, the BS includes information of three PDCCH transmission onto all of three PDCCHs transmitted to the corresponding UE, and transmits the resultant PDCCHs. Therefore, if the UE has missed at least one PDCCH transmitted thereto, the UE can recognize PDCCH missing from information about the number of PDCCH(s) in another received PDCCH(s). In more detail, if the UE detects only two PDCCHs, the UE can recognize that the BS has transmitted three PDCCHs and the UE has received two PDCCHs.

However, the UE according to the present invention is unable to recognize which one of PDCCHs was missed by the UE. If ACK/NACK is transmitted through each PUCCH resource corresponding to each PDCCH, the BS can recognize a PDCCH missed by the UE because ACK/NACK is not transmitted on a PUCCH corresponding to the missed PDCCH. However, provided that ACK/NACK is transmitted only through one PUCCH resource, if the PUCCH resource is mapped to a PDCCH order or if the ACK/NACK position is mapped to the PDCCH order within the ACK/NACK payload, the UE is unable to recognize the order of missed PDCCH such that an error may occur in PUCCH resource allocation or ACK/NACK payload configuration. Similarly, assuming that ACK/NACK is transmitted through a PUSCH resource and the position of ACK/NACK within the ACK/NACK payload is mapped to the PDCCH order, errors may also occur in ACK/NACK payload configuration. Accordingly, the UE is unable to configure ACK/NACK resource mapping in case of a PDCCH detection failure. Here, ACK/NACK resource mapping (simply, resource mapping) may include an operation for mapping each ACK/NACK to a physical resource or ACK/NACK payload.

Therefore, for the present invention a method (Non-adaptive ACK/NACK transmission) for enabling a UE to reserve ACK/NACK resources corresponding to the number of PDSCHs capable of being maximally scheduled by a BS at a specific time, so as to cope with a PDCCH detection failure, may be considered. In this case, each ACK/NACK may be mapped within a physical resource or ACK/NACK payload in the order of CCs at which the corresponding PDSCH is located.

Method 2) Method for indicating the order value of PDCCH (or the counterpart PDSCH) transmitted to UE through each PDCCH.

Figure 15:
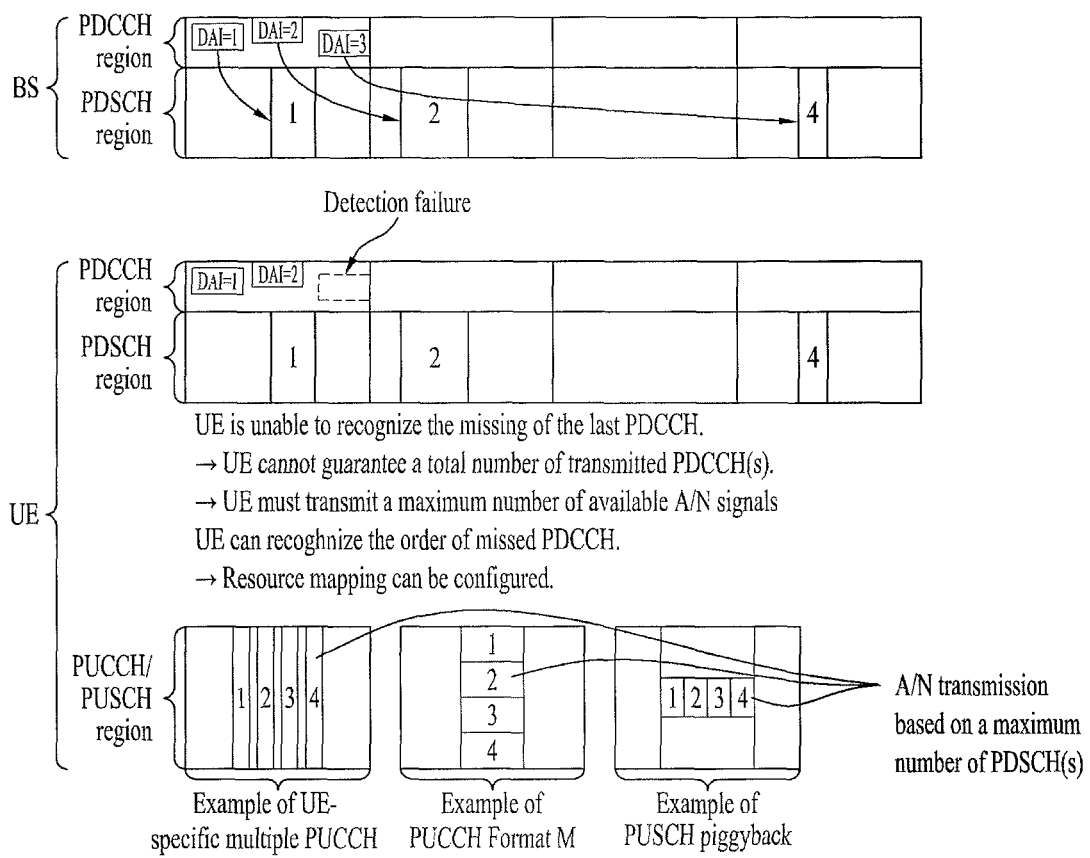

FIG. 15 exemplarily shows an ACK/NACK transmission process according to embodiments of the present invention.

Referring to FIG. 15, provided that a BS transmits one or more PDCCHs to a UE within one subframe, the BS may inform the UE of the order value of each PDCCH transmitted within the corresponding subframe. The PDCCH order value may be indicated by a DAI of a PDCCH. For example, provided that the BS transmits 3 PDCCHs to the UE within one subframe, the BS may indicate the value of 0, 1 or 2 (or 1, 2 or 3) through each PDCCH. The PDCCH order may be determined according to a CCE index, the frequency order of CC through which a PDSCH is transmitted, or the order of carrier indication field (CIF) values of CC.

According to the embodiments of the present invention, provided that a PDCCH having the order value of 0 and a PDCCH having the order value of 2 are detected, the UE can recognize not only the missing of PDCCH having the order value of 1 but also the missing of PDSCH corresponding to the PDCCH. In other words, differently from Method 1, the UE can recognize the order of detected PDCCH and the index of missed PDCCH.

However, provided that the UE has missed the last PDCCH, the order values of received PDCCHs are arranged in the order of 0 and 1, such that the UE is unable to recognize the missing of last PDCCH. That is, provided that the UE has missed the last contiguous PDCCH(s), the UE is unable to recognize how many PDCCHs are transmitted by the BS. In order to overcome the above-mentioned problem, the UE can transmit (bundled) ACK/NACK through a PUCCH resource corresponding to a CCE through which the last PDCCH is transmitted. For example, if the BS has allocated three PDCCHs to the UE and the UE has missed the last PDCCH, the UE transmits ACK/NACK information through a PUCCH corresponding to a second PDCCH. Since ACK information is transmitted through the PUCCH corresponding to the second PDCCH, instead of a PUCCH corresponding to the last PDCCH, the BS can recognize the absence of the last PDCCH.

In accordance with the present invention, the UE does not recognize a total number of transmitted PDSCHs (or a total number of PDCCHs for PDSCH scheduling), such that ACK/NACK resources may be preferably reserved according to the number of PDSCHs capable of being maximally scheduled. For example, as shown in the drawing, if a maximum of 4 PDSCHs can be scheduled, the UE can reserve/transmit ACK/NACK resources on the assumption that four PDSCHs are always transmitted (Non-adaptive ACK/NACK transmission).

Method 3) Method for indicating the order value of PDCCH (or the counterpart PDSCH) transmitted to UE and a total number of PDCCHs (or the counterpart PDSCHs) through each PDCCH.

The DAI transmission methods according to Method 1 and Method 2 must transmit ACK/NACK information in consideration of not only ACK/NACK information as to the actually scheduled PDSCH but also all the PDSCHs capable of being scheduled at the corresponding time. Therefore, in order to be robust against PDCCH detection failure error and to transmit ACK/NACK of actually scheduled PDSCH, the UE can be informed of not only a total number of PDCCHs (or corresponding PDSCHs) transmitted to one UE during a specific time interval but also the order value of each PDCCH (or each PDSCH), through each PDCCH. The order value of PDCCH and a total number of PDCCHs may be indicated through a DAI of PDCCH. According to the present invention, it may be possible to transmit only ACK/NACK of the actually transmitted PDCCH/PDSCH. In addition, in case that a PDCCH requiring acknowledgement of PDCCH detection exists, a total sum of PDCCHs (i.e., all PDCCHs causing a UL ACK/NACK response) and the order value of the corresponding PDCCH may be contained in a DAI of the corresponding PDCCH. A representative example of a PDCCH requiring acknowledgement of PDCCH detection is a PDCCH (i.e., SPS release PDCCH) indicating SPS release.

Here, a specific time interval may be a DL subframe corresponding to a UL subframe to which ACK/NACK is to be transmitted. For example, in case of the FDD system in which a DL subframe is mapped to a UL subframe on a one to one basis, the specific time interval may be one DL subframe. In case of the TDD system, the specific time interval may be a plurality of DL subframes.

Preferably, under an assumption that same number of PDCCH transmissions as a total sum of received PDCCHs, the UE can transmit ACK/NACK information (in case of a PDCCH requiring an ACK/NACK response to PDCCH detection, ACK/NACK information as to PDCCH reception) of PDSCH(s) scheduled by the corresponding PDCCH(s).

Figure 16:
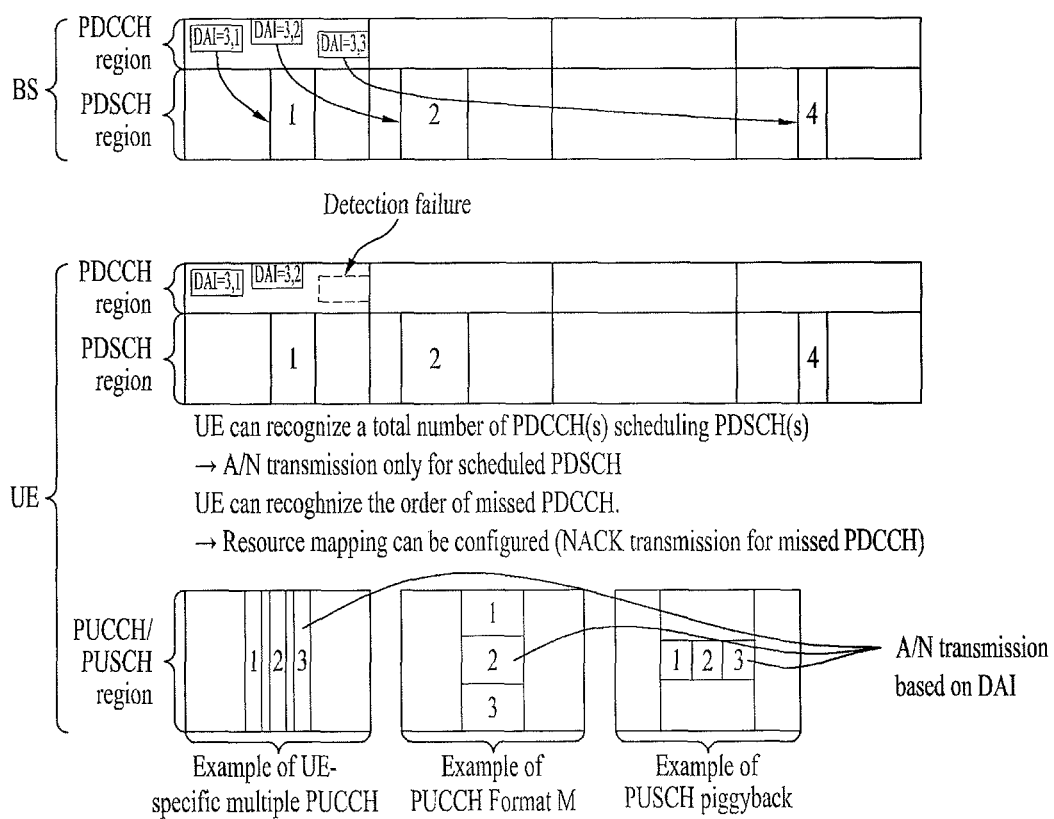

FIG. 16 exemplarily shows the ACK/NACK transmission process according to the present invention. In FIG. 16, provided that a maximum of 4 PDSCHs can be scheduled, the BS transmits a total of 3 PDCCHs and schedules a total of 3 PDSCHs, and the UE misses the last PDCCH.

Referring to FIG. 16, the UE can recognize a total sum of PDCCHs, such that it can recognize the absence of one PDCCH and non-reception of the order value of 3. As a result, the UE can recognize that the missed PDCCH is the last PDCCH. The UE may determine the ACK/NACK payload size in consideration of not only a total number of PDCCHs (or a total number of corresponding PDSCHs) but also a transmission mode of the corresponding CC, and may configure the ACK/NACK payload in consideration of the missed PDCCH. For example, the transmission mode may be a single transport block transmission mode (i.e., non-MIMO mode) or multiple-transport blocks transmission mode (i.e., MIMO mode), and may configure the ACK/NACK payload in consideration of the missed PDCCH. If the CC is in a non-MIMO mode, 1-bit ACK/NACK information may be generated. If the CC is in a MIMO mode, 2-bit ACK/NACK information may be generated.

For convenience of description, as shown in Method 1 and Method 2, a method for transmitting ACK/NACK information as to all PDSCHs (PDCCHs requiring an ACK/NACK response to PDCCH reception) capable of being scheduled is referred to as non-adaptive ACK/NACK transmission. In case of non-adaptive ACK/NACK transmission, it may be necessary to utilize unnecessary resources during ACK/NACK transmission, and it is impossible to efficiently reduce a code rate due to an increase of unnecessary ACK/NACK information bits. In contrast, as shown in Method 3, a method for adaptively transmitting the number of ACK/NACK signals using correct information or upper limit information as to the number of scheduled PDSCHs (and PDCCHs requiring an ACK/NACK response to PDCCH reception) is referred to as adaptive ACK/NACK transmission. In this case, the number of scheduled PDCCHs may be equivalent to the number of DL subframes requiring ACK/NACK feedback.

Information as to which one of non-adaptive ACK/NACK transmission and adaptive ACK/NACK transmission is to be used can be dynamically determined according to whether the UE can use information of the number of scheduled PDSCHs (and PDCCHs requiring an ACK/NACK response to PDCCH reception). For example, it is assumed that information as to the number of scheduled PDSCHs (and PDCCHs requiring an ACK/NACK response to PDCCH reception) is transmitted through a PDCCH (i.e., a UL grant PDCCH (e.g., via a DL DAI field)) scheduling a PUSCH. In this case, assuming that ACK/NACK is transmitted through a PUCCH or a PUSCH w/o PDCCH (e.g., SPS PUSCH), non-adaptive ACK/NACK transmission may be utilized. In other words, provided that ACK/NACK is transmitted over a PUSCH with a PDCCH, adaptive ACK/NACK transmission may be utilized.

Embodiment 2

The following two schemes may be used for ACK/NACK transmission.

Full ACK/NACK scheme: The full ACK/NACK scheme can transmit a plurality of ACK/NACK signals corresponding to a maximum number of codewords (CWs) capable of being transmitted through all CCs assigned to the UE and a plurality of DL subframes (i.e., SF n–k(k∈K)).

Bundled ACK/NACK scheme: The bundled ACK/NACK scheme can reduce the number of all transmission ACK/NACK bits using at least one of CW bundling, CC bundling, and subframe (SF) bundling and transmit the ACK/NACK bits.

The CW bundling may applies ACK/NACK bundling to each CC for each DL SF. The CC bundling applies ACK/NACK bundling to all or some of CCs for each DL SF. SF bundling applies ACK/NACK bundling to all or some of DL SFs for each CC. ACK/NACK bundling means a logical AND operation performed on a plurality of ACK/NACK responses.

In the case of SF bundling, it is possible to additionally consider "ACK-counter" scheme that indicates the number of ACKs (or the number of some of the ACKs) for each CC for all PDSCHs or DL grant PDCCHs received for each CC through ACK/NACK bundling.

If a PUSCH is present at the ACK/NACK transmission time point of the legacy LTE, the legacy LTE punctures (and/or rate-matches) UL-SCH data payload, and multiplexes ACK/NACK information with UL-SCH data, such that it transmits the multiplexed result over a PUSCH instead of a PUCCH (i.e., ACK/NACK piggyback).

If a PUSCH is present at the ACK/NACK transmission time point of the CA based FDD system, and if it is impossible to simultaneously transmit a PUSCH and a PUCCH, a method for piggybacking either a bundled ACK/NACK (e.g., a method for indicating the CW bundling or the number of received ACK signals) or only ACK/NACK of a specific CC on a PUSCH, and transmitting the piggybacked result may be used to reduce puncturing loss of PUSCH data. In addition, if a PUSCH exists in the ACK/NACK transmission time point of the CA based FDD system, and if a PUSCH and a PUCCH can be simultaneously transmitted in the CA based FDD system, a method for transmitting ACK/NACK information over a PUCCH, and at the same time piggybacking a full or bundled ACK/NACK (e.g., a method for indicating the CW bundling or the number of received ACK signals) or only ACK/NACK information of a specific CC (e.g., PCC) on a PUSCH may be used to increase the reliability of ACK/NACK transmission. If ACK/NACK is piggybacked on a PUSCH, ACK/NACK bundling (e.g., CW bundling) may be mandatorily used. Alternatively, information as to whether ACK/NACK bundling (e.g., CW bundling) is applied during the ACK/NACK piggyback may be established through RRC or L1/L2 signaling.

In case of the CA based LTE-A TDD system, multiple ACK/NACK information pieces/signals of multiple PDSCHs on multiple DL subframes and several CCs may be transmitted through a specific CC (i.e., primary CC) at a UL subframe corresponding to the corresponding multiple DL subframes. The CA based LTE-A TDD system may piggyback full or bundled ACK/NACK on a PUSCH when a PUSCH exists in the ACK/NACK transmission time, and transmit the piggybacked result. In this case, if the full or bundled ACK/NACK payload is increased in size due to many CCs, many CWs and/or many DL SFs, ACK/NACK bits or symbols piggybacked on a PUSCH are increased in number, such that there may be a high possibility of causing the loss of UL-SCH data throughput.

Therefore, the present invention provides a method for allowing a UE to efficiently transmit ACK/NACK information in the CA based TDD system. In more detail, in order to adaptively reduce/decide the size of ACK/NACK payload piggybacked on a PUSCH in the CA based TDD system, the present invention provides a method for indicating ACK/NACK payload information to be piggybacked on a PUSCH through a PDCCH (i.e., UL grant PDCCH) scheduling a PUSCH. The following Method 1 and Method 2 may be used in the present invention.

Method 1) Method 1 can indicate the first or last DL SF index in which at least one PDSCH (or DL grant PDCCH) is scheduled/transmitted for all the DL CCs.

Method 2) Method 2 can indicate the first or last DL CC index in which at least one PDSCH (or DL grant PDCCH) is scheduled/transmitted for all the DL SFs.

Method 3) Method 3 can indicate the first or last ACK/NACK group in which at least one PDSCH (or DL grant PDCCH) is scheduled/transmitted. The ACK/NACK group may correspond to a DL CC group, a DL SF group or a combination thereof.

Method 4) Method 4 can indicate an ACK/NACK group to be used for ACK/NACK payload configuration. The ACK/NACK group may correspond to a DL CC group, a DL SF group or a combination thereof.

In the present invention, PDSCH or DL grant PDCCH may include PDSCH or PDCCH requiring ACK/NACK response, and may further include a PDCCH that indicates SPS release.

If ACK/NACK is piggybacked on a PUSCH in the CA based TDD system (irrespective of the presence or absence of CW bundling during PUCCH ACK/NACK transmission), CW bundling may be mandatorily applied. Alternatively, information as to whether CW bundling is applied during ACK/NACK piggyback may be established through RRC or L1/L2 signaling. In more detail, two states indicating whether CW bundling is applied during ACK/NACK piggyback, and/or one state indicating the absence of ACK/NACK to be piggybacked can be indicated using a DAI field (e.g., 2 bits) contained in the UL grant PDCCH. The above-mentioned method will hereinafter be referred to as Method 0.

Method 1) First or Last PDSCH (PDCCH)-scheduled DL SF indication.

Method 1 can inform a UE of the first DL SF index (F-SF index) or the last DL SF index (L-SF index) in which at least one PDSCH (or DL grant PDCCH) is scheduled/transmitted for a DL SF group corresponding to a UL SF, on the basis of a DL SF index. F-SF index or L-SF index indication information may be indicated through a PDCCH scheduling a PUSCH on the corresponding UL SF. In this case, a PDSCH (e.g., SPS PDSCH) transmitted without using a PDCCH is used as the scheduling information known to both the BS and the UE, such that the corresponding scheduling information may be excluded from a PDSCH that decides F-SF or L-SF index. In more detail, when indicating the F-SF index, ACK/NACK payload can be configured only for DL subframes ranging from the F-SF index to the last SF index. Similarly, when indicating the L-SF index, ACK/NACK payload can be configured for DL subframes ranging from the first SF index to the L-SF index.

In addition, DL SF index information may be transmitted through a DAI field contained in a UL grant PDCCH. The UL grant PDCCH may include "no-PDSCH-state" indication information that indicates the absence of PDSCH (or DL grant PDCCH) scheduling/transmission in the entire DL SF group corresponding to a UL SF. The "no-PDSCH-state" indication information may be transmitted through the DAI field of the UL grant PDCCH. In this case, DL SF index information and "no-PDSCH-state" indication information may be distinguished from each other by different bits of the DAI field or different DAI states, or may share a specific DAI state. Specifically, if F-SF and L-SF from among several DL SF indexes are present, DL SF having the lowest/highest index from among the corresponding DL SF indexes may be indicated by F/L-SF index.

Figure 17:
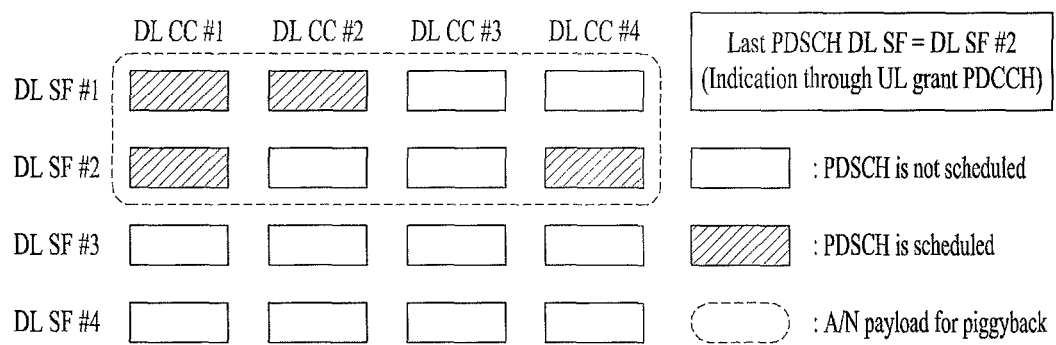

FIG. 17 exemplarily shows the ACK/NACK transmission process according to the present invention. FIG. 17 assumes a TDD system in which 4 CCs are aggregated and the ratio of DL SF and UL SF is denoted by "DL SF:UL SF=4:1". Referring to FIG. 17, L-SF in which at least one PDSCH is scheduled/transmitted is transmitted to a UE through a UL grant PDCCH. In this example, L-SF index may indicate DL SF #2. Specifically, considering a 2-bit DAI to indicate the L-SF index, "L-SF index=DL SF #4" may be indicated on the condition that DL SF #3 or #4 is L-SF.

In accordance with another scheme, a method for indicating each DL SF index in which at least one PDSCH (or DL grant PDCCH) is scheduled/transmitted, in the form of a bitmap may be used.

Meanwhile, the present invention may further provide a method for informing a UE of a DAI-counter for each DL CC using the DAI field contained in the DL grant PDCCH in a similar way to the legacy LTE TDD.

DAI-counter (i.e., DL DAI):

DAI-counter (DL DAI) may indicate the order of a PDSCH or DL grant PDCCH scheduled on the basis of the order of DL SF. That is, the DAI-counter value may indicate an accumulative value (i.e., a counting value) of PDCCH(s) corresponding to PDSCH(s) and PDCCH(s) indicating DL SPS release in the range extended to a current subframe within DL subframe(s) n-k (k∈K). Meanwhile, the order indicated by the DAI-counter may be excluded from a PDSCH (e.g., SPS PDSCH) transmitted without using a PDCCH. The DAI-counter value may start from 0 or 1, or may start from an arbitrary number. For convenience of description, it is assumed that the DAI-counter value starts from 0. For example, if a PDSCH is scheduled through DL SF #1 and DL SF #3, the DAI-counter value contained in a PDCCH that schedules the corresponding PDSCH may be signaled by 0 and 1 (or 1 and 2). In case of the 2-bit DAI-counter, the modulo 4 operation may be applied to the DAI-counter value of more than 3.

Simultaneously, a maximum value (i.e., maxPDCCH-perCC) (that is equivalent to the number of DL subframes requiring ACK/NACK feedback) from among a PDSCH (or a PDCCH, preferably including a PDCCH indicating SPS release) scheduled/transmitted per DL CC can be indicated through a PDCCH scheduling a PUSCH. The above-mentioned method is referred to as Method 1-A. In accordance with the present invention, if ACK/NACK is transmitted through a PUCCH or SPS PUSCH, the corresponding PDCCH does not exist so that it is impossible to inform the UE of 'maxPDCCHperCC' information. In this case, 'maxPDCCHperCC' may be set to M. M is a total number of DL subframes corresponding to UL subframes to which ACK/NACK is transmitted. M may be defined as shown in Table 4 according to UL-DL configuration.

Preferably, PDSCH without PDCCH (for example, SPS PDSCH) indicates scheduling information known to both the BS and the UE, such that SPS PDSCH may be excluded from objective information as necessary. More preferably, considering an exemplary case in which only a DL DAI field of the PDCCH scheduling a PCC is used for other usages (e.g., the DL DM field of the PDCCH is adapted to indicate/move ACK/NACK resources) but not the DAI-counter, a maximum value from among numbers of per-CC scheduled/transmitted PDSCHs in association with only a DL CC other than a PCC may be indicated by a PDCCH scheduling a PUSCH.

In more detail, the UE may configure per-cell ACK/NACK payload in association with PDSCHs (or PDCCHs) corresponding to the range from a DAI-counter initial value to 'maxPDCCHperCC-1' (where the DAI-counter starts from '0') or 'maxPDCCHperCC' (where the DAI-counter starts from '1'). Individual ACK/NACKs may be sequentially located in per-CC ACK/NACK payload according to the DAI-counter value of the corresponding PDCCH. Each bit that does not include the corresponding DAI-counter value in the ACK/NACK payload may be set to a value of NACK, DTX or NACK/DTX. Per-CC ACK/NACK payload may be sequentially concatenated according to CC indexes, such that it may be composed of the entire ACK/NACK payload.

Preferably, in order to prevent inconsistency in numbers/positions of ACK/NACK bits between the UE and the BS, the ACK/NACK bits for constructing per-CC ACK/NACK payload may be determined depending on not only a transmission mode (i.e., a maximum number of CWs capable of being transmitted) per DL CC but also the presence or absence of CW bundling per DL CC. For example, if a transmission mode established in a CC supports transmission of a single transport block (TB) or employs bundling, the number of ACK/NACK bits for the corresponding CC may be given as "2×{the number of subframes (or PDSCHs) where the UE must perform ACK/NACK feedback}". In contrast, provided that a transmission mode established in a CC supports transmission of two TBs and does not employ bundling, the number of ACK/NACK bits for the corresponding CC may be given as the number of subframes (or PDSCHs) where the UE must perform ACK/NACK feedback.

'maxPDCCHperCC' information may be transmitted through a DAI field (i.e., UL DAI) contained in a UL grant PDCCH. Considering the use of 2-bit DAI, the modulo 4 operation may be applied to 'maxPDCCHperCC' value of more than '3'.

In brief, the entire ACK/NACK payload size can be adjusted using the UL DAI value. In more detail, the size of per-CC ACK/NACK payload (also called 'ACK/NACK part') for each DL CC can be determined considering a UL DAI value, a transmission mode of the corresponding CC, and the presence or absence of bundling. In addition, the position of each ACK/NACK in per-CC ACK/NACK payload can be determined using DL DAI value(s) received at each DL CC.

In more detail, it is assumed that the HARQ-ACK feedback bit for the c-th DL CC (or serving cell) is defined as $o_{c,0}^{ACK} o_{c,1}^{ACK}, \ldots, o_{c,O_c^{ACK}-1}^{ACK}$ (where c≥0). $O_c^{ACK}$ is the number (i.e., size) of HARQ-ACK payload bits for the c-th DL CC. If a transmission mode for supporting single transmission block (TB) transmission is established in the c-th DL CC or if the spatial bundling is applied to the c-th DL CC, $O_c^{ACK}$ may be identical to $B_c^{DL}$ as denoted by $O_c^{ACK}=B_c^{DL}$. In contrast, if a transmission mode for supporting transmission of multiple transmission blocks (e.g., two TBs) is established in the c-th DL CC or if no spatial bundling is applied to the c-th DL CC, $O_c^{ACK}$ may be identical to $2B_c^{DL}$ as denoted by $O_c^{ACK}=2B_c^{DL}$. $B_c^{DL}$ is the number (i.e., maxPDCCHperCC) of DL subframes requiring ACK/NACK feedback in the c-th DL CC. If HARQ-ACK is transmitted through 'PUSCH w/ PDCCH', maxPDCCHperCC may be indicated by the value of a UL-DAI field. In contrast, if HARQ-ACK is transmitted through a PUCCH or PUSCH w/o PDCCH, maxPDCCHperCC is denoted by M (i.e., mxPDCCHperCC=M).

If a transmission mode for supporting transmission of a single transmission block is established in the c-th DL CC, or if spatial bundling is applied to the c-th DL CC, the ACK position of each ACK/NACK in per-CC HARQ-ACK payload is given as $o_{c,DAI(k)-1}^{ACK}$. DAI(k) indicates a DL DAI value of the PDCCH detected at the DL subframe (n-k). In contrast, if a transmission mode for supporting transmission of multiple transmission blocks (e.g., two transmission blocks) is established in the c-th DL CC and no spatial bundling is applied to the c-th DL CC, the position of each ACK/NACK in per-CC HARQ-ACK payload is denoted by $o_{c,2DAI(k)-2}^{ACK}$ and $o_{c,2DAI(k)-1}^{ACK}$. $o_{c,2DAI(k)-2}^{ACK}$ is a HARQ-ACK for the codeword 0, and $o_{c,2DAI(k)-1}^{ACK}$ is a HARQ-ACK for the codeword 1.

Figure 18:
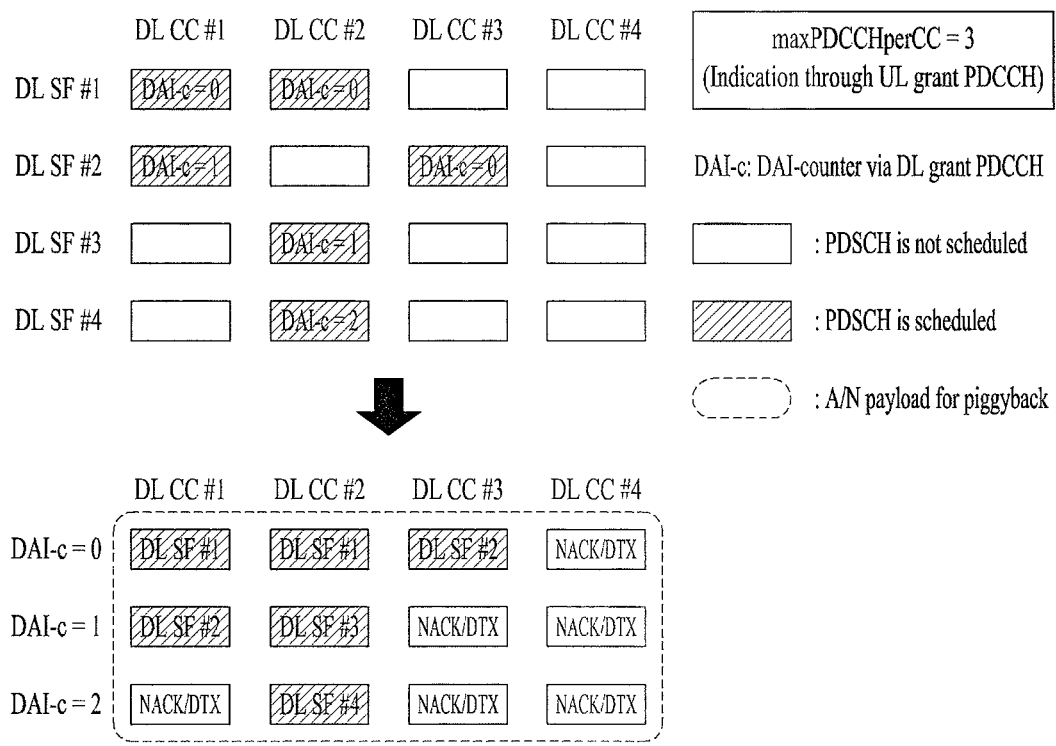

FIG. 18 exemplarily shows the ACK/NACK transmission process according to the present invention. FIG. 18 assumes a TDD system in which 4 CCs are aggregated and the ratio of DL SF and UL SF is denoted by "DL SF:UL SF=4:1", and 'maxPDCCHperCC' is indicated under a TDD situation. Referring to FIG. 18, the number of PDSCHs scheduled/ transmitted for DL CC #1, #2, #3, or #4 is 2, 3, 1, or 0, respectively. A maximum value (i.e., maxPDCCHperCC=3) from among these values may be indicated by a UL grant PDCCH. The UE may configure ACK/NACK payload not only for a PDSCH ranging from an initial value for each DL CC to a DAI-counter value (i.e., DAI-c) corresponding to (maxPDCCHperCC−1=2), but also for associated ACK/NACK positions. In this case, the ACK/NACK position including no DAI-counter value may be NACK- or DTX-processed as shown in FIG. 18. For example, if a PDCCH including the corresponding DAI-counter value is not received, or if maxPDCCHperCC is higher than a maximum value of the DAI-counter, the ACK/NACK position information can be NACK- or DTX-processed.

In Method 1-A, if 'maxPDCCHperCC' is determined without using 'PDSCH w/o PDCCH' (e.g., SPS PDSCH), the ACK/NACK payload size can be more reduced than the other ACK/NACK payload size obtained when 'maxPDCCHperCC' is determined in consideration of 'SPS PDSCH'. In more detail, the UE may configure ACK/NACK payload not only for a PDSCH (or PDCCH) ranging from an initial value for each DL CC to a DAI-counter value (i.e., DAI-c) corresponding to 'maxPDCCHperCC−1' (where the DAI-counter starts from 0) or 'maxPDCCHperCC' (where the DAI-counter starts from 1), but also for associated ACK/NACK positions. If PDSCH w/o PDCCH (for example, SPS PDSCH) exists, ACK/NACK bits for SPS PDSCH may be further applied to the ACK/NACK payload.

According to the above-mentioned scheme, the size of ACK/NACK payload (i.e. the number ($O_{HARQ-ACK}$) of ACK/NACK bits) can be represented by the following equation 2.

$$O_{HARQ-ACK} = maxPDCCHperCC \cdot \sum_{c=0}^{C-1} TB_{max}(c) \quad \text{[Equation 2]}$$

In Equation 2, 'maxPDCCHperCC' is the number of DL subframes (or PDSCHs/PDCCHs) that require ACK/NACK feedback for each CC, C is the number of CCs, and $TB_{max}(c)$ is the number of TBs (or CWs) capable of being maximally received in one subframe at a $CC^c$. If $TB_{max}(c)$ is set to 1 or 2, the number of ACK/NACK bits can be represented by the following equation 3.

$$O_{HARQ-ACK} = maxPDCCHperCC \cdot \sum_{c=0}^{C-1} TB_{max}(c) \quad \text{[Equation 3]}$$
$$= maxPDCCHperCC \cdot (C + C_2)$$

In Equation 3, $C_2$ is the number of CCs in which a maximum of 2 TBs can be transmitted in one subframe. If spatial bundling is applied to N CCs, $C_2$ is replaced with $C_2$−N. Therefore, if the spatial bundling is applied to all CCs, $C_2$ is set to zero ($C_2$=0).

Figure 19:
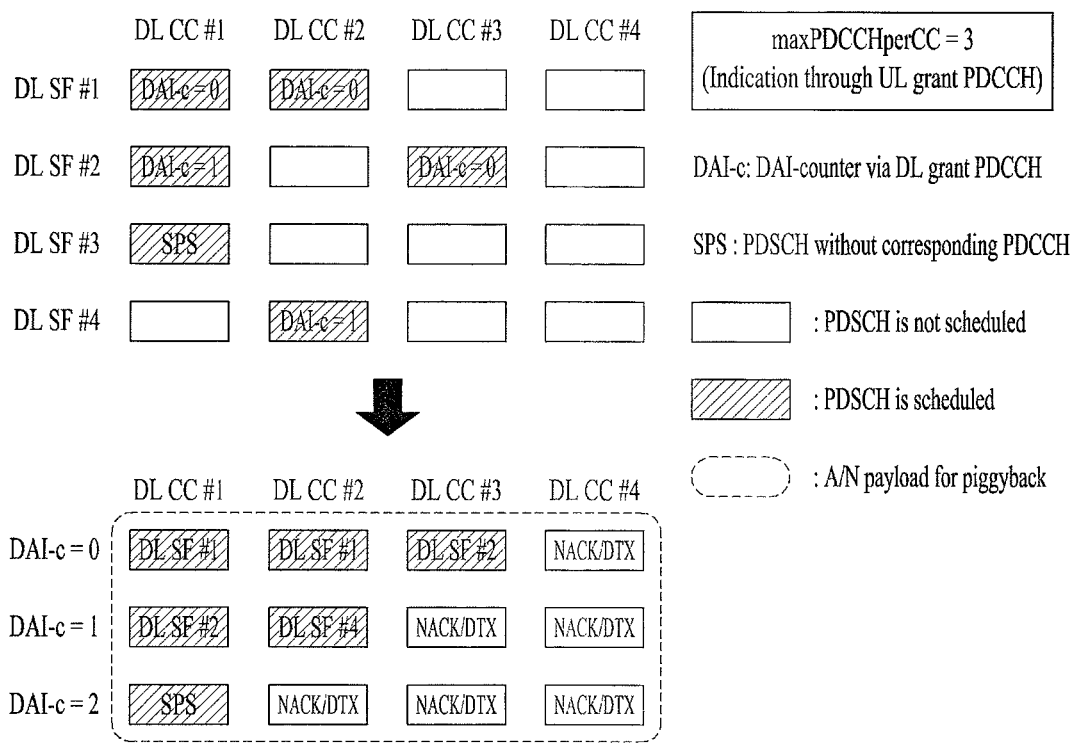
Figure 20:
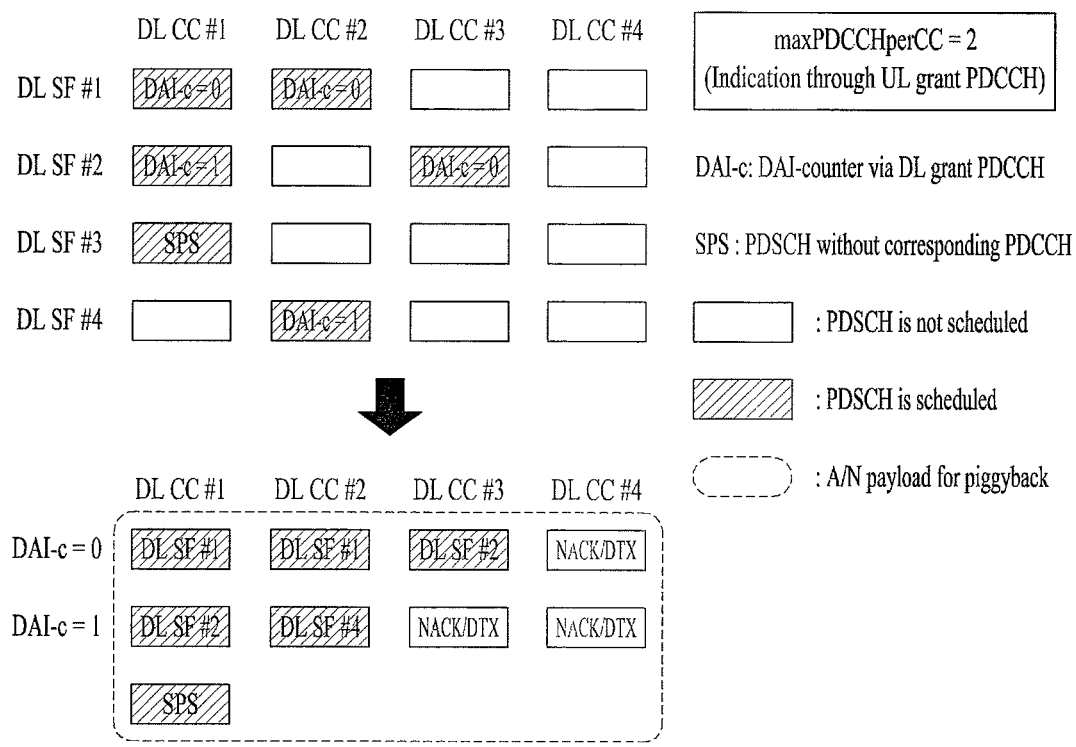

FIGS. 19 and 20 exemplarily show other ACK/NACK transmission processes. Similar to FIG. 18, FIGS. 19 and 20 assume a TDD system in which 4 CCs are aggregated and the ratio of DL SF and UL SF is denoted by "DL SF:UL SF=4:1", and 'maxPDCCHperCC' is indicated under a TDD situation. FIG. 19 exemplarily shows the case in which the BS further considers 'PDSCH w/o PDCCH' so as to determine 'maxPDCCHperCC' (i.e., maxPDCCHperCC=3). Therefore, the UE may configure ACK/NACK payload in consideration of not only PDSCHs corresponding to 'DAI-c=0~2' for each DL CC but also associated ACK/NACK positions. In more detail, the UE may locate ACK/NACK for a PDSCH corresponding to 'DAI-c=x (x=0~2)' at the ACK/NACK position corresponding to 'DAI-c=x', such that it can configure ACK/NACK payload. Therefore, although a PDSCH corresponding to 'DAI-c=2' is not scheduled, ACK/NACK bits must be unnecessarily filled in such a manner that overhead may increase. On the other hand, FIG. 20 shows an exemplary case in which the BS does not consider 'PDSCH w/o PDCCH' when determining 'maxPDCCHperCC' (i.e., maxPDCCHperCC=2). Accordingly, the UE may add ACK/NACK bits for 'PDSCH w/o PDCCH' to ACK/NACK bits that are configured considering not only PDSCHs corresponding to 'DAI-c=0~1' for each DL CC but also associated ACK/NACK positions, such that the ACK/NACK payload can be configured.

Figure 21:
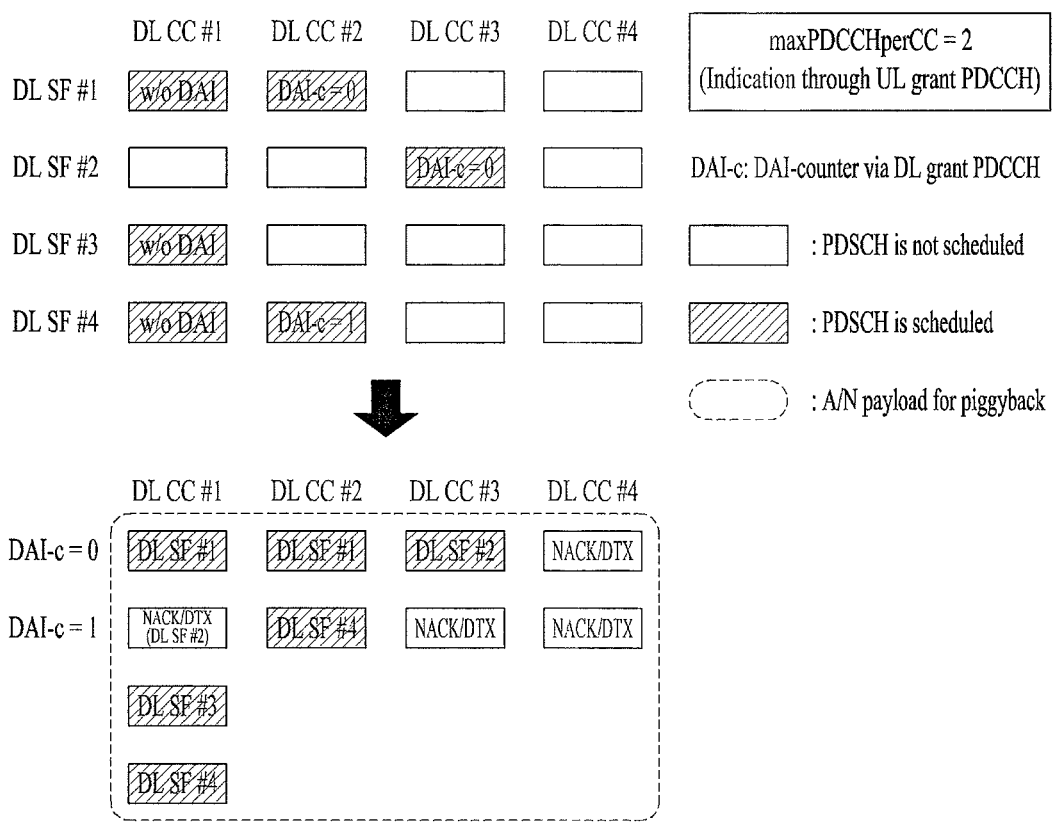

FIG. 21 exemplarily shows another ACK/NACK transmission process according to the present invention. The ACK/NACK transmission process shown in FIG. 21 may consider a method for signaling a maximum value from among the number of PDSCHs scheduled/transmitted for DL CCs other than a PCC under the condition that the DAI-counter is not present in a PDCCH that schedules the PCC. In this case, the UE may configure ACK/NACK payload for all DL SFs in association with a PCC. In contrast, in association with each DL CC other than a PCC, the UE may configure ACK/NACK payload considering not only a PDSCH (or PDCCH) ranging from an initial value for each DL CC to a DAI-counter value (i.e., DAI-c) corresponding to 'maxPDCCHperCC−1' (where the DAI-counter starts from 0) or 'maxPDCCHperCC' (where the DAI-counter starts from 1), but also associated ACK/NACK positions, such that it can configure the ACK/NACK payload.

Referring to FIG. 21, the UE may configure ACK/NACK payload for all four DL SFs in association with a PCC. On the other hand, since 'maxPDCCHperCC' related to DL CCs other than a PCC is set to 2, the UE can configure ACK/NACK payload in consideration of a PDSCH (or PDCCH) corresponding to 'DAI-c=0~1' and its associated ACK/NACK position. In more detail, ACK/NACK for a PDSCH corresponding to 'DAI-c=x (x=0~1)' is located at the ACK/NACK position corresponding to 'DAI-c=x' so as to configure ACK/NACK payload.

The above-mentioned ACK/NACK piggyback scheme based on UL DAI signaling for 'maxPDCCHperCC' may be appropriate for the case in which DL scheduling is relatively and uniformly carried out in all CCs. In other words, if DL scheduling is performed (or concentrated) only in one CC or a small number of CCs, an unnecessarily high 'maxPDCCHperCC' value may be applied to all CCs. In this case, unnecessary overhead may occur due to the number of ACK/NACK modulation symbols contained in a PUSCH or the number of REs used for ACK/NACK transmission.

Therefore, the present invention may employ a method for adjusting the number of REs used for ACK/NACK transmission in a PUSCH through a UL grant PDCCH (e.g., the use of UL DAI field) but not through the number of piggybacked ACK/NACK payload bits. Equation 4 shows the number of coded modulation symbols for HARQ-ACK on the condition that one UL-SCH transport block (TB) is transmitted on a UL CC. Equation 5 shows the number of coded modulation symbols for HARQ-ACK on the condition that two UL-SCH TBs are transmitted on a UL CC. The number of coded modulation symbols for HARQ-ACK is equivalent to the number of REs for HARQ-ACK.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$ [Equation 4]

$$Q' = \max[\min(Q'_{temp}, 4 \cdot M_{sc}^{PUSCH}), Q'_{min}]$$ [Equation 5]

$$Q'_{temp} = \left\lceil \frac{\left(O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}\right)}{\left(\sum_{r=0}^{C(2)-1} \cdot M_{sc}^{PUSCH-initial(2)} \cdot N_{symb}^{PUSCH-initial(2)} + \sum_{r=0}^{C(2)-1} K_r^{(2)} \cdot M_{sc}^{PUSCH-initial(1)} \cdot N_{symb}^{PUSCH-initial(1)}\right)} \right\rceil$$

In Equations 4 and 5, Q' is the number of coded modulation symbols for each layer, and O is the number of HARQ-ACK bits. $M_{sc}^{PUSCH}$ is a band (on a subcarrier basis) scheduled for PUSCH transmission of a transport block (TB) in a current subframe. $M_{sc}^{PUSCH-initial}$ is a band (on a subcarrier basis) scheduled for initial PUCCH transmission. $N_{symb}^{PUSCH-initial}$ is the number of SC-FDMA symbols per subframe for initial PUSCH transmission of the same transport block (TB), as represented by $N_{symb}^{PUSCH-initial} = (2 \cdot (N_{symb}^{UL}-1)-N_{SRS})$. $N_{symb}^{UL}$ is the number of SC-FDMA symbols in a UL slot. $N_{SRS}$ for SRS transmission is set to 0 or 1. $\beta_{offset}^{PUSCH}$ is an offset value. C is the number of code blocks associated with the same transport block (TB), $K_r$ is a payload size of the code block (r). Superscript may indicate a layer number, and $Q'_{min}$ is the lower limit of the coded modulation symbol.

In the above-mentioned scheme, the number ($O^{ACK}$) of ACK/NACK payload piggybacked on a PUSCH under a TDD of 'DL SF:UL SF=M:1' can be represented by the following equation 6, irrespective of the UL DAI value.

$$O^{ACK} = M(C+C_2)$$ [Equation 6]

In Equation 6, C is the number of CCs, and $C_2$ is the number of CCs in which a transmission mode is established to support transmission of a maximum of 2 TBs and spatial bundling is not applied.

The number of REs used for ACK/NACK transmission in a PUSCH can be adjusted according to the received UL DAI value, and a detailed description thereof is as follows. In more detail, in the case of using a UL UAI composed of N bits (i.e., a UL UAI capable of expressing $2^N$ states), a parameter O shown in Equations 4 and 5 can be calculated using $2^N$ values (where $2^N \leq O^{ACK}$) according to the UL DAI value. Differently from the scheme that determines the number of bits of ACK/NACK payload on the basis of the 'maxPDCCHperCC' value, the present invention can adjust the number of ACK/NACK transmission REs contained in a PUSCH through UL DAI signaling. Therefore, $2^N$ UL DAI values may be utilized irrespective of the M value.

For example, provided that N-bit UL DAI is denoted by $V_{DAI}^{UL} \in \{1, \ldots, 2^N\}$, the parameter O depending on the received UL DAI value can be represented by the following equation 7.

$$O = \frac{V_{DAI}^{UL}}{2^N} \cdot O^{ACK} = \frac{V_{DAI}^{UL}}{2^N} \cdot M(C+C_2)$$ [Equation 7]

Provided that 2-bit UL DAI is denoted by $V_{DAI}^{UL} \in \{1,2,3,4\}$, the parameter O depending on the received UL DAI can be represented by the following equation 8.

$$O = \frac{V_{DAI}^{UL}}{4} \cdot O^{ACK} = \frac{V_{DAI}^{UL}}{4} \cdot M(C+C_2)$$ [Equation 8]

On the other hand, one or more PUSCHs may be transmitted through one or more CCs in a specific UL SF of the CA based TDD system, and a PUSCH (i.e., PUSCH w/o PDCCH, for example, SPS PUSCH) transmitted without scheduling caused by a UL grant PDCCH may also be contained in one or more PUSCHs. Under this situation, if PUSCH w/o PDCCH is selected for ACK/NACK piggyback, it is preferable that ACK/NACK be piggybacked to the corresponding PUSCH using a maximum value (i.e., $O = O^{ACK} = M(C+C_2)$) capable of being assigned to a UL DAI.

Method 2) First or Last PDSCH (PDCCH)-scheduled DL CC indication.

In association with a DL SF group corresponding to a UL SF, Method 2 can inform a UE of the first DL CC index (F-SC index) or the last DL CC index (F-CC index) in which at least one PDSCH (or DL grant PDCCH) is scheduled/transmitted for a DL SF group corresponding to a UL SF, through a UL grant PDCCH. The UE can transmit ACK/NACK through a PUSCH on the corresponding UL SF. In this case, a PDSCH (e.g., SPS PDSCH) transmitted without using a PDCCH is known to both the BS and the UE, such that it may be excluded from a PDSCH that decides F-CC or L-CC index. In more detail, when indicating the F-CC index, the UE may configure ACK/NACK payload only for DL CCs ranging from the corresponding F-CC index to the last F-CC index. Alternatively, when indicating the L-CC index, the UE may configure ACK/NACK payload only for DL CCs ranging from the first CC index to the corresponding L-CC index. CC corresponding to the first CC index may be a primary CC.

In addition, CC index information may be transmitted through a DAI field contained in a UL grant PDCCH. The UL grant PDCCH may include "no-PDSCH-state" indication information that indicates the absence of PDSCH (or DL grant PDCCH) scheduling/transmission in the entire DL SF group corresponding to a UL SF. The "no-PDSCH-state" indication information may be transmitted through the DAI field of the UL grant PDCCH. In this case, CC index information and "no-PDSCH-state" indication information may be distinguished from each other by different bits of the DAI field or different DAI states, or may share a specific DAI state. Specifically, if F-CC and L-CC from among several DL CC indexes are present, DL CCF having the lowest/highest index from among the corresponding DL CC indexes may be indicated by F/L-CC index.

Figure 22:
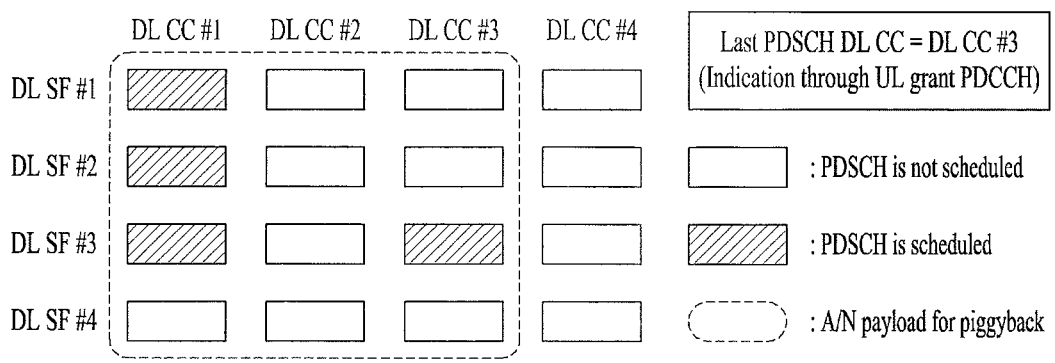

FIG. 22 is a conceptual diagram illustrating an exemplary ACK/NACK payload configuration on the condition that four CCs are aggregated and DL SFs and UL SFs are configured in the ratio of 'DL SF:UL SF=4:1'. Referring to FIG. 22, L-CC (i.e., DL CC #3) in which at least one PDSCH is scheduled/transmitted may be indicated through the UL grant PDCCH. Specifically, when considering 2-bit DAI to indicate an L-CC index, if DL CC #3 or #4 denotes L-CC, L-CC index may be identical to DL CC #4 (i.e. L-CC index=DL CC #4).

In another example, the present invention may indicate each DL CC index in which at least one PDSCH (or DL grant PDCCH) is scheduled/transmitted, in the form of bitmap information.

Method 3) First or Last PDSCH (PDCCH)-scheduled ACK/NACK group indication.

Method 3 can inform a UE of the first ACK/NACK group index (F-ANG index) or the last ACK/NACK group index (L-ANG index) in which at least one PDSCH (or DL grant PDCCH) is scheduled/transmitted, through a PDCCH that schedules a PUSCH to be transmitted through the corresponding UL SF. The ACK/NACK group may correspond to a DL CC group, a DL SF group, or a combination thereof, and an index is pre-assigned to each ACK/NACK group.

PDSCH w/o PDCCH (for example, SPS PDSCH) is known to the BS and the UE, such that the 'PDSCH w/o PDCCH' information can be excluded from a PDSCH for F- or L-ANG index decision. In more detail, when indicating the F-ANG index, the UE may configure ACK/NACK payload only for DL subframes/DL CCs corresponding to indexes from the F-ANG index to the last ANG index. Similarly, when indicating the L-ANG index, the UE may configure ACK/NACK payload only for DL subframes/DL CCs corresponding to indexes from the first ANG index to the L-ANG index.

In addition, ANG index information may be transmitted through a DAI field contained in a UL grant PDCCH. The UL grant PDCCH may include "no-PDSCH-state" indication information that indicates the absence of PDSCH (or DL grant PDCCH) scheduling/transmission in the entire DL SF group corresponding to a UL SF. The "no-PDSCH-state" indication information may be transmitted through the DAI field of the UL grant PDCCH. In this case, ANG index information and "no-PDSCH-state" indication information may be distinguished from each other by different bits of the DAI field or different DAI states, or may share a specific DAI state. Specifically, if F-ANG and L-ANG from among several ANG indexes are present, ANG having the lowest/highest index from among the corresponding ANG indexes may be indicated by F/L-ANG index.

Figure 23:
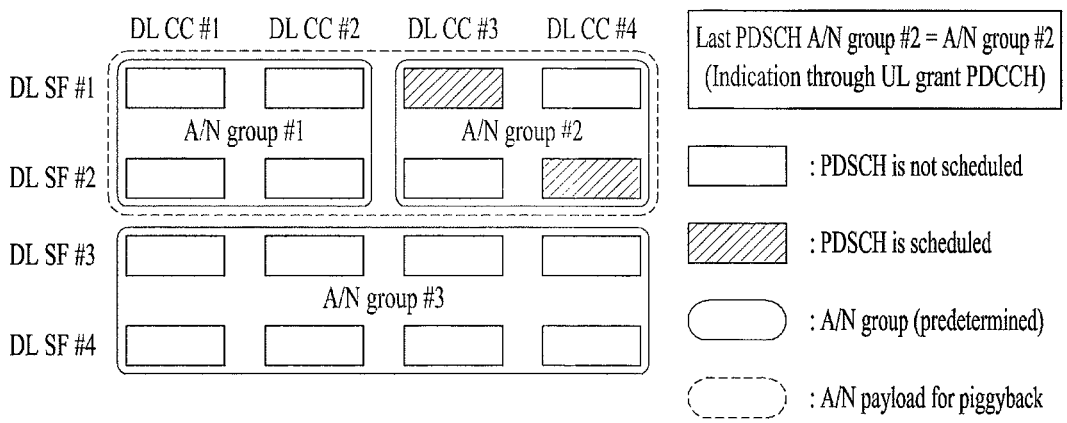

FIG. 23 is a conceptual diagram illustrating an exemplary ACK/NACK payload configuration based on L-ANG index indication on the condition that four CCs are aggregated and DL SFs and UL SFs are configured in the ratio of 'DL SF:UL SF=4:1'. Referring to FIG. 23, L-ANG (i.e., ACK/NACK group #2) in which at least one PDSCH is scheduled/transmitted may be indicated through the UL grant PDCCH. The UE may configure ACK/NACK configuration only for DL subframes/DL CCs (i.e., DL SF #1 and DL SF #2/DL CCs #1 to #4) corresponding to the ACK/NACK groups #1 and #2.

In another example, the present invention may indicate each ACK/NACK group index in which at least one PDSCH (or DL grant PDCCH) is scheduled/transmitted, in the form of bitmap information.

Method 4) ACK/NACK payload corresponding to ACK/NACK group indication.

In association with a DL SF group corresponding to a UL SF, Method 4 can inform a UE of the ACK/NACK group index (i.e., AN-PG index) serving as an ACK/NACK payload configuration target, through a PDCCH that schedules a PUSCH to be transmitted through the corresponding UL SF. The ACK/NACK group may correspond to a DL CC group, a DL SF group, or a combination thereof, and an index is pre-assigned to each ACK/NACK group. PDSCH w/o PDCCH (for example, SPS PDSCH) is known to the BS and the UE, such that SPS PDCCH may be excluded from a PDSCH for AN-PG index decision. In Method 4, the UE may directly configure ACK/NACK payload only for an ACK/NACK group corresponding to the AN-PG index.

In addition, AN-PG index information may be transmitted through a DAI field contained in a UL grant PDCCH. The UL grant PDCCH may include "no-PDSCH-state" indication information that indicates the absence of PDSCH (or DL grant PDCCH) scheduling/transmission in the entire DL SF group corresponding to a UL SF. The "no-PDSCH-state" indication information may be transmitted through the DAI field of the UL grant PDCCH. In this case, AN-PG index information and "no-PDSCH-state" indication information may be distinguished from each other by different bits of the DAI field or different DAI states, or may share a specific DAI state.

Figure 24:
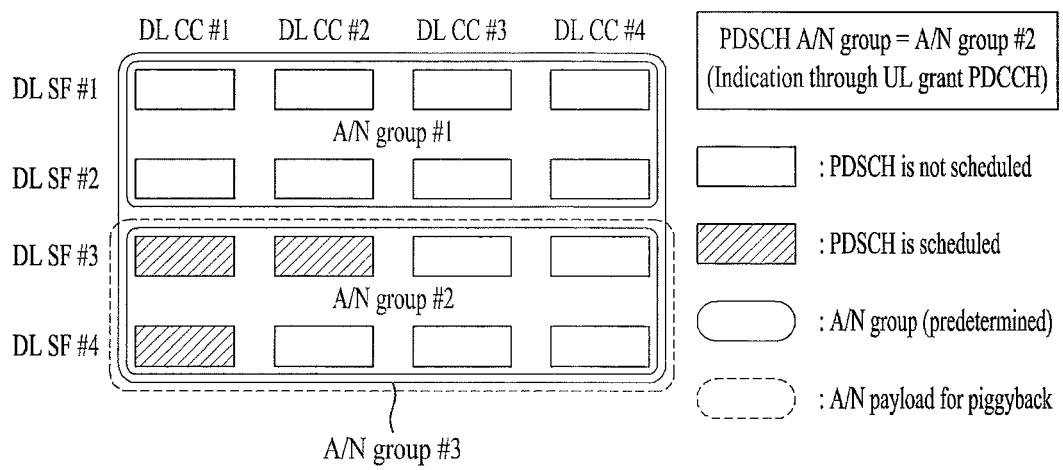

FIG. 24 is a conceptual diagram illustrating an exemplary ACK/NACK payload configuration based on AN-PG index indication on the condition that four CCs are aggregated and DL SFs and UL SFs are configured in the ratio of 'DL SF:UL SF=4:1'. Referring to FIG. 24, AN-PG (i.e., ACK/NACK group #2) including all PDSCH scheduling/transmission may be indicated through the UL grant PDCCH. The UE may configure ACK/NACK configuration only for DL subframes/DL CCs (i.e., DL SF #3 and DL SF #4/DL CCs #1 to #4) corresponding to the ACK/NACK group #2.

During ACK/NACK grouping for Method 4, it is preferable that an ACK/NACK group (i.e., ACK/NACK group #3 shown in FIG. 24) including all DL CCs and all DL SFs may be preferably indicated. In addition, PCC and SCC(s) are distinguished from each other so as to indicate different ACK/NACK groups, and can also indicate different ACK/NACK groups according to the presence or absence of CW bundling.

In accordance with the above-mentioned methods, one common method can be applied to all UEs through a cell-specific method configuration, or independent methods can be applied to individual UEs through a UE-specific method configuration.

As can be seen from the above-mentioned methods, if an ACK/NACK payload section (i.e., signaled ACK/NACK payload) to be piggybacked to a PUSCH using information signaled via a UL grant PDCCH (e.g., via a UL DAI field), ACK/NACK for PDSCH w/o PDCCH can be processed as follows. In the above-mentioned signaling information, PDSCH w/o PDCCH (for example, SPS PDSCH) may be excluded from the process for determining the corresponding information. For convenience of description, each DL SF contained in one DL CC is referred to as a slot.

1) Case in which a slot to which 'PDSCH w/o PDCCH' is scheduled/transmitted is present in the signaled ACK/NACK payload:

After ACK/NACK for the corresponding PDSCH is mapped to the corresponding slot contained in the signaled ACK/NACK payload, the signaled ACK/NACK payload is piggybacked to a PUSCH.

2) Case in which a slot to which 'PDSCH w/o PDCCH' is scheduled/transmitted is not present in the signaled ACK/NACK payload, or Case of Method 1-A:

ACK/NACK for the corresponding PDSCH is mapped by newly adding an MSB (or LSB) to the signaled ACK/NACK payload and the mapped result is then piggybacked to a PUSCH. In this case, the term TSB' may be an LSB for either the entire signaled ACK/NACK payload or a PCC ACK/NACK part contained in the signaled ACK/NACK payload.

On the other hand, the CA based TDD system may transmit one or more PUSCHs through one or more UL CCs at a specific UL SF, and PUSCH w/o PDCCH (for example, SPS PUSCH) may also be contained in one or more PUSCHs. For convenience of description, a general PUSCH (i.e., a PUSCH scheduled/transmitted by a UL grant PDCCH) will hereinafter be referred to as 'PUSCH w/ PDCCH'. Under this condition, if it is necessary for ACK/NACK to be piggybacked on a PUSCH, only one PUSCH is selected from among one or more PUSCHs, such that such ACK/NACK information can be piggybacked and transmitted only to a specific PUSCH. If the selected specific PUSCH is 'PUSCH w/o PDCCH', there is no information signaled via a UL grant PDCCH (e.g., via a DAI field), such that the UE operation can be defined as follows so as to decide the piggybacked ACK/NACK payload.

<Alt 1a>

1) Under the condition that 'PUSCH w/ PDCCH' does not exist and only 'PUSCH w/o PDCCH' exists, if 'PUSCH w/o PDCCH' is selected for ACK/NACK piggyback, ACK/NACK payload is configured for all DL SFs and all DL CCs aggregated by a UE, such that the resultant ACK/NACK information is piggybacked to the selected PUSCH.

2) Under the condition that 'PUSCH w/ PDCCH' and 'PUSCH w/o PDCCH' are present and 'PUSCH w/o PDCCH' is selected for ACK/NACK piggyback, ACK/NACK payload is configured on the basis of information signaled through a UL grant PDCCH (for example, via a DAI field) of 'PUSCH w/ PDCCH', such that the resultant ACK/NACK information is piggybacked to the selected PUSCH.

<Alt 1b>

1) If 'PUSCH w/o PDCCH' is selected for ACK/NACK piggyback on the condition that 'PUSCH w/o PDCCH' exists, ACK/NACK payload is configured for all DL SFs and all DL CCs aggregated by the UE, irrespective of the presence or absence of PUSCH w/ PDCCH', such that the resultant ACK/NACK information is piggybacked to the selected PUSCH.

On the other hand, information (i.e., TDD-UL-DAI) signaled through a UL grant PDCCH (for example, via a DAI field) to determine the piggybacked ACK/NACK payload may be preferably set to the same value in UL grant PDCCH(s) scheduling several PUSCHs at a specific UL SF so as to prevent inconsistency in piggybacked ACK/NACK payload between the UE and the BS. If TDD-UL-DAI values are different in UL grant PDCCH(s) corresponding to a specific UL SF, the UE operation can be defined as follows.

<Alt 2a>

If TDD-UL-DAI values are different in all UL grant PDCCHs, the corresponding UL grant PDCCHs are discarded, and a PUSCH corresponding to the discarded PDCCHs is not transmitted. Based on the above-mentioned situation, a detailed operation for ACK/NACK piggyback can be defined as follows.

1) If 'PUSCH w/o PDCCH' is selected for ACK/NACK piggyback on the condition that different TDD-UL-DAI values are assigned to all UL grant PDCCHs, the corresponding UL grant PDCCHs are discarded (for example, PUSCH transmission scheduled by the corresponding UL grant PDCCHs is completely dropped), ACK/NACK payload for all DL SFs and all DL CCs aggregated by the UE is configured, such that the resultant ACK/NACK information is piggybacked on 'PUSCH w/o PDCCH'.

2) If 'PUSCH w/o PDCCH' is not selected for ACK/NACK piggyback under the condition that different TDD-UL-DAI values are assigned to all UL grant PDCCHs and PUSCH w/o PDCCH' exists, the corresponding UL grant PDCCHs are discarded (for example, PUSCH transmission scheduled by the corresponding UL grant PDCCHs is completely dropped), and the same ACK/NACK piggyback as in <Alt 2a-1> is performed through 'PUSCH w/o PDCCH'.

3) Under the condition that different TDD-UL-DAI values are assigned to all UL grant PDCCHs and 'PUSCH w/o PDCCH' does not exists, the corresponding UL grant PDCCHs are discarded (for example, PUSCH transmission scheduled by the corresponding UL grant PDCCHs is completely dropped), such that the resultant ACK/NACK information is transmitted through a PUCCH without being piggybacked to a PUSCH.

<Alt 2b>

1) If 'PUSCH w/o PDCCH' is selected for ACK/NACK piggyback on the condition that different TDD-UL-DAI values are assigned to all UL grant PDCCHs, ACK/NACK payload is configured for all DL SFs and all DL CCs aggregated by the UE, without additional processing (e.g., UL grant PDCCH is discarded), such that the resultant ACK/NACK information is piggybacked to the selected PUSCH.

2) Under the condition that different TDD-UL-DAI values are assigned to all UL grant PDCCHs and 'PUSCH w/o PDCCH' exists, the corresponding UL grant PDCCHs are discarded (for example, PUSCH transmission scheduled by the corresponding UL grant PDCCHs is completely omitted), the same ACK/NACK piggyback as in the <Alt 2b-1> scheme is carried out through 'PUSCH w/o PDCCH'.

3) Under the condition that different TDD-UL-DAI values are assigned to all UL grant PDCCHs and 'PUSCH w/o PDCCH' does not exist, the corresponding UL grant PDCCHs are discarded (for example, PUSCH transmission scheduled by the corresponding UL grant PDCCHs is completely omitted), and ACK/NACK is transmitted through a PUCCH without being piggybacked to a PUSCH.

Embodiment 3

Embodiment 3 shows a method for reducing the size of ACK/NACK payload piggybacked to a PUSCH using the UL DAI field in the CA based TDD system. As can be seen from FIGS. 12 to 21, a DAI field (DL DAI) contained in the DL grant PDCCH is used as a counter indicating information about the number of PDSCHs, and a DAI field (UL DAI) contained in the UL grant PDCCH indicates a total number of PDSCHs transmitted during the DL subframe, such that the number of payload piggybacked to a PUSCH can be dynamically adjusted. In this case, the number of PDSCHs is equivalent to the number of DL SFs for which ACK/NACK feedback is needed.

FIG. 25 exemplarily shows the ACK/NACK transmission process depending on whether or not UL DAI is used. For convenience of description and better understanding of the present invention, it is assumed that TDD and one CC are aggregated as shown in FIG. 25.

Referring to FIG. 25, a base station (BS) transmits PDCCH and PDSCH (PDCCH/PDSCH) at DL SF#1, DL SF#3, and DL SF#4. Information indicating the order value of the corresponding PDCCH is included in a DAI field of each DL grant PDCCH. In FIG. 25, it is assumed that the UE fails to detect a PDCCH (DL DAI=3) at a subframe (SF #4) (i.e., in case of the occurrence of PDCCH DTX). In this case, provided that information of a total number of UL DAIs is not in use, the UE must feed back ACK/NACK during a maximum of 4 SFs due to the PDCCH DTX problem. However, provided that the UE recognizes information of a total number of UL DAIs, the amount of ACK/NACK payload to be piggybacked to a PUSCH can be reduced as shown in FIG. 25. In addition, since the UE receives a PDSCH only at SF #1 and SF #3, it transmits ACK/NACK at bit positions corresponding to SF #1 and SF #3 within ACK/NACK payload, and the bit position corresponding to a specific SF where a PDSCH is not received is filled with NACK states, such that the UE can transmit the resultant information.

Considering a TDD situation in which a plurality of CCs is aggregated, the following scheme can be used as the extended version of the above-mentioned scheme.

FIG. 26 exemplarily shows the ACK/NACK transmission process depending on whether or not UL DAI is used. For convenience of description and better understanding of the present invention, it is assumed that DL SFs and UL SFs are aggregated in the ratio of DL SF:UL SF=4:1 and three CCs are aggregated.

Referring to FIG. 26, a BS may inform a UE of a maximum number of PDSCHs or a maximum value of the numbers of DL scheduling PDCCHs transmitted per CC through the UL DAI. In this case, the UE may configure ACK/NACK payload based on the UL DAI value per CC as shown in Equations 2 and 3. For example, if the UE aggregates three CCs, each of which is established in a non-MIMO mode, and a value indicated by the UL DAI is set to 3, 3 bits must be scheduled per CC so that payload composed of 9 bits can be configured.

Considering the above-mentioned scheme, the present invention provides a method for configuring a UL DAI state under a UL DAI composed of a limited number of bits (e.g., 2 bits). For example, when considering the case in which DL SFs and UL SFs are aggregated in the ratio of 'DL SF:UL SF=4:1' in the TDD system, information mapped to a UL DAI can express up to 5 states (i.e., 0, 1, 2, 3, and 4) (i.e., a maximum value among the numbers of PDSCHs transmitted per CC or a maximum value among the numbers of DL grant PDCCHs transmitted per CC). However, if the DAI field is composed of 2 bits, the number of bits is insufficient. Therefore, it is necessary to overlap the UL DAI states, and it is also necessary to define the UE operation for the overlapped UL DAI states.

For example, the present invention may provide a method for mapping two contiguous values to one UL DAI state at the UL DAI mapping information (i.e., 0, 1, 2, 3, 4).

Table 8 exemplarily shows a UL DAI state mapping table.

TABLE 8

| UL DAI state | Information mapped to UL DAI | | Information mapped to UL DAI |
|---|---|---|---|
| A | 0 | ⇒ | 0 |
| B | 1,2 | | 2 |
| C | 3 | | 3 |
| D | 4 | | 4 |

In Table 8, A, B, C, and D may be elements of {00, 01, 10, 11} bits. For example, A, B, C and D can be mapped to one another in various ways, for example, {A=00, B=01, B=10, D=11}, {A=01, B=10, C=11, D=00}, etc.

For explanation of the operations shown in Table 8, it is assume that the UE receives the UL DAI field value corresponding to 'UL DAI state=B' through the UL grant PDCCH. In this case, the UE assumes that the number of DL subframes requiring ACK/NACK feedback is set to 2, whereas the number of DL subframes (i.e., a maximum number of PDCCHs/PDSCHs capable of being transmitted) requiring ACK/NACK feedback at a CC may be set to 1 or 2, such that the resultant ACK/NACK payload is configured. In other words, provided that the UE configures three MIMO CCs and does not use spatial bundling, the UE may configure ACK/NACK payload composed of a total of 12 bits (i.e., O-bit ACK/NACK payload per CC).

Similarly, 2 and 3 from among information mapped to UL DAI are aggregated so that the aggregated result may be mapped to one UL DAI state, and 3 and 4 from among information mapped to UL DAI are aggregated so that the aggregated result may be mapped to one UL DAI state.

Table 9 shows another example for constructing the UL DAI state mapping table. Table 9 exemplarily shows a method for mapping '0' and '4' from among the UL DAI mapping information (i.e., 0, 1, 2, 3, 4) to one UL DAI state.

TABLE 9

| UL DAI state | Information mapped to UL DAI | | Information mapped to UL DAI |
|---|---|---|---|
| A | 0,4 | ⇒ | 0 or 4 (conditional mapping) |
| B | 1 | | 1 |
| C | 2 | | 2 |
| D | 3 | | 3 |

In Table 9, A, B, C, and D may be elements of {00, 01, 10, 11} bits. For example, A, B, C and D can be mapped to one another in various ways, for example, {A=00, B=01, B=10, D=11}, {A=01, B=10, C=11, D=00}, etc.

For explanation of the operations shown in Table 9, it is assume that the UE receives the UL DAI field value corresponding to 'UL DAI state=A' through the UL grant PDCCH. In this case, if at least one DL scheduling PDCCH (including SPS release PDCCH) or PDSCH is detected in a plurality of DL SFs corresponding to UL SF, the UE recognizes information indicated by the corresponding UL DAI state as the value of 4, and configures ACK/NACK payload as described above. In other words, provided that a UL DAI state is set to A, if DL scheduling PDCCH (including SPS release PDCCH) and PDSCH are not detected in a plurality of DL SFs corresponding to UL SF, the UE may recognize information indicated by the corresponding UL DAI state as zero '0', and may not piggyback ACK/NACK to a PUSCH. That is, the UE may not transmit ACK/NACK over a PUDSCH.

Table 10 shows another example of a UL DAI state mapping table. Table 10 exemplarily shows a method for mapping '1' and '4' from among UL DAI mapping information (i.e., 0, 1, 2, 3, 4) to one UL DAI state.

TABLE 10

| UL DAI state | Information mapped to UL DAI | | Information mapped to UL DAI |
|---|---|---|---|
| A | 0 | ⇒ | 0 |
| B | 1,4 | | 1 or 4 (conditional mapping) |
| C | 2 | | 2 |
| D | 3 | | 3 |

A, B, C, and D may be elements of {00, 01, 10, 11} bits. For example, A, B, C and D can be mapped to one another in various ways, for example, {A=00, B=01, B=10, D=11}, {A=01, B=10, C=11, D=00}, etc.

For explanation of the operations shown in Table 10, it is assume that the UE receives the UL DAI field value corresponding to 'UL DAI state=B' through the UL grant PDCCH. In this case, if at least two DL scheduling PDCCHs (each of which includes SPS release PDCCH) or PDSCHs are detected in at least one CC, the UE recognizes information indicated by the corresponding UL DAI state as '4', and configures ACK/NACK payload as described above. In other words, provided that a UL DAI state is set to B, if one or less DL scheduling PDCCH (including SPS release PDCCH) or PDSCH is detected in at least one CC, the UE may recognize information indicated by the corresponding UL DAI state as '1', and may configure ACK/NACK payload.

Embodiment 4

The problem encountered when ACK/NACK payload including ACK/NACK for a PUSCH (e.g., SPS PDSCH) transmitted without a corresponding PDCCH is configured will hereinafter be described with reference to FIG. 27. Embodiment 4 exemplarily shows a TDD situation in which multiple CCs are aggregated. For convenience of description and better understanding of the present invention, it is assumed that PDSCH and/or PDCCH (PDSCH/PDCCH) are transmitted in one DL CC. The example shown in FIG. 27 may be applied to an FDD in which multiple CCs are aggregated.

Referring to FIG. 27, the BS transmits a PDSCH at DF SFs #1, #2 and #4, and transmits SPS PDSCH at DL SF #2. For convenience of description and better understanding of the present invention, it is assumed that the UE does not receive a PDCCH at DL SF #2 and DL SF #4. In this case, as described above, when the ACK/NACK payload size is dynamically adjusted using a UL DAI, the position of ACK/NACK for SPS PDSCH becomes ambiguous. In more detail, in the case of SPS scheduling, if SPS is activated through PDCCH, a PDSCH is transmitted without a PDCCH at intervals of a predetermined time promised between the BS and the UE. As described above, if PDSCH is transmitted without a PDCCH, the order value of PDSCH is not transmitted such that it is impossible to recognize the position/order of ACK/NACK for the corresponding PDSCH.

Therefore, in the case of using ACK/NACK (that may be composed of one or two bits according to a transmission mode (i.e., a maximum number of CWs capable of being transmitted) of a DL CC to which SPS PDSCH is allocated and the presence or absence of CW bundling) for SPS PDSCH, in order to prevent inconsistency in ACK/NACK bit position between the UE and the BS, the present invention proposes a method for mapping SPS PDSCH ACK/NACK (referred to as SPS PDSCH A/N) to a fixed position within the ACK/NACK payload. ACK/NACK payload may be transmitted over a PUSCH or PUCCH. For example, the fixed position for SPS PDSCCH A/N may include an MSB or LSB within ACK/NACK payload. In this case, LSB may be an LSB for either the entire ACK/NACK payload or a PCC ACK/NACK part (i.e., per-CC ACK/NACK payload for PCC) contained in ACK/NACK payload. If the lowest PCC cell index is established, LSB may be an LSB for an ACK/NACK part of a specific cell having the lowest cell index within ACK/NACK part. Similarly, MSB may be an MSB for the entire ACK/NACK payload or a PCC ACK/NACK part contained in ACK/NACK payload. If the lowest PCC cell index is established, MSB may be an MSB for an ACK/NACK part of a specific cell having the lowest cell index within ACK/NACK part.

Figure 28:
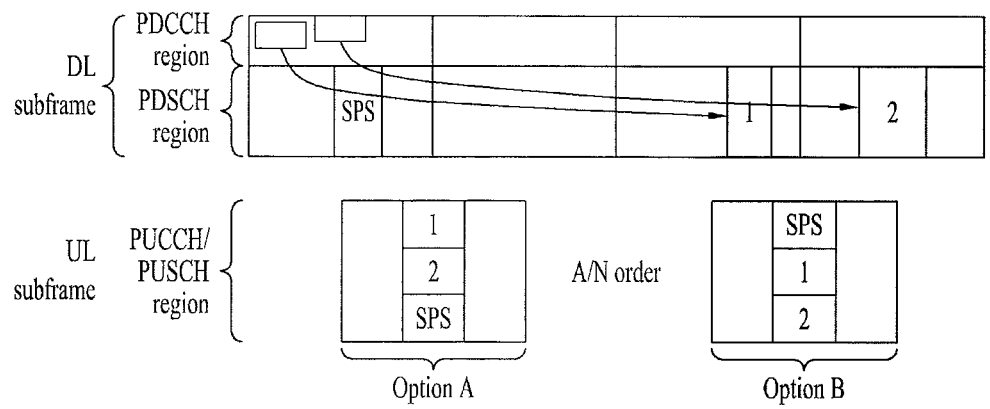
FIGS. 28 to 32 exemplarily show a method for transmitting ACK/NACK according to embodiments of the present invention.
Figure 29:
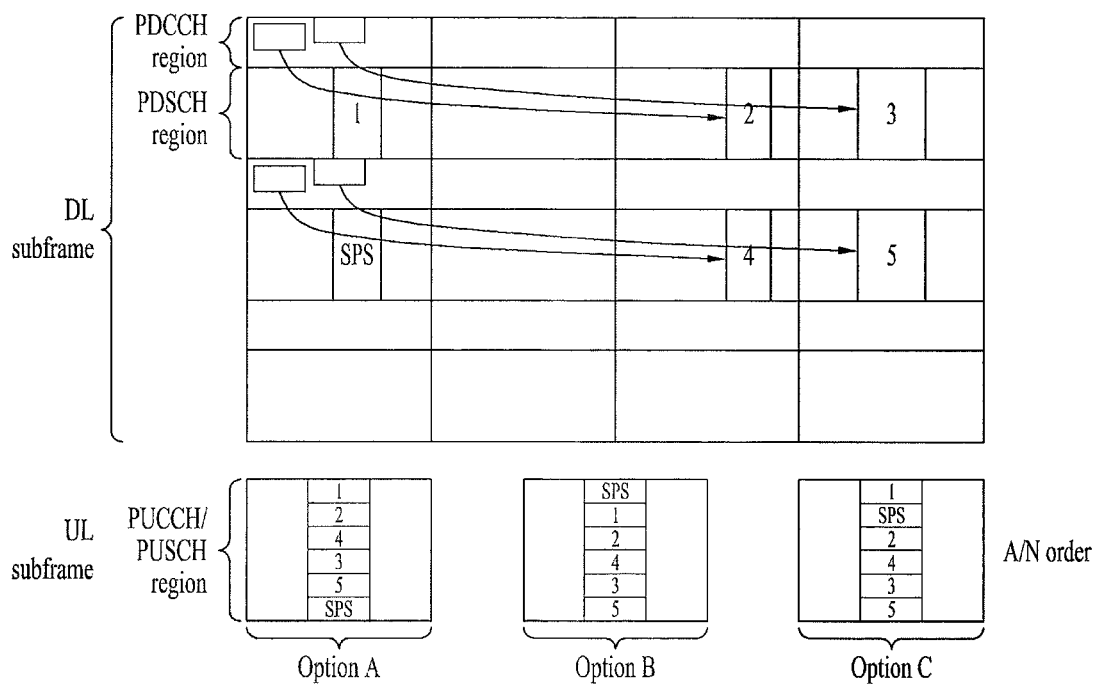

FIGS. 28 and 29 exemplarily show a method for configuring ACK/NACK payload according to one embodiment of the present invention. FIG. 28 exemplarily shows an FDD situation in which multiple CCs are aggregated. In the FDD system, a DL subframe is mapped to a UL subframe on a one to one basis, such that ACK/NACK for one DL subframe is transmitted on a single UL subframe. FIG. 29 exemplarily shows a TDD situation in which multiple CCs are aggregated. In the TDD system, a DL subframe is mapped to a UL subframe on M to one basis, such that ACK/NACK for multiple DL subframes can be transmitted on a single UL subframe.

Referring to FIGS. 28 and 29, the following three options may be selectively used.

Option A: SPS PDSCH A/N may be located at the end of ACK/NACK payload. That is, SPS PDCCH A/N may be located at LSB of the ACK/NACK configuration bits. In accordance with the present option, ACK/NACK to which the order value contained in a DAI is assigned may be arranged as an order value without change. SPS PDSCH A/N is arranged after ACK/NACK of a PDSCH (and SPS release PDCCH) witha corresponding PDCCH. If multiple SPS PDSCHs are present, multiple SPS PDSCH A/N signals may also be arranged from the position of LSB. Preferably, SPS PDSCH A/Ns may be arranged in ascending numerical order (or in descending numerical order) of CC index of SPS PDSCH, and may be arranged in ascending numerical order (or in descending numerical order) of subframe number in a case of the same CC indexes.

Option B: SPS PDSCH A/N may be located at the front of ACK/NACK payload. That is, SPS PDSCH A/N may be located at MSB of the ACK/NACK configuration bit. According to the present option, since SPS PDSCH A/N is located at the front of the ACK/NACK payload, such that ACK/NACK to which the order value contained in a DAI is assigned must be shifted backward one by one within the ACK/NACK payload. If SPS is transmitted to a specific CC, ACK/NACK payload for the corresponding CC can always be located at the front of the entire ACK/NACK payload. As shown in the drawings, if per-cell ACK/NACK payload is sequentially concatenated in the order of CC index so as to configure the entire ACK/NACK payload, the lowest CC index may be assigned to a CC having SPS PDSCH, or SPS PDSCH may be transmitted only through a CC having the lowest CC index. For example, a specific CC including SPS PDSCH may be limited to a primary CC. If multiple SPS PDSCHs are present, multiple SPS PDSCH A/N signals may also be arranged from the position of MSB. Preferably, SPS PDSCH A/Ns may be arranged in ascending numerical order (or in descending numerical order) of CC index of SPS PDSCH, and may be arranged in ascending numerical order (or in descending numerical order) of subframe number in a case of the same CC indexes.

Option C: SPS PDSCH A/N may be located at the last position of ACK/NACK payload for a CC including SPS PDSCH. That is, SPS PDSCH A/N may be located at LSB of per-CC ACK/NACK configuration bit. If multiple SPS PDSCHs are present, multiple SPS PDSCHs may be arranged from the position of LSB of per-CC ACK/NACK configuration bit field. Preferably, the SPS ACK/NACKs may be located at each CC index of SPS PDSCH, and the same CC indexes may be arranged in ascending numerical order (or in descending numerical order) of subframe number in a case of the same CC indexes.

Figure 30:
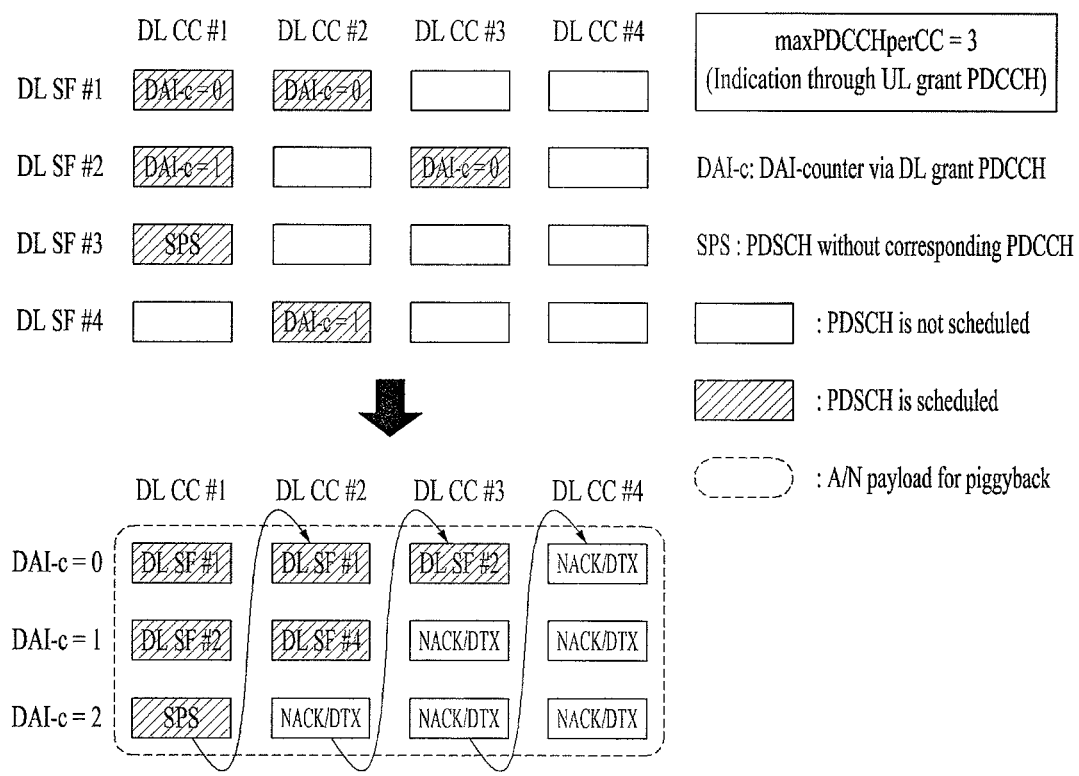

FIG. 30 shows another example of ACK/NACK payload configuration. FIG. 30 shows an example of the above-mentioned option C shown in FIG. 19.

A detailed description of FIG. 19 will hereinafter be described with reference to FIG. 30. According to the scheme of FIG. 19, the UE may adjust the entire ACK/NACK payload size using a UL DAI value. In more detail, the UE can determine the size of per-CC ACK/NACK payload (i.e., ACK/NACK part) for each DL CC in consideration of a UL DAI value, a transmission mode of the corresponding CC, and the presence or absence of bundling. In addition, the UE can determine the position of each ACK/NACK within per-CC ACK/NACK payload using DL DAI value(s) received at each DL CC.

In more detail, it is assumed that the HARQ-ACK feedback bit for the c-th DL CC (or serving cell) is defined as $o_{c,0}^{ACK} o_{c,1}^{ACK}, \ldots, o_{c,O_c^{ACK}-1}$ (where c≥0). $O_c^{ACK}$ is the number (i.e., size) of HARQ-ACK payload bits for the c-th DL CC. If a transmission mode for supporting single transmission block (TB) transmission is configured in the c-th DL CC or if the spatial bundling is applied to the c-th DL CC, $O_c^{ACK}$ may be identical to $B_c^{DL}$ as denoted by $O_c^{ACK}=B_c^{DL}$. In contrast, if a transmission mode for supporting transmission of multiple transmission blocks (e.g., two TBs) is configured in the c-th DL CC or if no spatial bundling is applied to the c-th DL CC, $O_c^{ACK}$ may be identical to $2B_c^{DL}$ as denoted by $O_c^{ACK}=2B_c^{DL}$. $B_c^{DL}$ is the number (i.e., maxPDCCHperCC) of DL subframes requiring ACK/NACK feedback in the c-th DL CC. If HARQ-ACK is transmitted through 'PDSCH w/ PDCCH', maxPDCCH-perCC may be indicated by the value of a UL-DAI field. In accordance with this example, when deciding the 'maxPD-CCHperCC' value, the BS may further consider TDSCH w/o PDCCH (e.g., SPS PDSCH)' (that is, maxPDCCH-perCC=3). In contrast, if HARQ-ACK is transmitted through a PUCCH or PUSCH w/o PDCCH, maxPDCCH-perCC is denoted by M (i.e., mxPDCCHperCC=M).

If a transmission mode for supporting transmission of a single transmission block is established in the c-th DL CC, or if spatial bundling is applied to the c-th DL CC, the position of each ACK/NACK in per-CC HARQ-ACK payload is given as $o_{c,DAI(k)-1}^{ACK}$. DAI(k) indicates a DL DAI value of the PDCCH detected at the DL subframe (n−k). In contrast, if a transmission mode for supporting transmission of multiple transmission blocks (e.g., two transmission blocks) is configured in the c-th DL CC and no spatial bundling is applied to the c-th DL CC, the position of each ACK/NACK in per-CC HARQ-ACK payload is denoted by $o_{c,2DAI(k)-2}^{ACK}$ and $o_{c,2DAI(k)-1}^{ACK}$. $o_{c,2DAI(k)-2}^{ACK}$ is a HARQ-ACK for the codeword 0, and $o_{c,2DAI(k)-1}^{ACK}$ is a HARQ-ACK for the codeword 1.

On the other hand, according to Option C, if SPS PDSCH is present as shown in the drawing, the HARQ-ACK position for SPS PDSCH may be located at HARQ-ACK payload $o_{c,O_c^{ACK}-1}^{ACK}$ of the corresponding CC. SPS PDSCH may be limited to a DL CC having the lowest CC index as shown in the drawing. In addition, a CC including SPS PDSCH may be limited to a DL PCC having the lowest CC index. If necessary, the lowest CC index may also be assigned to a DL PCC.

Thereafter, the UE allows HARQ-ACK payload (i.e., HARQ-ACK part for each CC) for multiple CCs to be sequentially concatenated with each other according to the cell index. Preferably, the HARQ-ACK payload may be concatenated with each other in ascending numerical order of cell index. The entire HARQ-ACK payload configured by concatenation can be transmitted through a PUCCH or PUSCH upon completion of signal processing (e.g., channel coding, modulation, scrambling, etc.).

Embodiment 5

Embodiment 5 proposes a method for determining the number of SPS ACK/NACK bits for ACK/NACK transmission. In case of SPS scheduling, if SPS is activated through PDCCH, a PDSCH is transmitted without a PDCCH at intervals of a predetermined time promised between the BS and the UE. Accordingly, although a PDCCH is not present, the UE can recognize whether one or more TBs are to be transmitted through the corresponding PDSCH. Thus, if a CC for SPS PDSCH transmission is configured in a predetermined mode in such a manner that multiple TBs can be transmitted over a single PDSCH, it is necessary to obtain the number of ACK/NACK bits per PDSCH based on a maximum number of TBs capable of being transmitted according to a transmission mode for each CC, such that it can properly cope with the absence of PDCCH under a dynamic PDSCH (i.e., a PDSCH with a corresponding PDCCH) but not SPS PDSCH. However, in the case of the SPS PDSCH, it may be possible to determine the number of ACK/NACK bits per PDSCH based on the number of TBs allocated during SPS activation.

For example, it is assumed that SPS PDSCH is configured to schedule only one TB irrespective of a transmission mode, and a CC for SPS PDSCH transmission is configured to a transmission mode capable of supporting transmission of a maximum of 2 TBs. In this case, for dynamic PDSCH, the UE must reserve 2 ACK/NACK bits even though only one TB is scheduled. In contrast, for SPS PDSCH, the UE must reserve only one ACK/NACK bit. Therefore, Embodiment 5 can prevent unnecessary ACK/NACK bits from being allocated to the SPS PDSCH.

Figure 31:
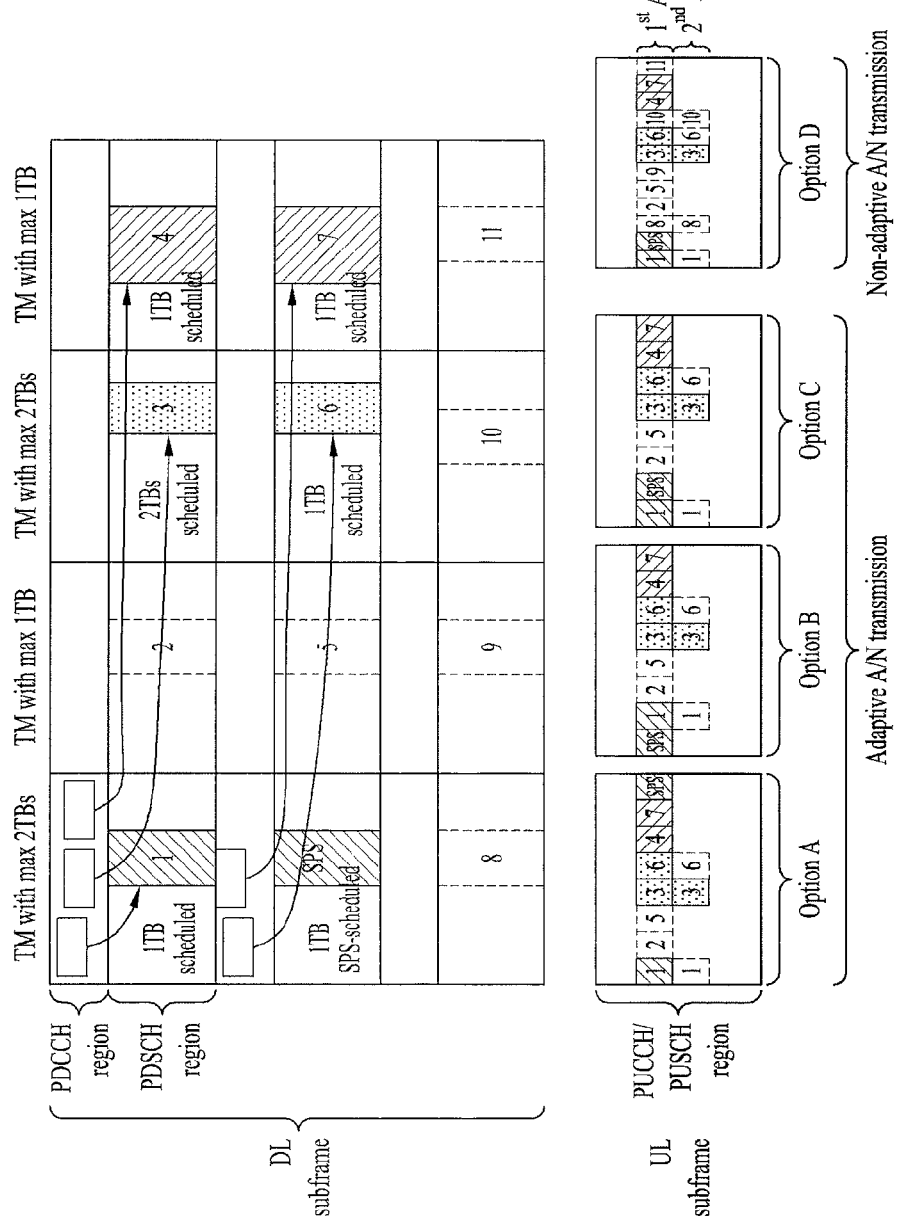

FIG. 31 exemplarily shows the ACK/NACK transmission process according to the embodiment of the present invention. Option A, Option B, and Option C of FIG. 31 show examples for coupling adaptive ACK/NACK transmission to Option A, Option B, and Option C of FIG. 29, respectively. Option A, Option B, and Option C exemplarily show adaptive ACK/NACK transmission methods under 'maxPDCCHperCC=2', and assume that the 'maxPDCCH-perCC' value is determined in consideration of SPS PDSCH. Therefore, the number of DL subframes, that need ACK/NACK feedback at Option A, Option B, and Option C, is 2. Option D may indicate non-adaptive ACK/NACK transmission. The position of each ACK/NACK bit within ACK/NACK payload may be sequentially determined according to the CC index and the subframe order. In addition, it is assumed that CC #1 and CC #3 are configured with a transmission mode (TM) for supporting transmission of two TBs, and spatial bundling is not applied. It is assumed that CC #2 and CC #3 are configured with a transmission mode for supporting transmission of only TB. In addition, it is assumed that SPS PDSCH supports transmission of only one TB.

Referring to FIG. 31, in case of Option A, Option B, and Option C, the UE generates ACK/NACK bits for two DL subframes per CC. In case of Option D, the UE generates ACK/NACK bits for two DL subframes per CC.

In association with dynamic PDSCH of CC #1 and CC #3, the UE always allocates 2-bit ACK/NACK information to one PDSCH (or one DL subframe) according to a transmission mode, irrespective of the number of actually scheduled TBs. If spatial bundling is applied to CC #1 and CC #3, the UE always allocates 2-bit ACK/NACK information to one PDSCH (or one DL subframe) in association with dynamic PDSCH of CC #1 and CC #3. In addition, in association with dynamic PDSCH of CC #2 and CC #4, the UE always allocates 1-bit ACK/NACK information to one PDSCH (or one DL subframe) for only one TB, irrespective of the number of actually scheduled TBs.

In contrast, in association with SPS PDSCH, the UE allocates ACK/NACK bit (for example, one bit) according to the number of TBs actually scheduled to SPS PDSCH, irrespective of the number of TBs capable of being maximally scheduled according to a transmission mode of CC #1. In other words, according to this example of the present invention, SPS PDSCH A/N is always set to 1 bit irrespective of a transmission mode of a CC through which SPS PDSCH is transmitted.

Provided that a maximum number of TBs capable of being transmitted in a single DL subframe per CC is set to 1 or 2, the number of HARQ-ACK bits can be determined as follows.

1) When calculating 'maxPDCCHperCC' using SPS PDSCH, the following relationship is achieved. Equation 9 shows that a CC for SPS PDSCH transmission is configured with a transmission mode capable of supporting transmission of a maximum of one TB. Equation 10 shows that a CC for SPS PDSCH transmission is configured with a transmission mode capable of supporting transmission of a maximum of 2 TBs.

$$O_{HARQ-ACK} = maxPDCCHperCC \cdot \sum_{c=0}^{C-1} TB_{max}(c) \quad \text{[Equation 9]}$$
$$= maxPDCCHperCC \cdot (C + C_2)$$

$$O_{HARQ-ACK} = maxPDCCHperCC \cdot \sum_{c=0}^{C-1} TB_{max}(c) - 1 \quad \text{[Equation 10]}$$
$$= maxPDCCHperCC \cdot (C + C_2) - 1$$

2) If PDSCH is not used to calculate 'maxPDCCHperCC', the following equation 11 is achieved.

$$O_{HARQ-ACK} = maxPDCCHperCC \cdot \sum_{c=0}^{C-1} TB_{max}(c) + 1 \quad \text{[Equation 11]}$$
$$= maxPDCCHperCC \cdot (C + C_2) + 1$$

In Equation 11, if 'maxPDCCHperCC' is set to M (maxPDCCHperCC=M, where M is the number of DL subframes corresponding to one UL subframe), the following exception may be applied to this example. Equation 12 shows that a CC for SPS PDSCH transmission is configured with a transmission mode capable of supporting a maximum of one TB. Equation 13 shows that a CC for SPS PDSCH transmission is configured with a transmission mode capable of supporting transmission of a maximum of 2 TBs.

$$O_{HARQ-ACK} = maxPDCCHperCC \cdot \sum_{c=0}^{C-1} TB_{max}(c) \quad \text{[Equation 12]}$$
$$= maxPDCCHperCC \cdot (C + C_2).$$

$$O_{HARQ-ACK} = maxPDCCHperCC \cdot \sum_{c=0}^{C-1} TB_{max}(c) - 1 \quad \text{[Equation 13]}$$
$$= maxPDCCHperCC \cdot (C + C_2) - 1$$

In accordance with the adaptive ACK/NACK transmission scheme, in case of SPS PDSCH, the number of ACK/NACK bits can be allocated according to the number of scheduled TBs. On the other hand, the non-adaptive ACK/NACK transmission scheme can allocate the number of ACK/NACK bits according to a maximum number of TBs capable of being transmitted according to a transmission mode, irrespective of SPS PDSCH. The non-adaptive ACK/NACK transmission scheme may be preferable to the adaptive ACK/NACK transmission scheme in that the non-adaptive ACK/NACK transmission scheme can always use the CC transmission mode and a fixed number of ACK/NACK bits according to the number of DL subframes corresponding to one UL subframe.

In more detail, the following combinations may be utilized in the present invention.

In the first combination, if ACK/NACK is transmitted using a PUCCH format, the non-adaptive ACK/NACK transmission scheme may be used (regardless of SPS PDSCH), and the number of ACK/NACK bits may be allocated according to a maximum number of TBs capable of being scheduled according to the transmission mode.

In the second combination, if ACK/NACK is piggybacked and transmitted to a PUSCH, the adaptive ACK/NACK transmission scheme can be used. In addition, in the case of dynamic PDSCH, the number of ACK/NACK bits can be allocated according to a maximum number of TBs capable of being scheduled according to the transmission mode. In contrast, in the case of SPS PDSCH, a method for allocating the number of ACK/NACK bits according to the number of scheduled TBs can be applied to the present invention. If a maximum number of TBs capable of being transmitted to SPS PDSCH is set to 1 irrespective of the transmission mode, ACK/NACK information for SPS PDSCH may always be fixed to one bit.

Embodiment 6

Embodiment 6 proposes the signaling method for selecting ACK/NACK transmission resources. In the legacy LTE, only a specific format (referred to as Format 1) capable of transmitting ACK/NACK information for one PDSCH exists. In addition, in the case of the presence of PDCCH, the UE utilizes PUCCH resources interworking with a CCE through which a PDCCH is transmitted. In the case of SPS, the UE utilizes PUCCH resources that have been allocated from the BS. In contrast, as can be seen from FIGS. 10 and 11, LTE-A proposes multiple ACK/NACK formats (referred to as 'FormatM') capable of transmitting multiple ACK/NACK signals for multiple PDSCHs. Resources for FormatM can be explicitly allocated to the UE. FormatM must occupy much more physical resources than the legacy Format 1, such that FormatM is far from efficient in terms of resource utilization. Therefore, provided that only one PDSCH is actually scheduled although multiple CCs are configured, the legacy Format 1 may be more preferable than FormatM in terms of resource utilization.

Therefore, according to the number of ACK/NACK signals to be actually transmitted, a PUCCH format and signaling information for indicating associated resource selection may be contained in a PDCCH for PDSCH allocation and a PDCCH for indicating SPS release.

By SPS, provided that a PDSCH is periodically scheduled without using a PDCCH, the number of SPS PDSCHs, a PUCCH format, and a transmission resource may be selected in the corresponding subframe. The ACK/NACK transmission operation can be changed as follows according to information as to whether additional Format1-transmission resources for PS PDSCH A/N transmission are allocated to the UE.

Option 1: Option 1 indicates that additional PUCCH Format1 resources for transmitting ACK/NACK to SPS PDSCH are not allocated If only one PDSCH is scheduled to the UE, signaling formation indicating transmission format/resource information is contained in a PDCCH as described above, and ACK/NACK information can be transmitted using Format 1 as described above. However, if only SPS PDSCH is scheduled, a PDCCH may not exist so that it may be impossible to indicate format/resource selection. In this case, it is impossible to utilize PUCCH resources interworking with a CCE via which a PDCCH is transmitted, such that ACK/NACK information cannot be transmitted using Format 1. As a result, assuming that the UE does not detect a PDCCH causing a UL ACK/NACK and at the same time SPS PDSCH is scheduled, ACK/NACK for SPS PDSCH can be transmitted through PUCCH resources allocated to FormatM. However, it should be noted that, under the condition that a PUSCH is scheduled to a subframe for ACK/NACK transmission, ACK/NACK can be piggybacked to a PUSCH.

Option 2: Option 2 indicates that additional PUCCH Format 1 resources for transmitting ACK/NACK to SPS PDSCH are allocated The ACK/NACK transmission process for Option 2 will hereinafter be described with reference to FIG. 32.

Figure 32:
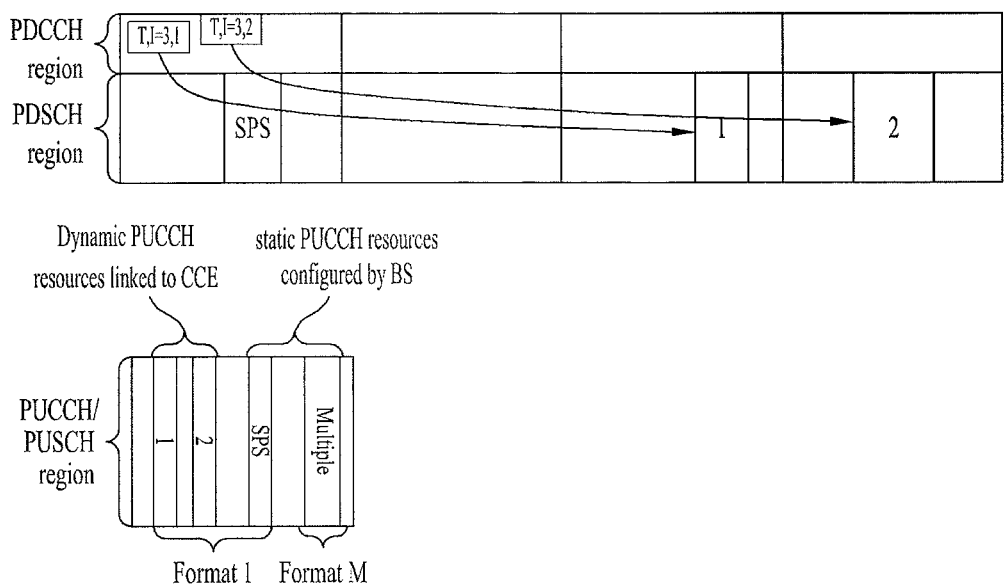

Referring to FIG. 32, since a PDCCH may not exist when only SPS PDSCH is scheduled, it may be impossible to indicate PUCCH format/resource selection. That is, assuming that the UE may not detect any PDCCH causing a UL ACK/NACK and at the same time SPS PDSCH is scheduled, the UE may transmit ACK/NACK information according to Format 1 through resources allocated for SPS, without receiving PDCCH indication information. However, it should be noted that ACK/NACK information can be piggybacked to a PUSCH on the condition that a PUSCH is scheduled to a subframe for ACK/NACK transmission.

Figure 33:
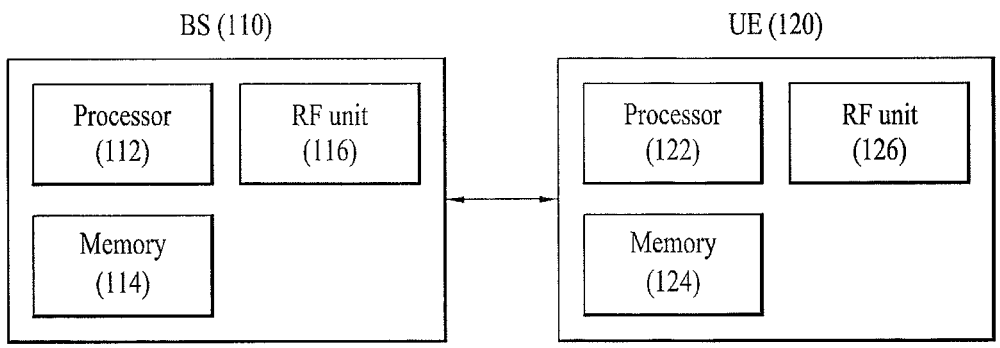
FIG. 33 is a block diagram illustrating a Base Station (BS) and a user equipment (UE) applicable to the embodiments of the present invention.

FIG. 33 is a block diagram illustrating a base station (BS) and a user equipment (UE) applicable to the embodiments of the present invention. If a relay is contained in a wireless communication system, communication in a backhaul link is achieved between a BS and a relay, and communication in an access link is achieved between a relay and a UE. Therefore, a BS or UE shown in FIG. 33 may be replaced with a relay as necessary.

Referring to FIG. 33, the wireless communication system includes a base station (BS) 110 (also denoted by 'BS') and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the BS may be performed by an upper node of the BS as the case may be. In other words, it will be apparent that various operations performed for communication with the UE in the network which includes a plurality of network nodes along with the BS can be performed by the BS or network nodes other than the BS. The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Exemplary embodiments of the present invention can be applied to wireless communication systems such as a UE, a relay, and a base station (BS).

What is claimed is:

1. A method of transmitting uplink control information at a communication apparatus configured with a plurality of cells including a first cell and a second cell in a wireless communication system, the method comprising:
   receiving a first set of one or more Physical Downlink Shared Channel (PDSCH) signals within M downlink subframes through the first cell, where M≥1;
   receiving a second set of zero or more PDSCH signals within N downlink subframes through the second cell, where N≥1; and
   transmitting acknowledgment information on an uplink subframe, the acknowledgment information including acknowledgment information for the first set and acknowledgment information for the second set,
   wherein a PDSCH signal without a corresponding Physical Downlink Control Channel (PDCCH) signal is present among the first set, and acknowledgment information in response to the PDSCH signal is placed at an end of a portion of the acknowledgment information for the first set and is not placed at an end of the acknowledgment information.

2. The method of claim 1, wherein the acknowledgment information in response to the PDSCH signal is placed at the end of the portion of the acknowledgment information for the first set regardless of location of the PDSCH signal without the corresponding PDCCH signal within the first set.

3. The method of claim 1, wherein the first cell is different from the second cell.

4. The method of claim 1, wherein the first set is received on a Primary Cell (PCell).

5. The method of claim 1, wherein the uplink subframe is an uplink subframe of a Physical Uplink Shared Channel (PUSCH), and an acknowledgment information payload size is determined using a Uplink (UL) Downlink Assignment Index (DAI) value of a PDCCH for PUSCH scheduling.

6. The method of claim 5, wherein the UL DAI value indicates a value related with a per-cell acknowledgment information payload size, and wherein acknowledgment information for one or more PDSCH signals having a respective corresponding PDCCH signal is placed in an order of Downlink (DL) DAI value of the respective corresponding PDCCH signal within per-cell acknowledgment information payload.

7. The method of claim 6, wherein when the UL DAI value indicates a larger number than a last DL DAI value, acknowledgment information without any detected PDSCH signal or PDCCH signal is set to NACK within per-cell acknowledgment information payload.

8. The method of claim 1, wherein if the uplink subframe is an uplink subframe of a Physical Uplink Control Channel (PUCCH), a payload size of a per-cell acknowledgment information is determined using a number of downlink subframes corresponding to the uplink subframe.

9. The method of claim 1, wherein the acknowledgment information transmitted on the uplink subframe is concatenated in increasing order of cell index.

10. The method of claim 1, wherein the M downlink subframes are subframe n−k (k∈K), the uplink subframe is subframe n, and the K:$\{k_0, k_1, \ldots, k_{M-1}\}$ is defined in a table below:

| UL-DL Configuration | Subframe n | | | | | |
|---|---|---|---|---|---|---|
| | 2 | 3 | 4 | 5 | 6 | 7 |
| 0 | 6 | — | 4 | — | — | 6 |
| 1 | 7, 6 | 4 | — | — | — | 7, 6 |
| 2 | 8, 7, 4, 6 | — | — | — | — | 8, 7, 4, 6 |
| 3 | 7, 6, 11 | 6, 5 | 5, 4 | — | — | — |
| 4 | 12, 8, 7, 11 | 6, 5, 4, 7 | — | — | — | — |
| 5 | 13, 12, 9, 8, 7, 5, 4, 11, 6 | — | — | — | — | — |
| 6 | 7 | 7 | 5 | — | — | 7 |

11. A communication apparatus configured to have a plurality of cells including a first cell and a second cell and transmit uplink control information in a wireless communication system, the communication apparatus comprising:
    a Radio Frequency (RF) unit; and
    a processor configured to:
       receive a first set of one or more Physical Downlink Shared Channel (PDSCH) signals within M downlink subframes through the first cell, where M≥1,
       receive a second set of zero or more PDSCH signals within N downlink subframes through the second cell, where N≥1, and
       transmit acknowledgment information on an uplink subframe, the transmitted acknowledgment information including acknowledgment information for the first set and acknowledgment information for the second set,
    wherein a PDSCH signal without a corresponding Physical Downlink Control Channel (PDCCH) signal is present among the first set, and acknowledgment information in response to the PDSCH signal is placed at an end of a portion of the acknowledgment information for the first set and is not placed at an end of the acknowledgment information.

12. The communication apparatus of claim 11, wherein the acknowledgment information in response to the PDSCH signal is placed at the end of the portion of the acknowledgment information for the first set regardless of location of the PDSCH signal without the corresponding PDCCH signal within the first set.

13. The communication apparatus of claim 11, wherein the first cell is different from the second cell.

14. The communication apparatus of claim 11, wherein the first set is received on a Primary Cell (PCell).

15. The communication apparatus of claim 11, wherein the uplink subframe is an uplink subframe of a Physical Uplink Shared Channel (PUSCH), and an acknowledgment information payload size is determined using a Uplink (UL) Downlink Assignment Index (DAI) value of a PDCCH for PUSCH scheduling.

16. The communication apparatus of claim 15, wherein the UL DAI value indicates a value related with a per-cell acknowledgment information payload size, and wherein acknowledgment information for one or more PDSCH signals having a respective corresponding PDCCH signal is placed in an order of Downlink (DL) DAI value of the respective corresponding PDCCH signal within per-cell acknowledgment information payload.

17. The communication apparatus of claim 16, wherein when the UL DAI value indicates a larger number than a last DL DAI value, acknowledgment information without any detected PDSCH signal or PDCCH signal is set to NACK within per-cell acknowledgment information payload.

18. The communication apparatus of claim 11, if the uplink subframe is an uplink subframe of a Physical Uplink Control Channel (PUCCH), a payload size of the generated acknowledgment information is determined using a number of downlink subframes corresponding to the uplink subframe.

19. The communication apparatus of claim 11, wherein the generated acknowledgment information is concatenated in increasing order of cell index.

20. The communication apparatus of claim 11, wherein the M downlink subframes are subframe n−k (k∈K), the uplink subframe is subframe n, and the K:$\{k_0, k_1, \ldots, k_{M-1}\}$ is defined in a table below:

| UL-DL Configuration | Subframe n | | | | | |
|---|---|---|---|---|---|---|
| | 2 | 3 | 4 | 5 | 6 | 7 |
| 0 | 6 | — | 4 | — | — | 6 |
| 1 | 7, 6 | 4 | — | — | — | 7, 6 |
| 2 | 8, 7, 4, 6 | — | — | — | — | 8, 7, 4, 6 |
| 3 | 7, 6, 11 | 6, 5 | 5, 4 | — | — | — |
| 4 | 12, 8, 7, 11 | 6, 5, 4, 7 | — | — | — | — |
| 5 | 13, 12, 9, 8, 7, 5, 4, 11, 6 | — | — | — | — | — |
| 6 | 7 | 7 | 5 | — | — | 7 |

* * * * *